US012656657B2

(12) United States Patent
Lee

(10) Patent No.: US 12,656,657 B2
(45) Date of Patent: Jun. 16, 2026

(54) CAMERA ACTUATOR AND CAMERA DEVICE COMPRISING SAME

(71) Applicant: LG INNOTEK CO., LTD., Seoul (KR)

(72) Inventor: Hyun Joong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 602 days.

(21) Appl. No.: 17/921,233

(22) PCT Filed: Apr. 27, 2021

(86) PCT No.: PCT/KR2021/005295
§ 371 (c)(1),
(2) Date: Oct. 25, 2022

(87) PCT Pub. No.: WO2021/221427
PCT Pub. Date: Nov. 4, 2021

(65) Prior Publication Data
US 2023/0185161 A1 Jun. 15, 2023

(30) Foreign Application Priority Data

Apr. 28, 2020 (KR) ........................ 10-2020-0051593
May 6, 2020 (KR) ........................ 10-2020-0053858

(51) Int. Cl.
*G03B 5/00* (2021.01)
*G03B 13/36* (2021.01)
(Continued)

(52) U.S. Cl.
CPC .............. *G03B 5/00* (2013.01); *G03B 13/36* (2013.01); *H04N 23/55* (2023.01); *H04N 23/60* (2023.01);
(Continued)

(58) Field of Classification Search
CPC .. G03B 5/00; G03B 13/36; G03B 2205/0023; G03B 2205/003; G03B 2205/0069;
(Continued)

(56) References Cited

U.S. PATENT DOCUMENTS 10,678,062 B2 * 6/2020 Im ........................... G02B 7/09
10,754,124 B2 * 8/2020 Ho ......................... G02B 27/64
(Continued)

FOREIGN PATENT DOCUMENTS

EP 3 518 016 A2 7/2019
EP 3 633 446 A1 4/2020
(Continued)

OTHER PUBLICATIONS

Extended European Search Report for European Application No. 25212445.8, dated Nov. 25, 2025.

*Primary Examiner* — Bumsuk Won
*Assistant Examiner* — John Curtis Sipes
(74) *Attorney, Agent, or Firm* — Birch, Stewart, Kolasch & Birch, LLP

(57) ABSTRACT

An embodiment of the present invention discloses a camera actuator including a housing, a mover on which a reflective member is disposed, a guide part disposed between the housing and the mover, and a driving part which drives the mover, wherein the guide part includes a support part, a first elastic part coupled to the support part and the mover, and a second elastic part coupled to the support part and the housing, the first elastic part tilts the mover with respect to a first axis, and the second elastic part tilts the mover with respect to a second axis perpendicular to the first axis.

14 Claims, 53 Drawing Sheets

(51) Int. Cl.
    *H04N 23/55*      (2023.01)
    *H04N 23/60*      (2023.01)

(52) U.S. Cl.
    CPC ................ *G03B 2205/0023* (2013.01); *G03B 2205/003* (2013.01); *G03B 2205/0069* (2013.01)

(58) Field of Classification Search
    CPC .......... G03B 3/10; G03B 17/17; G03B 30/00; H04N 23/55; H04N 23/60; H04N 23/686; H04N 23/54; H04N 23/687; G02B 7/102; G02B 7/182; G02B 13/0065; G02B 27/646
    See application file for complete search history.

(56)            References Cited

U.S. PATENT DOCUMENTS

| | | | |
|---|---|---|---|
| 2017/0205601 A1 | 7/2017 | Kim | |
| 2018/0136438 A1 | 5/2018 | Ho et al. | |
| 2018/0224665 A1 | 8/2018 | Im et al. | |
| 2018/0231793 A1* | 8/2018 | Jeong ...................... | G03B 5/00 |
| 2018/0259787 A1 | 9/2018 | Kim et al. | |
| 2019/0285907 A1 | 9/2019 | Kang et al. | |
| 2020/0084308 A1 | 3/2020 | Yoon et al. | |
| 2020/0257132 A1 | 8/2020 | Im et al. | |
| 2020/0341290 A1 | 10/2020 | Chan et al. | |
| 2021/0116716 A1 | 4/2021 | Jeong et al. | |

FOREIGN PATENT DOCUMENTS

| | | |
|---|---|---|
| KR | 10-2016-0042066 A | 4/2016 |
| KR | 10-2018-0092251 A | 8/2018 |
| KR | 10-2018-0094355 A | 8/2018 |
| KR | 10-2018-0137277 A | 12/2018 |
| KR | 10-2019-0108375 A | 9/2019 |
| KR | 10-2020-0005436 A | 1/2020 |

* cited by examiner

[FIG. 1]
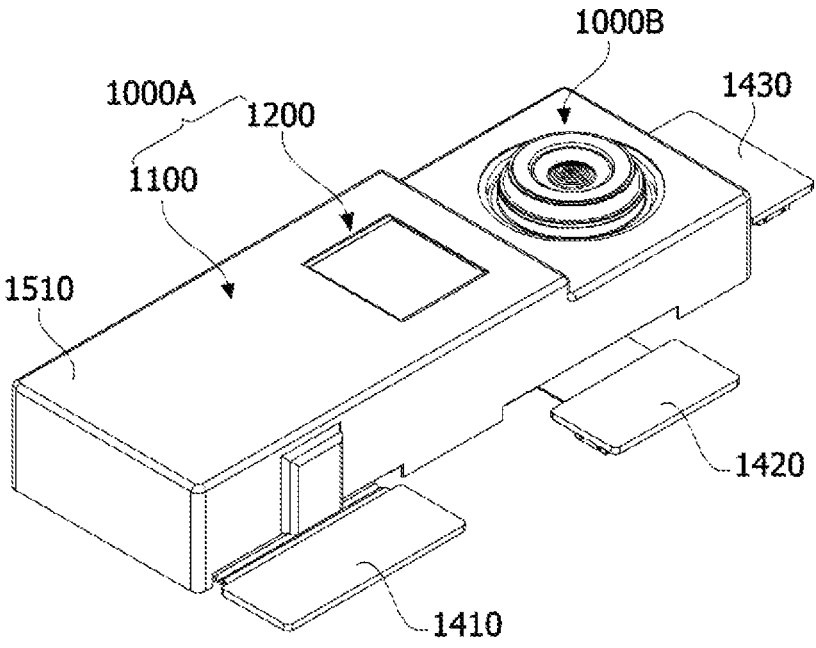
[FIG. 2a]
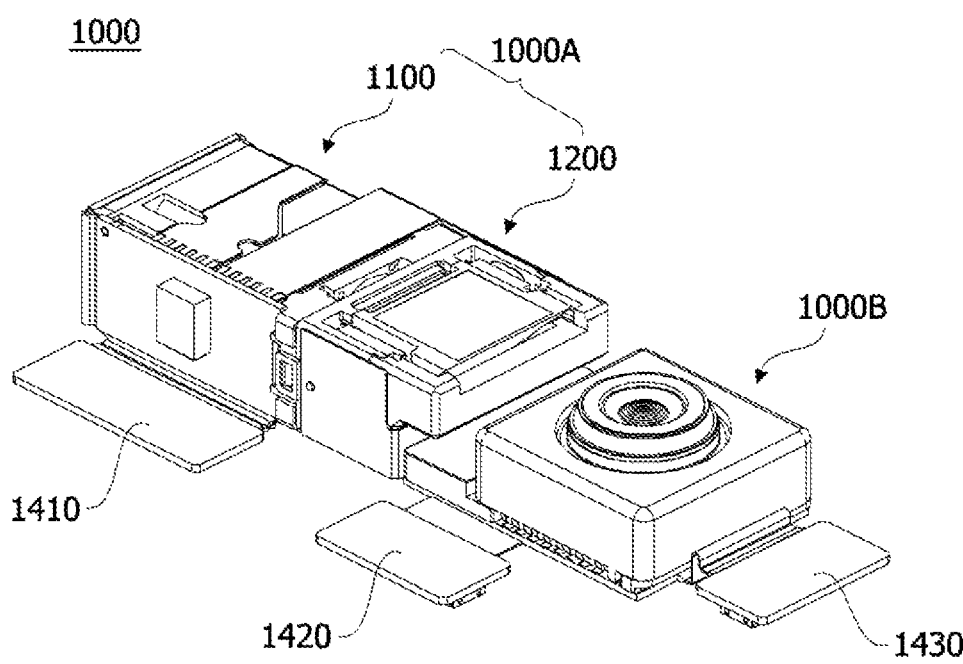

[FIG. 2b]
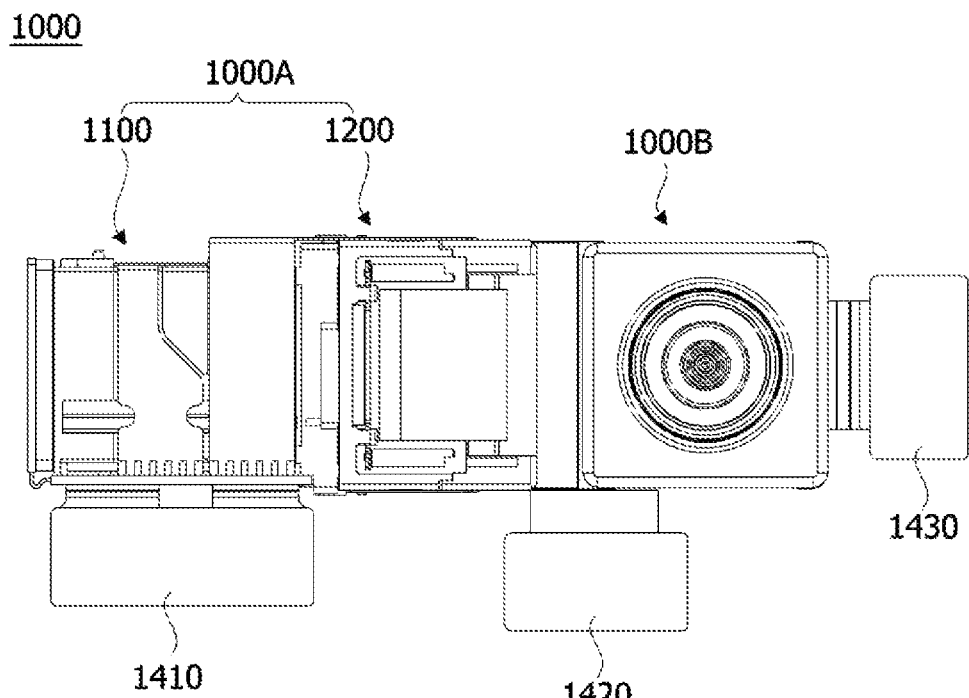

[FIG. 3a]
<u>1000A</u>
1200                                          1100
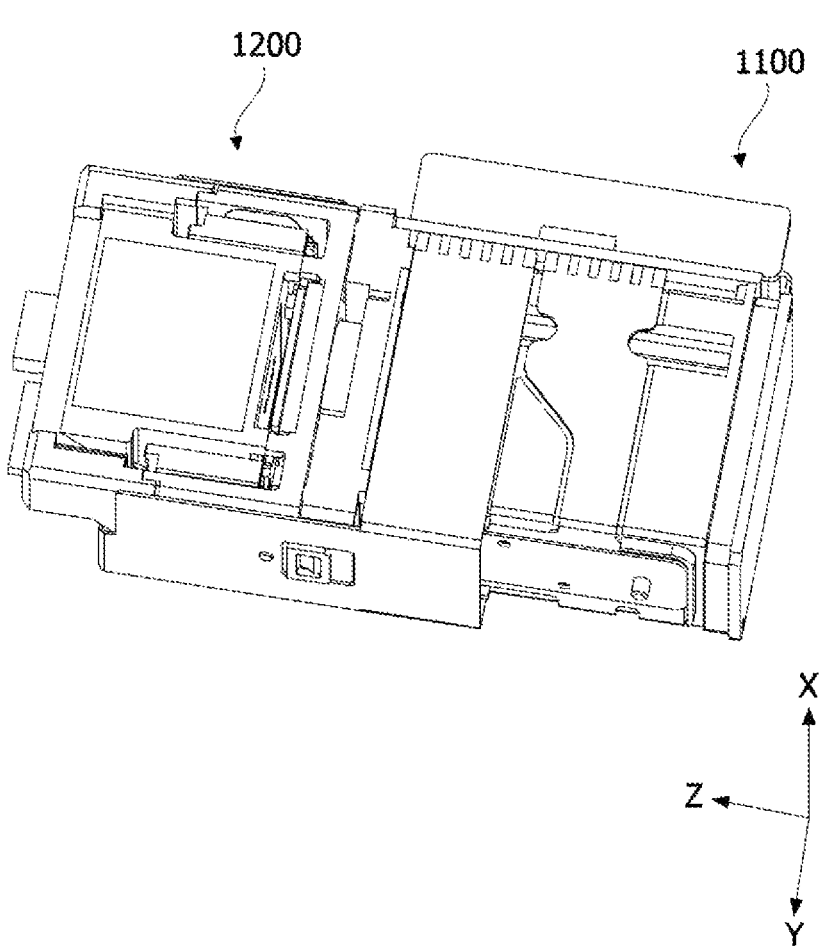
X
Z
Y

[FIG. 3b]
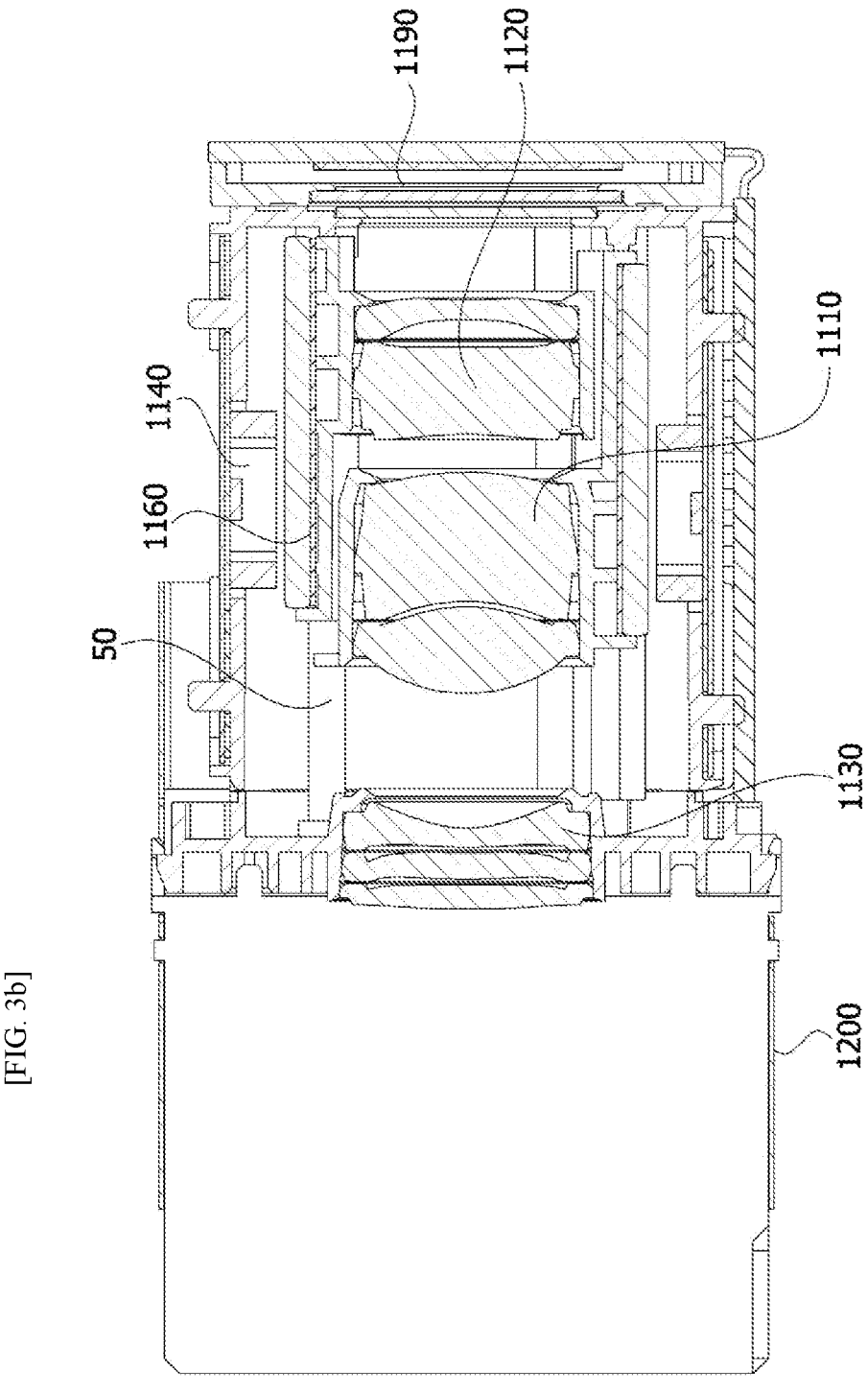

[FIG. 4]
1200
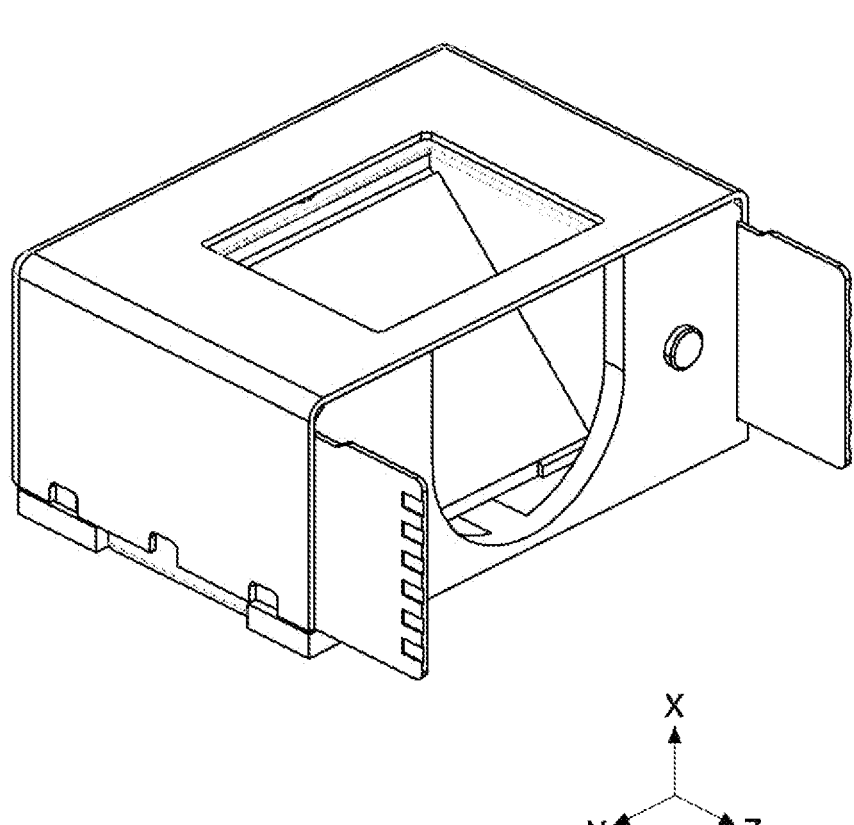

[FIG. 5]
<u>1200</u>
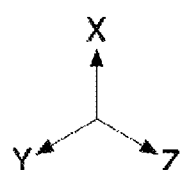
1250 : 1251, 1252, 1253, 1254 , 1255

[FIG. 6a]
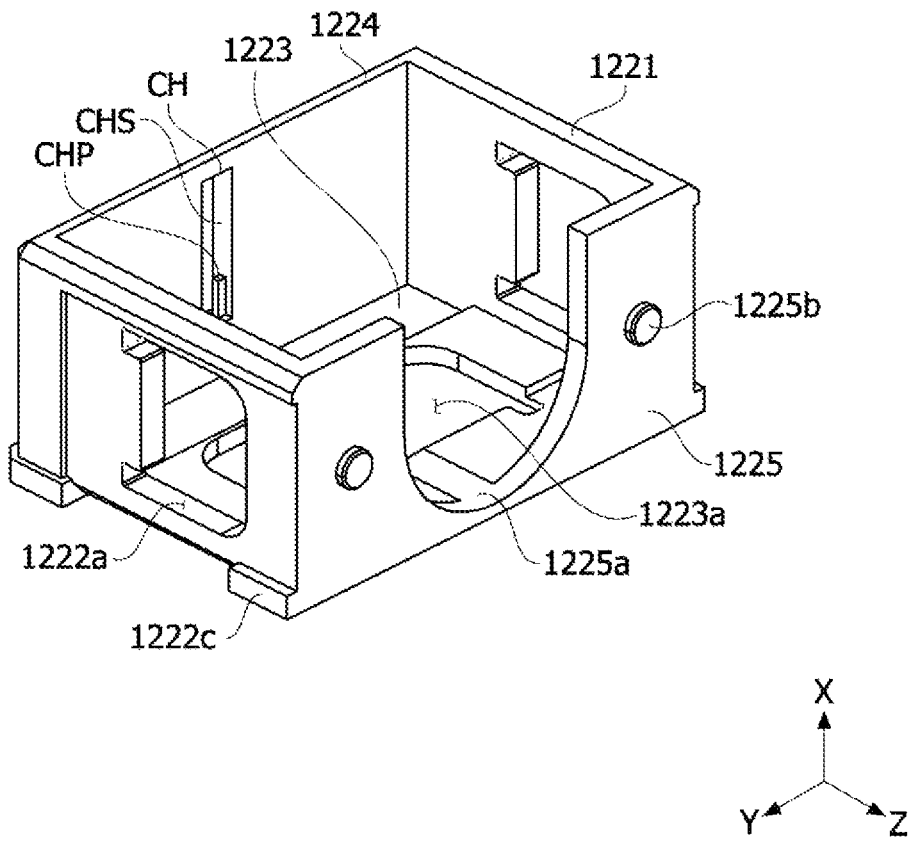
[FIG. 6b]
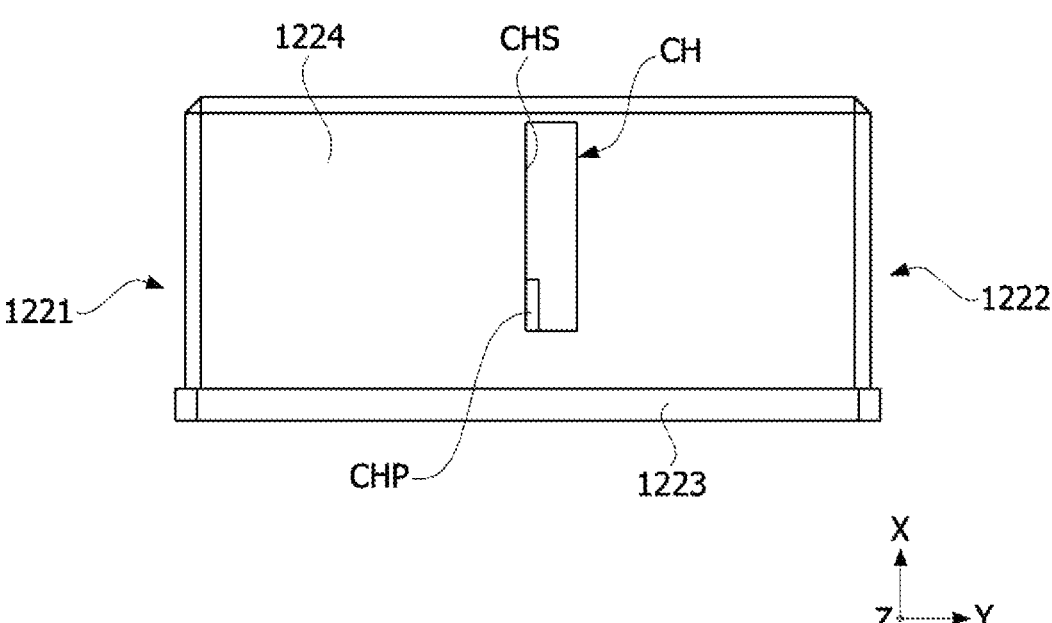

[FIG. 6c]
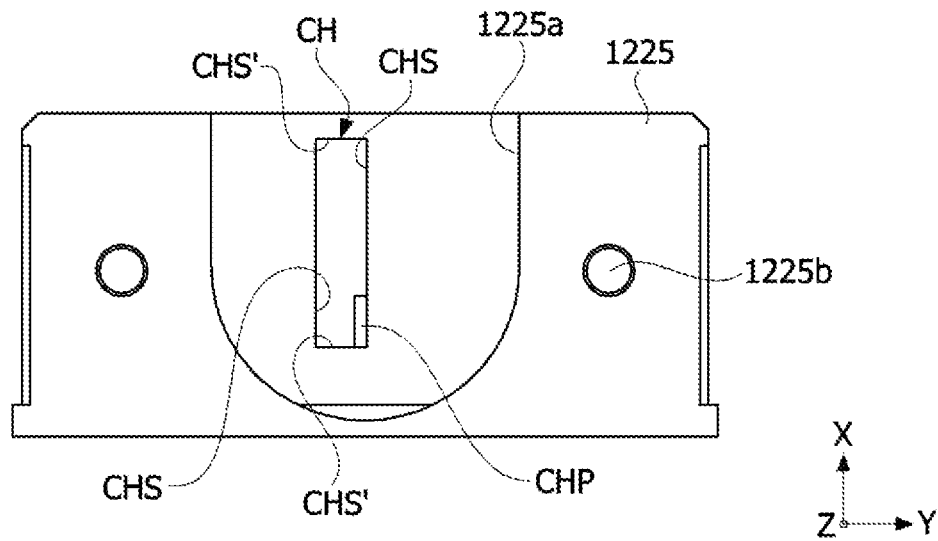

[FIG. 6d]
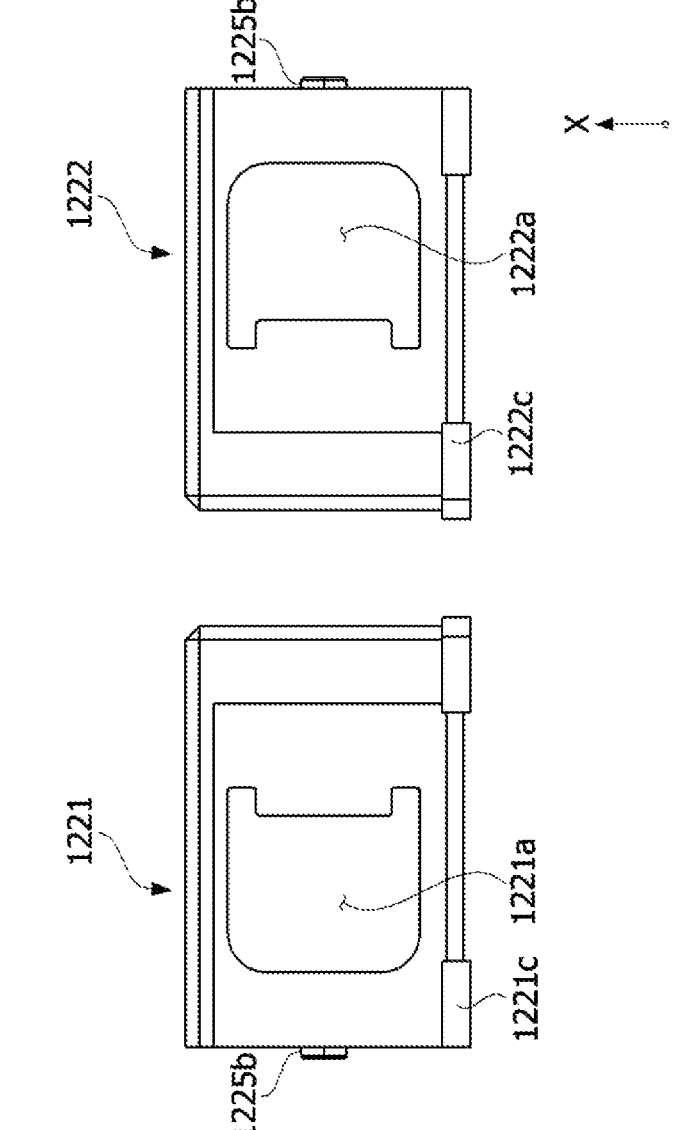

[FIG. 6e]
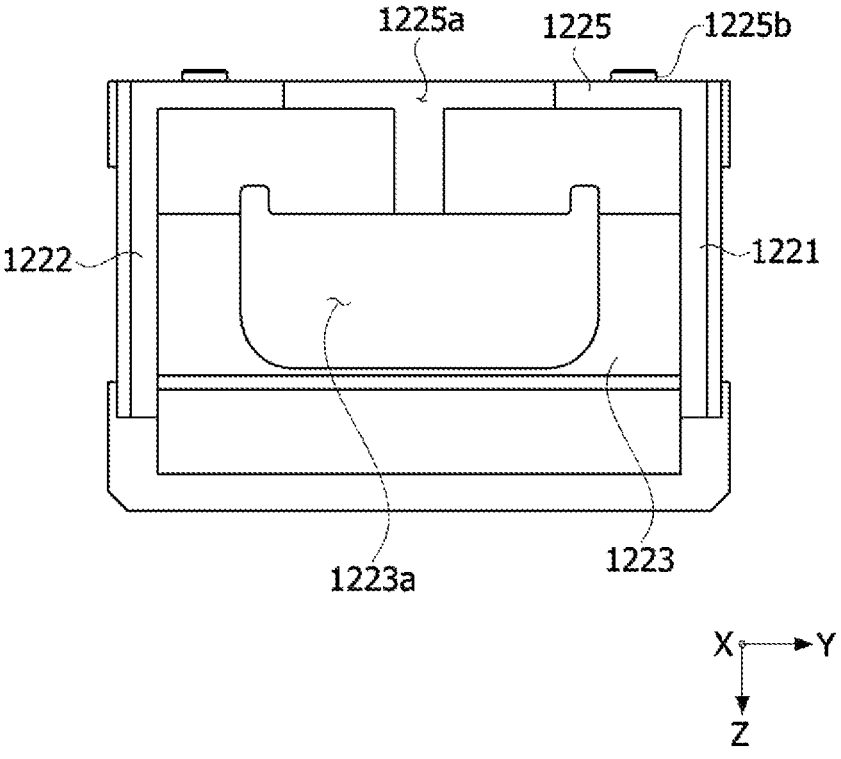
[FIG. 6f]
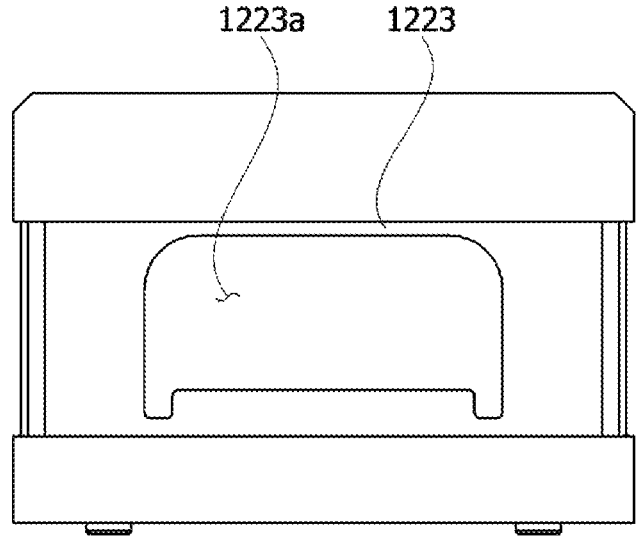
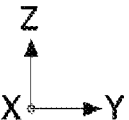

[FIG. 7a]
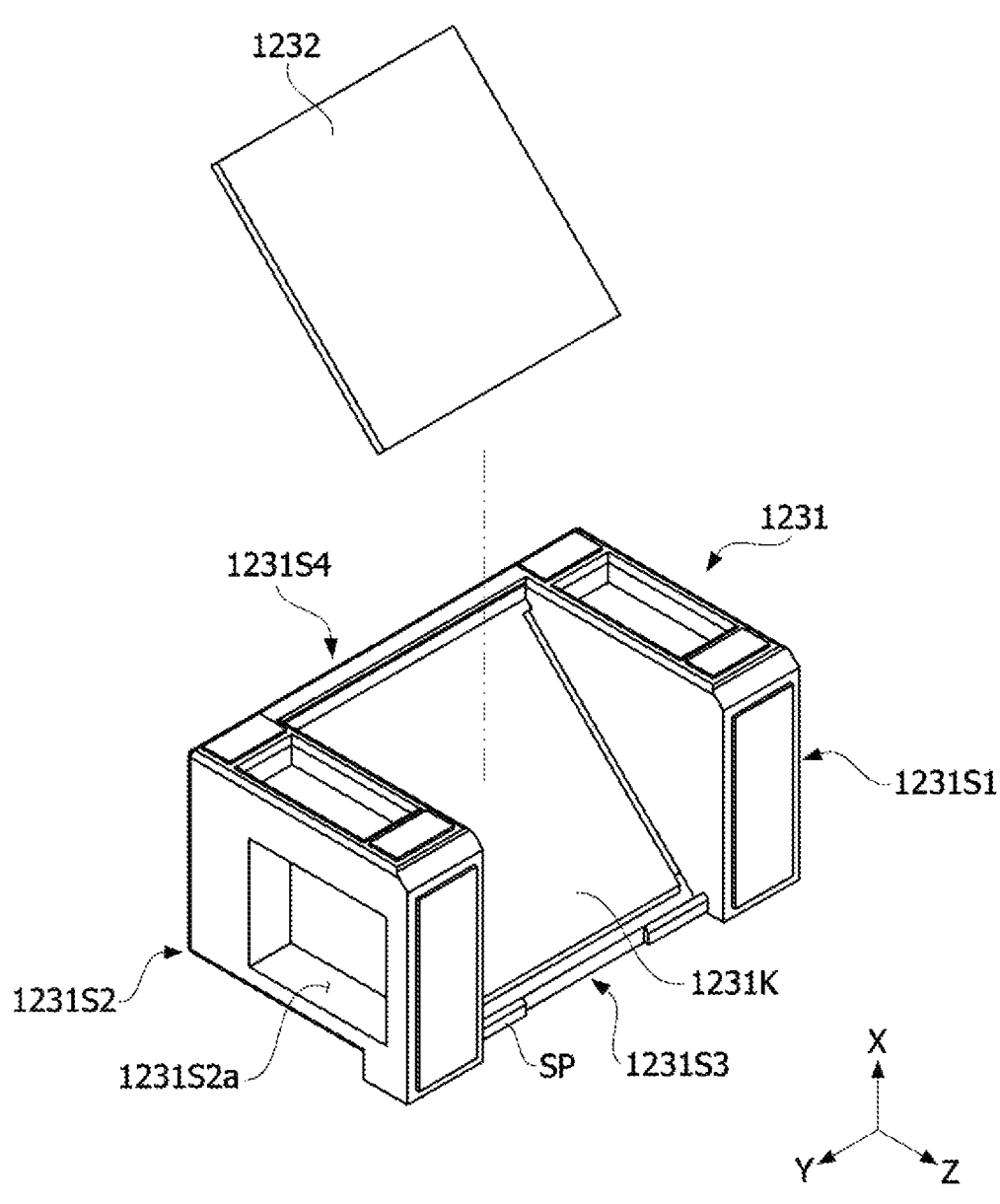

[FIG. 7b]
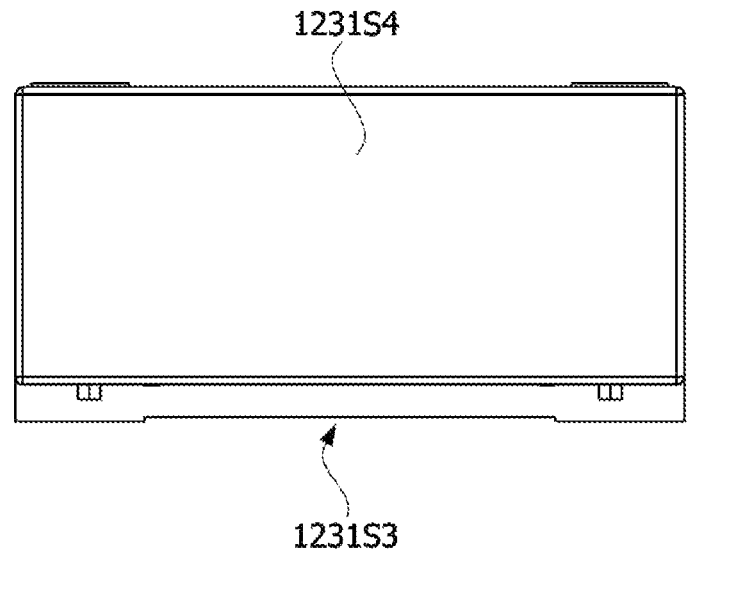
[FIG. 7c]
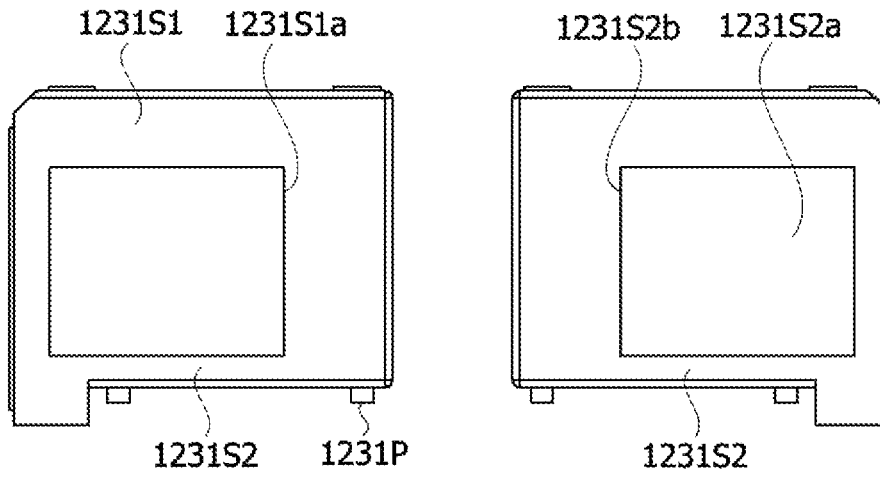

[FIG. 7d]
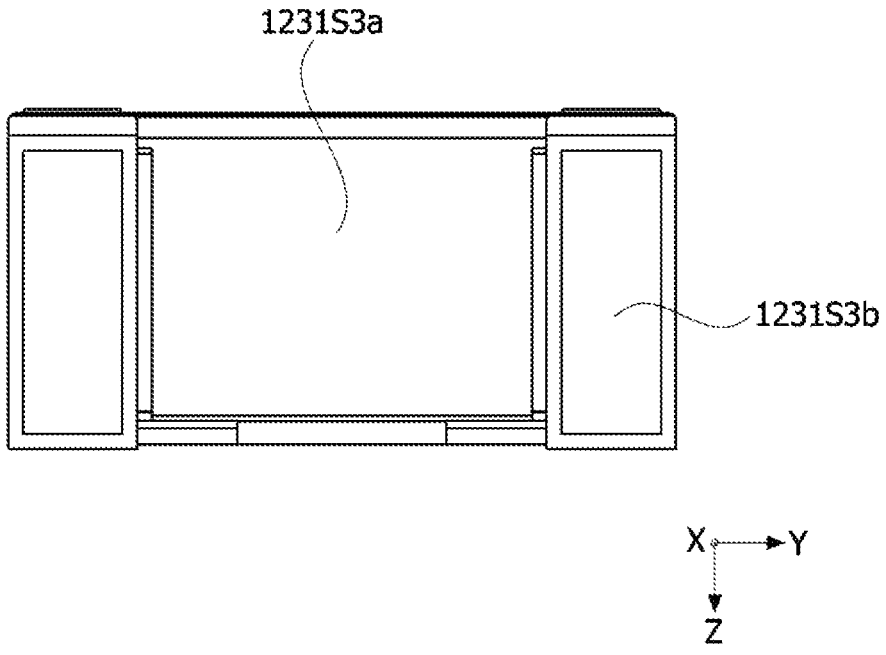
[FIG. 8a]
1240
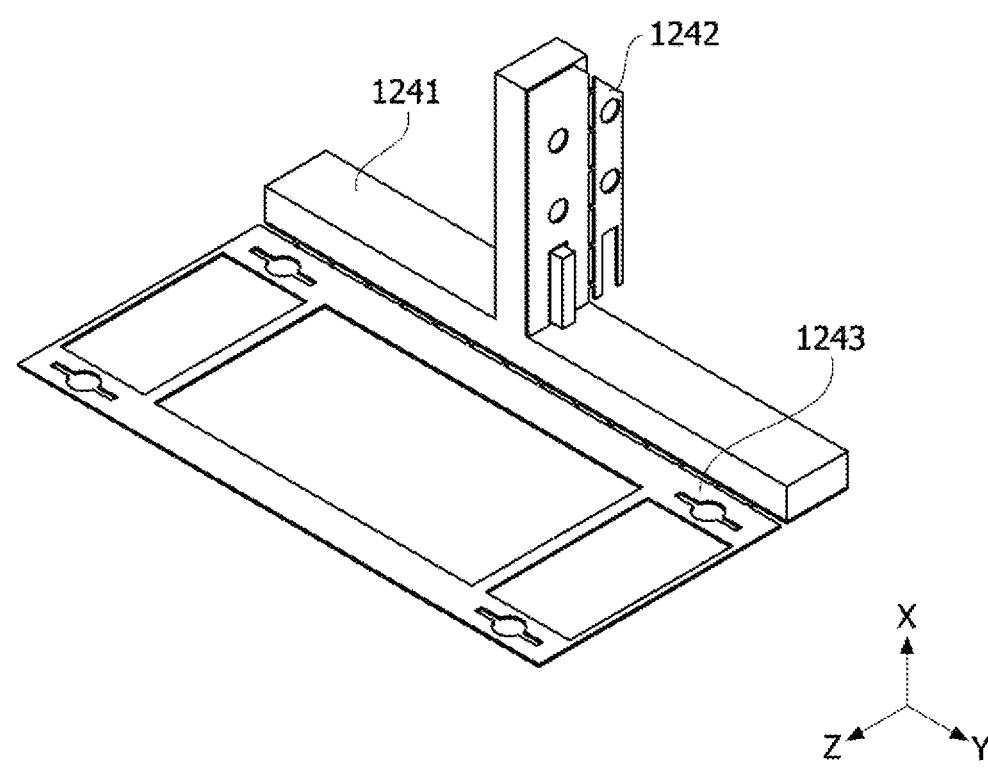

[FIG. 8b]
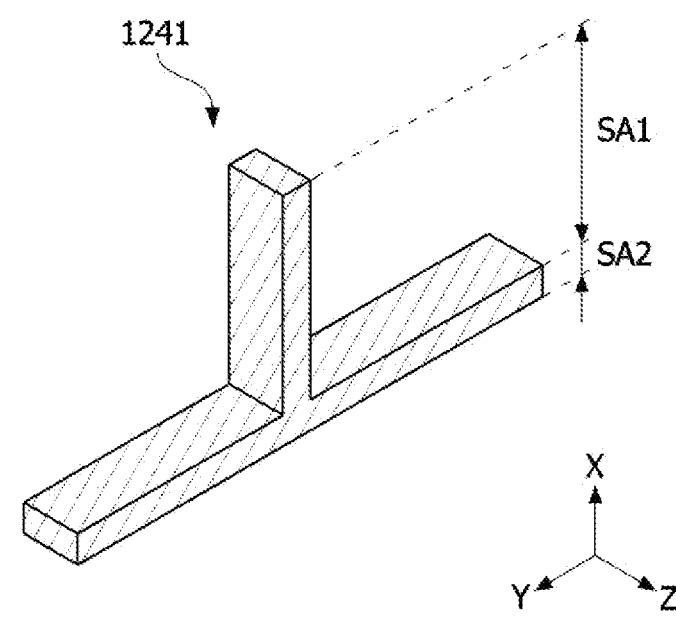
[FIG. 8c]
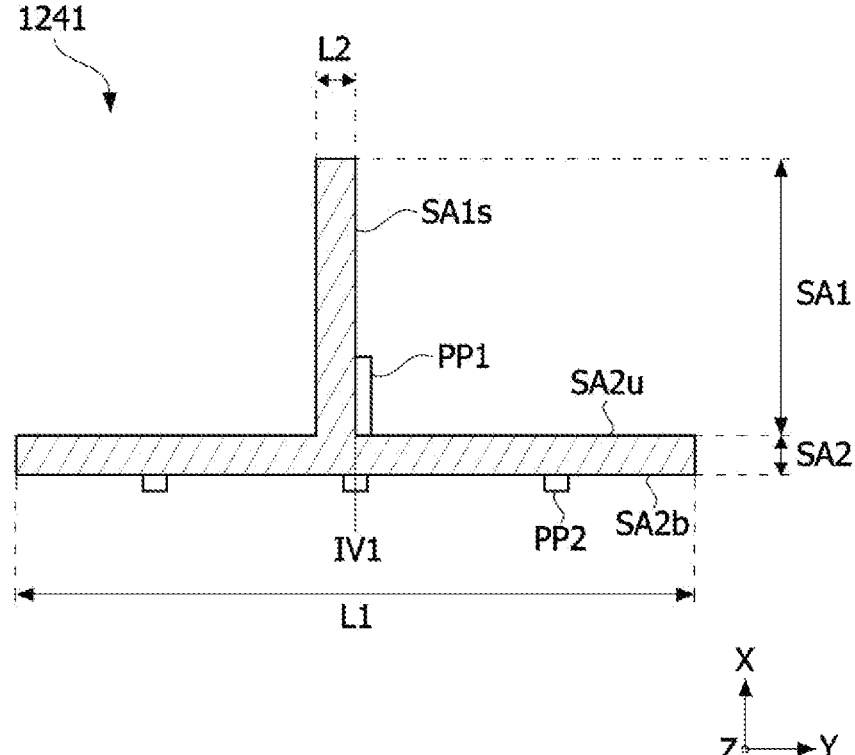

[FIG. 8d]
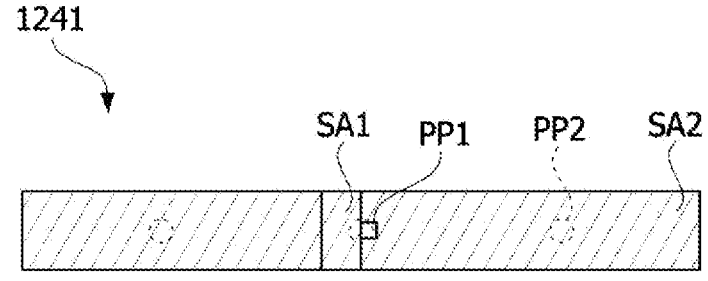
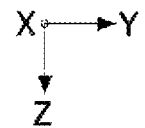
[FIG. 8e]
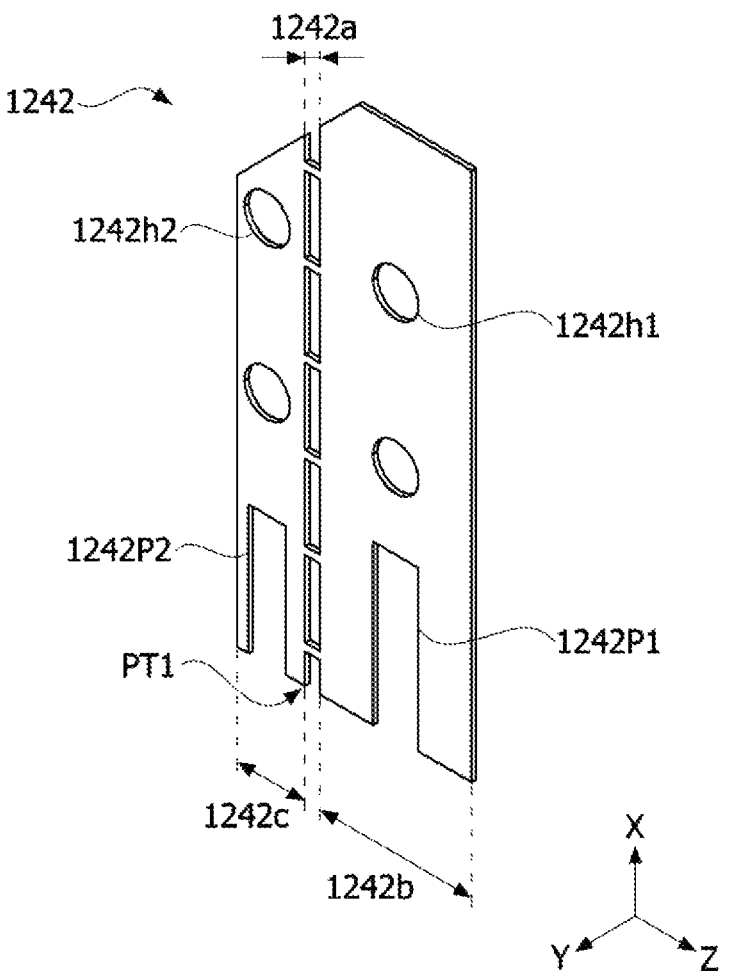

[FIG. 8f]
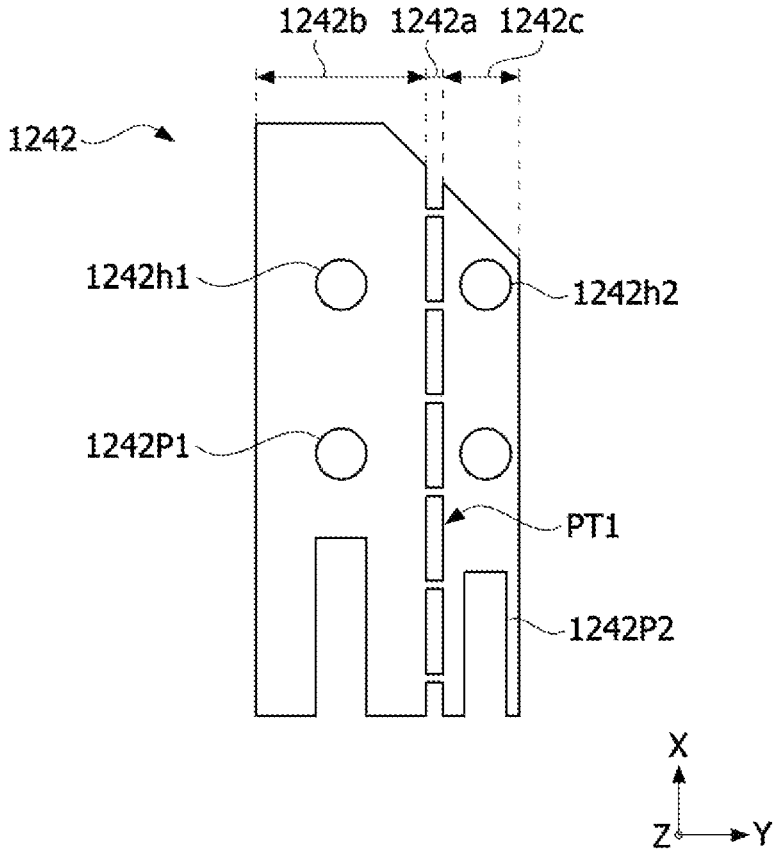
[FIG. 8g]
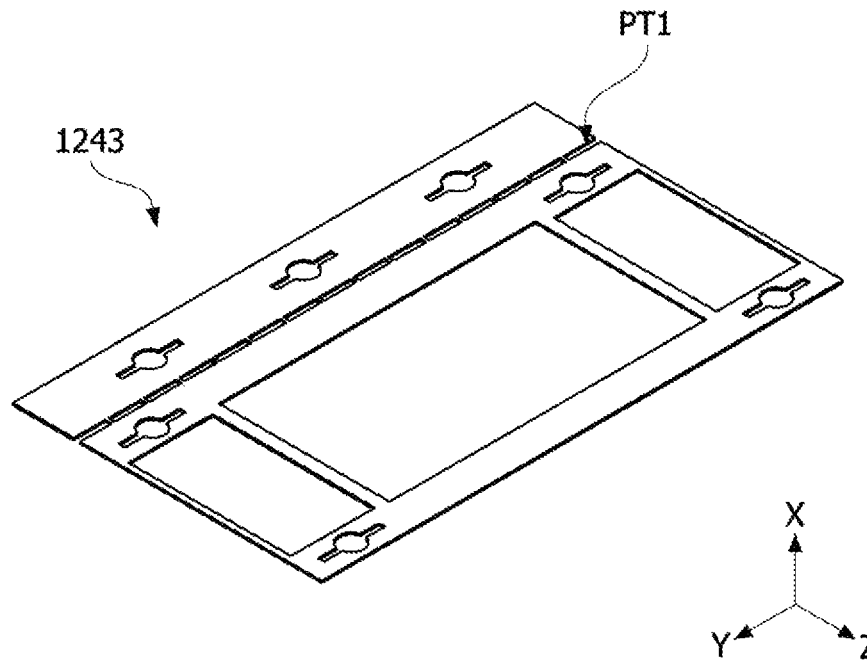

[FIG. 8h]
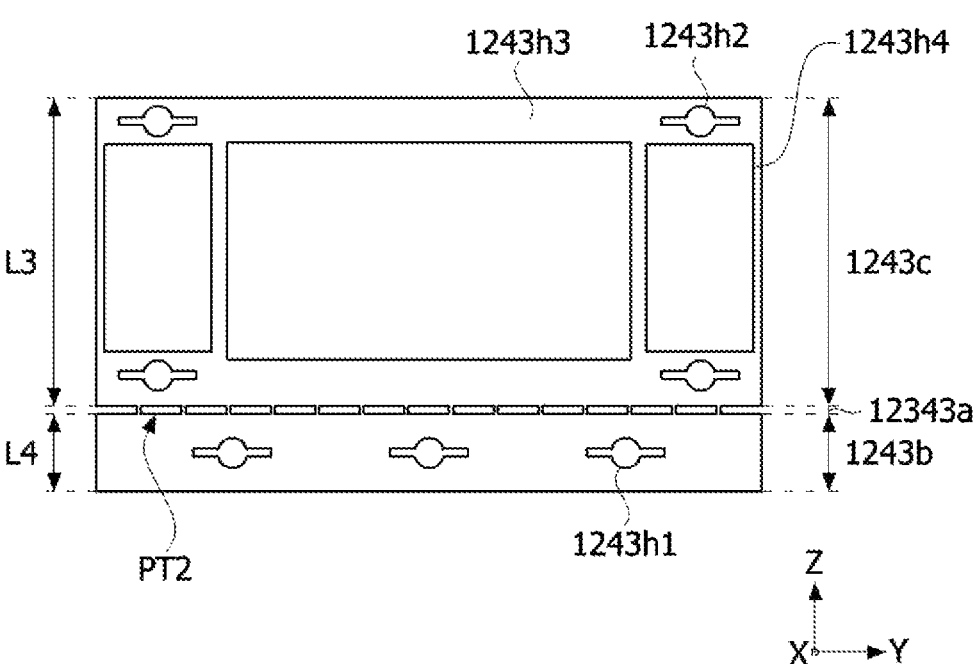

[FIG. 8i]
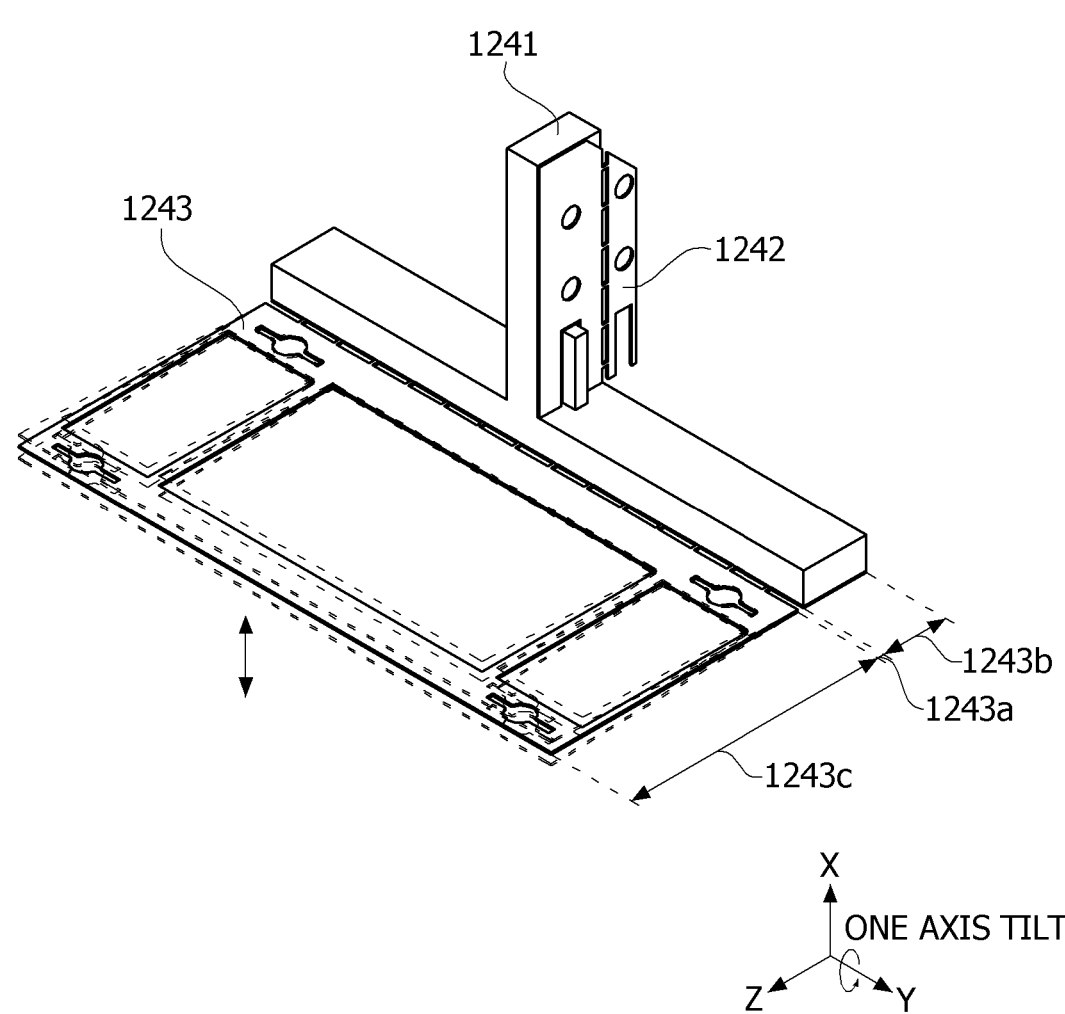

[FIG. 8j]
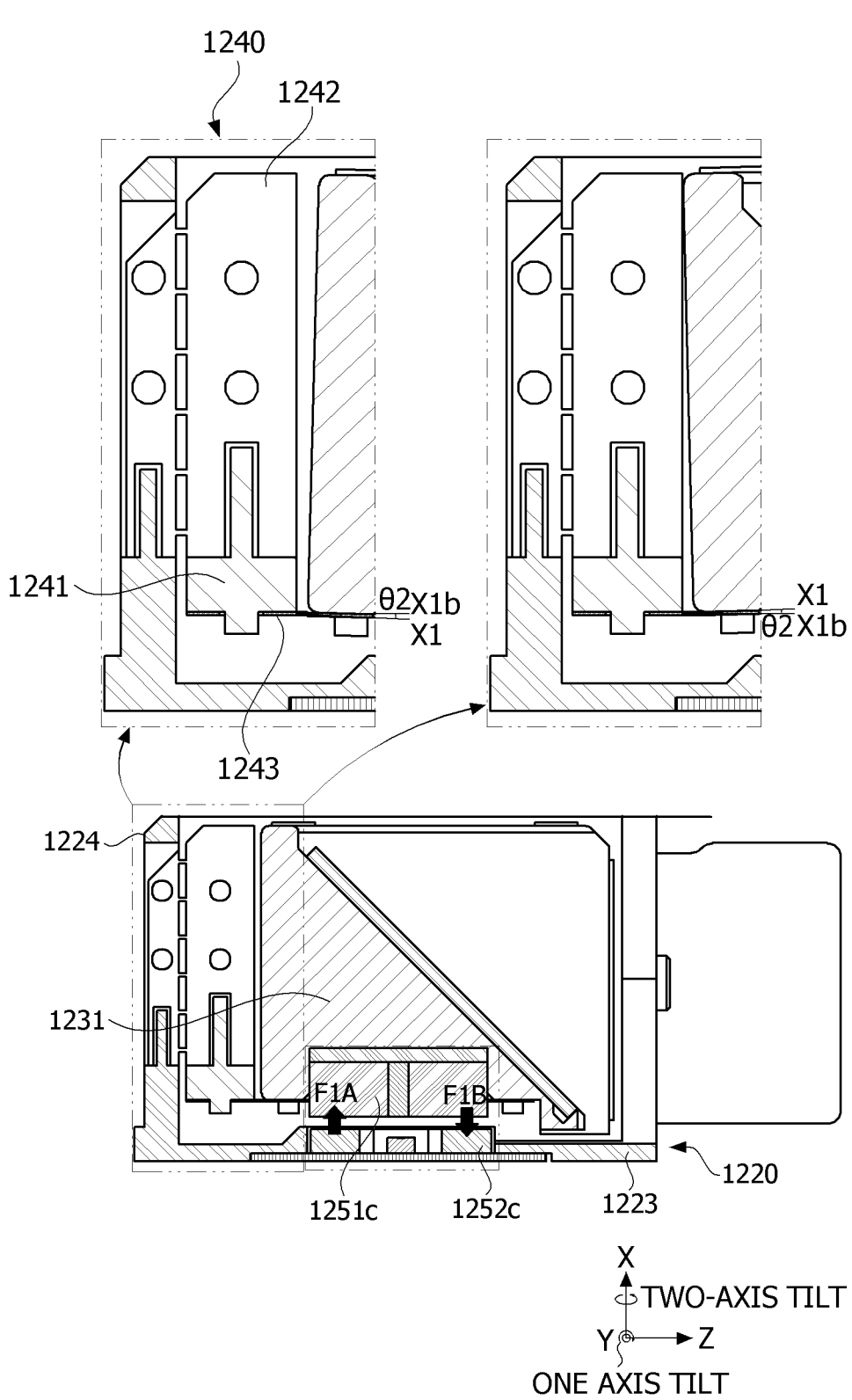

[FIG. 8k]
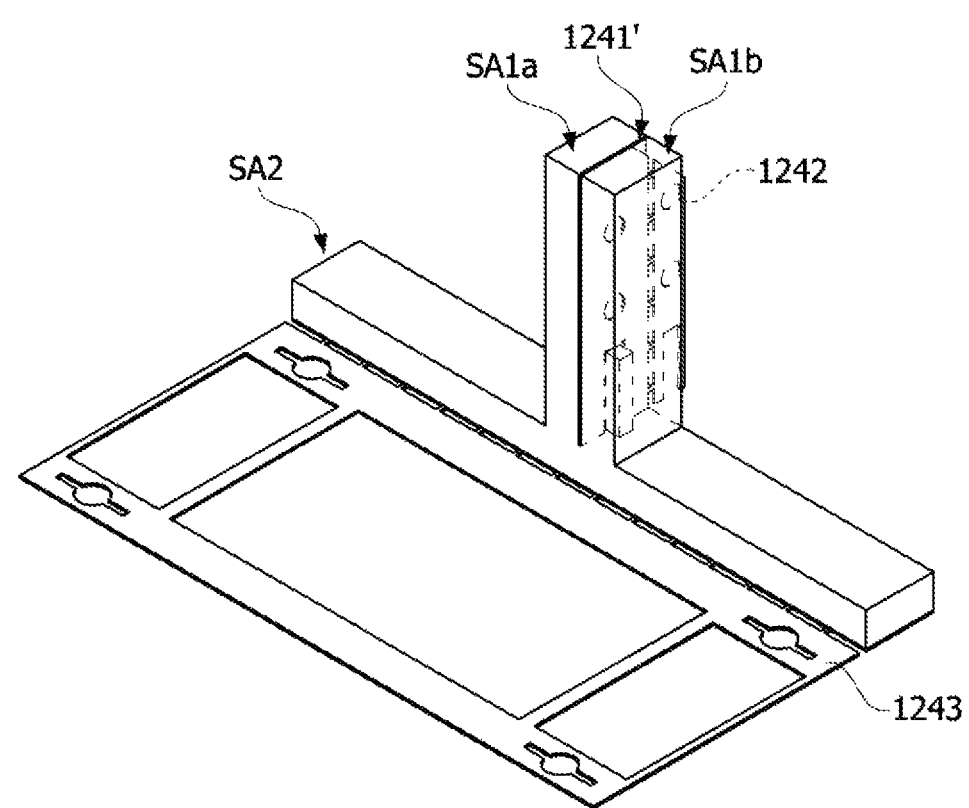

[FIG. 9]
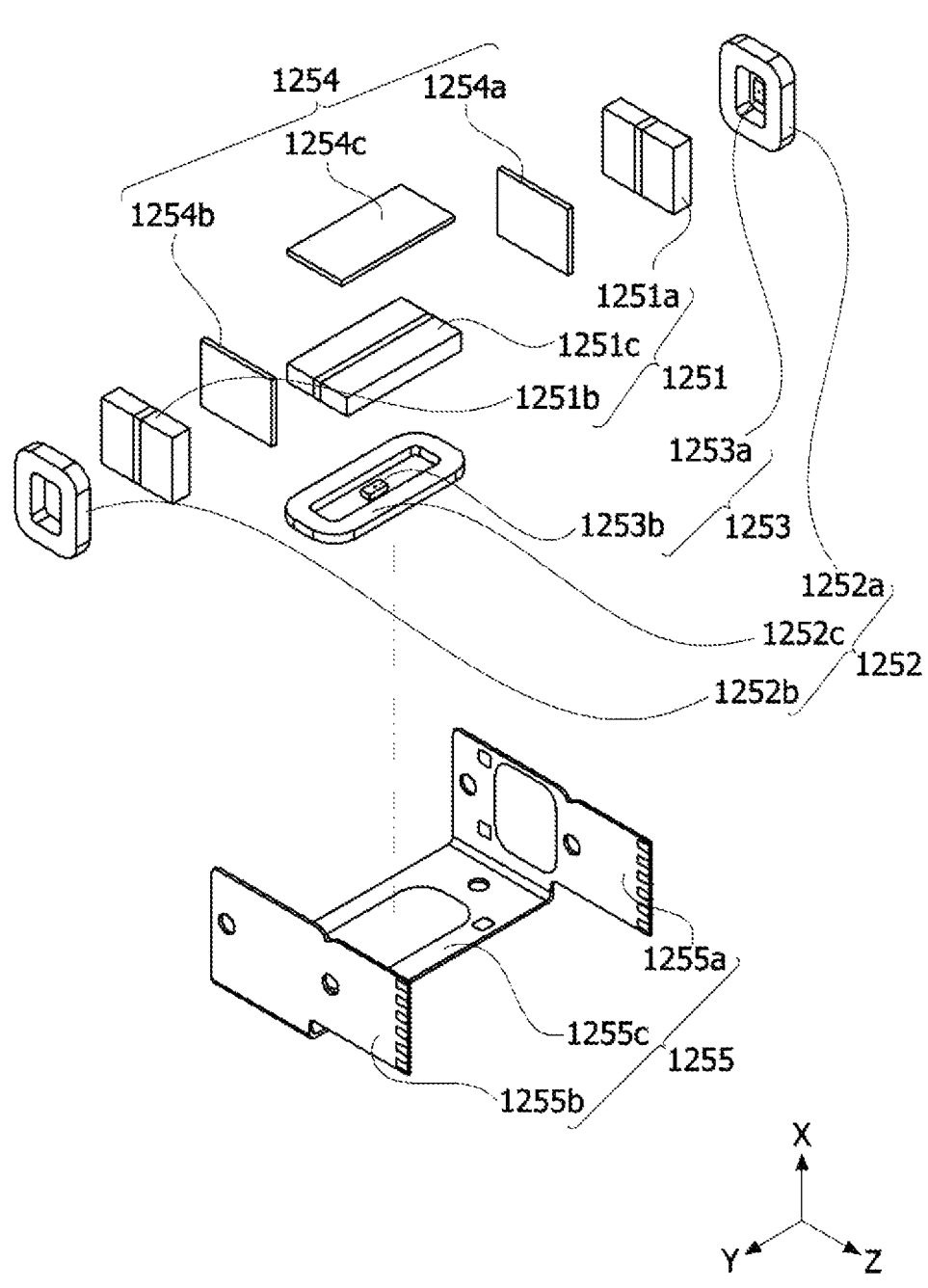

[FIG. 10]
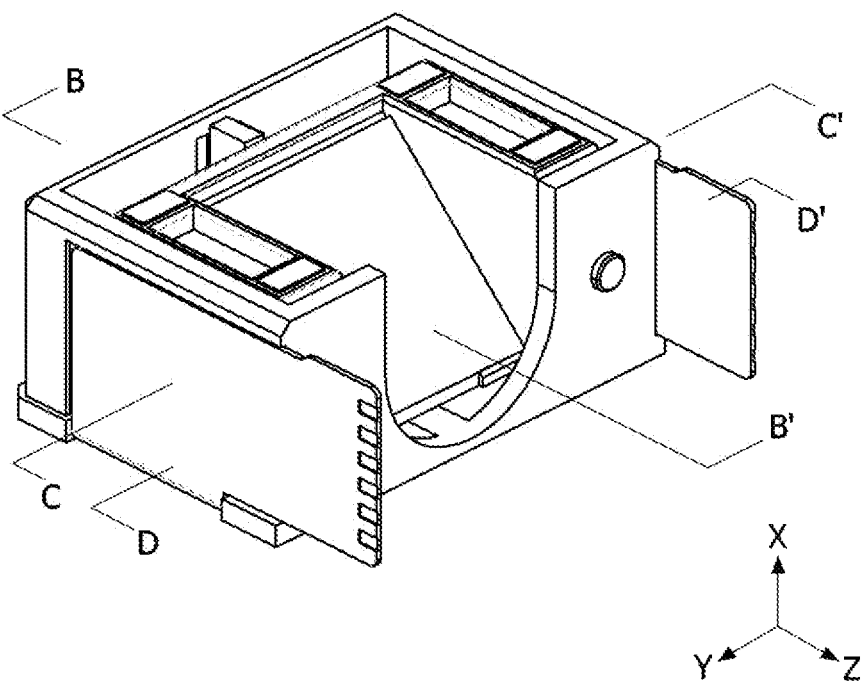

[FIG. 11a]
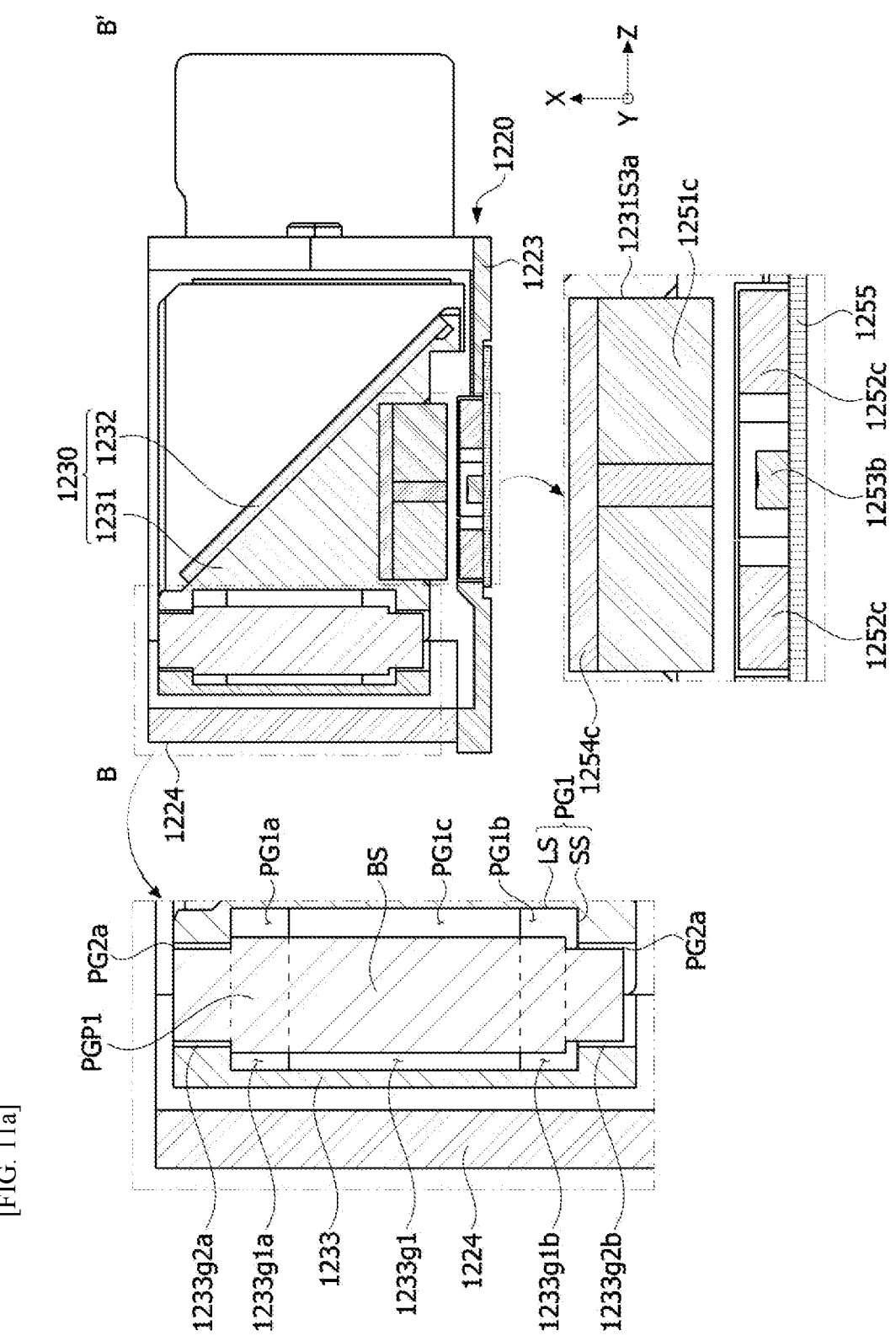

[FIG. 11b]
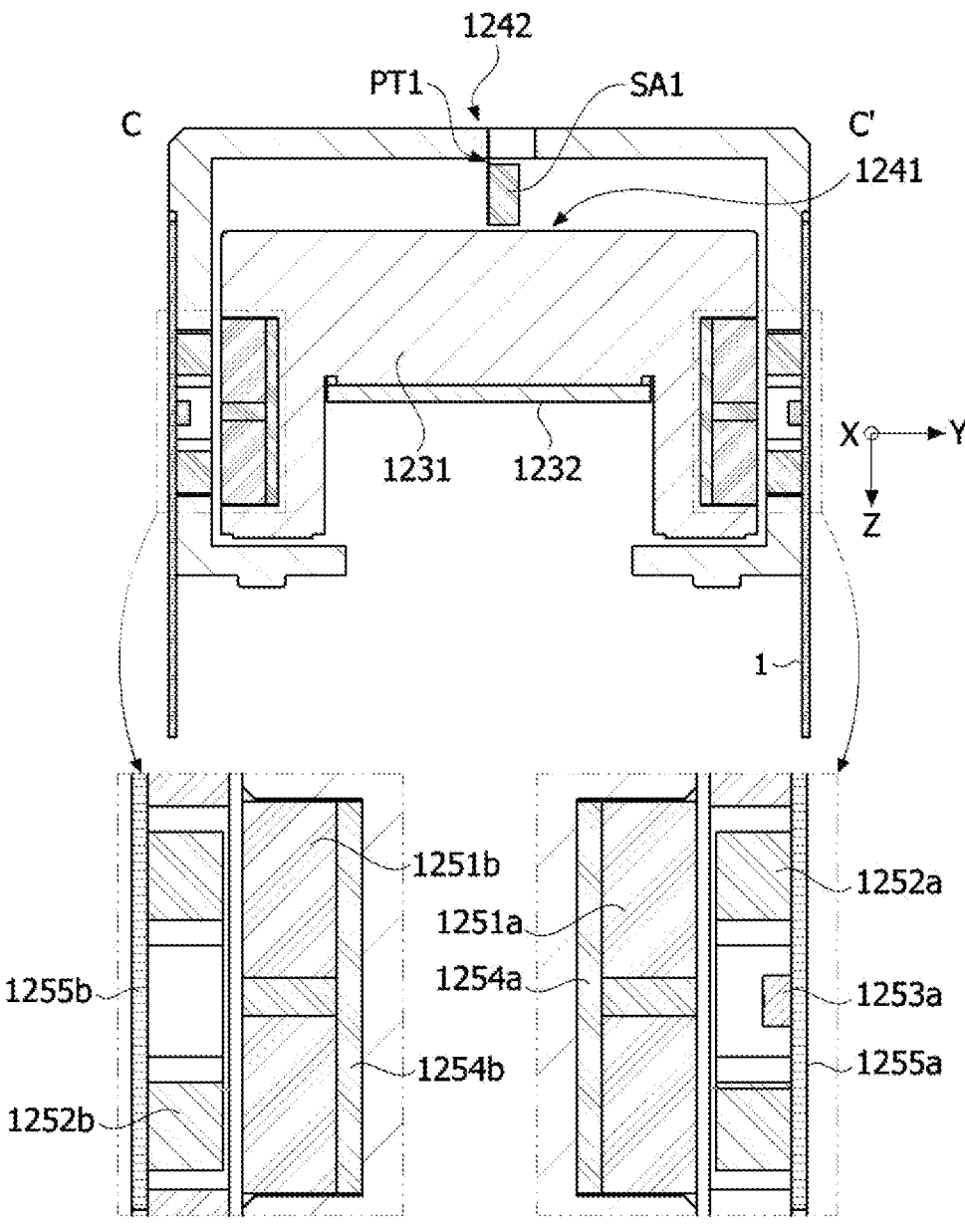

[FIG. 11c]
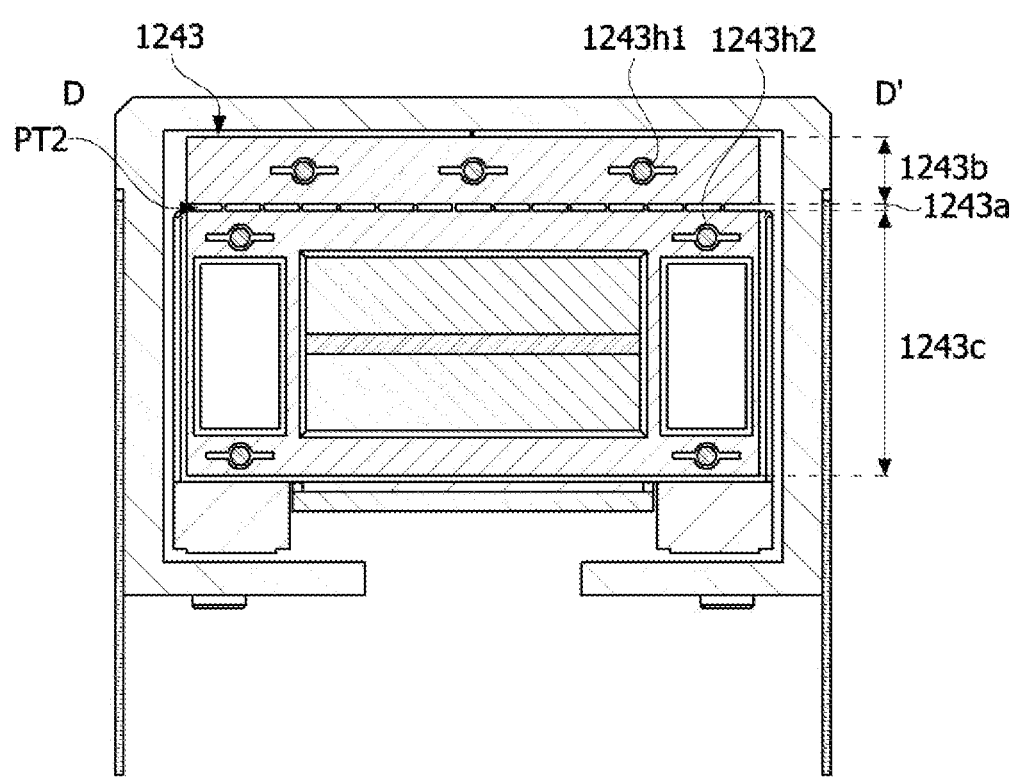

[FIG. 12]
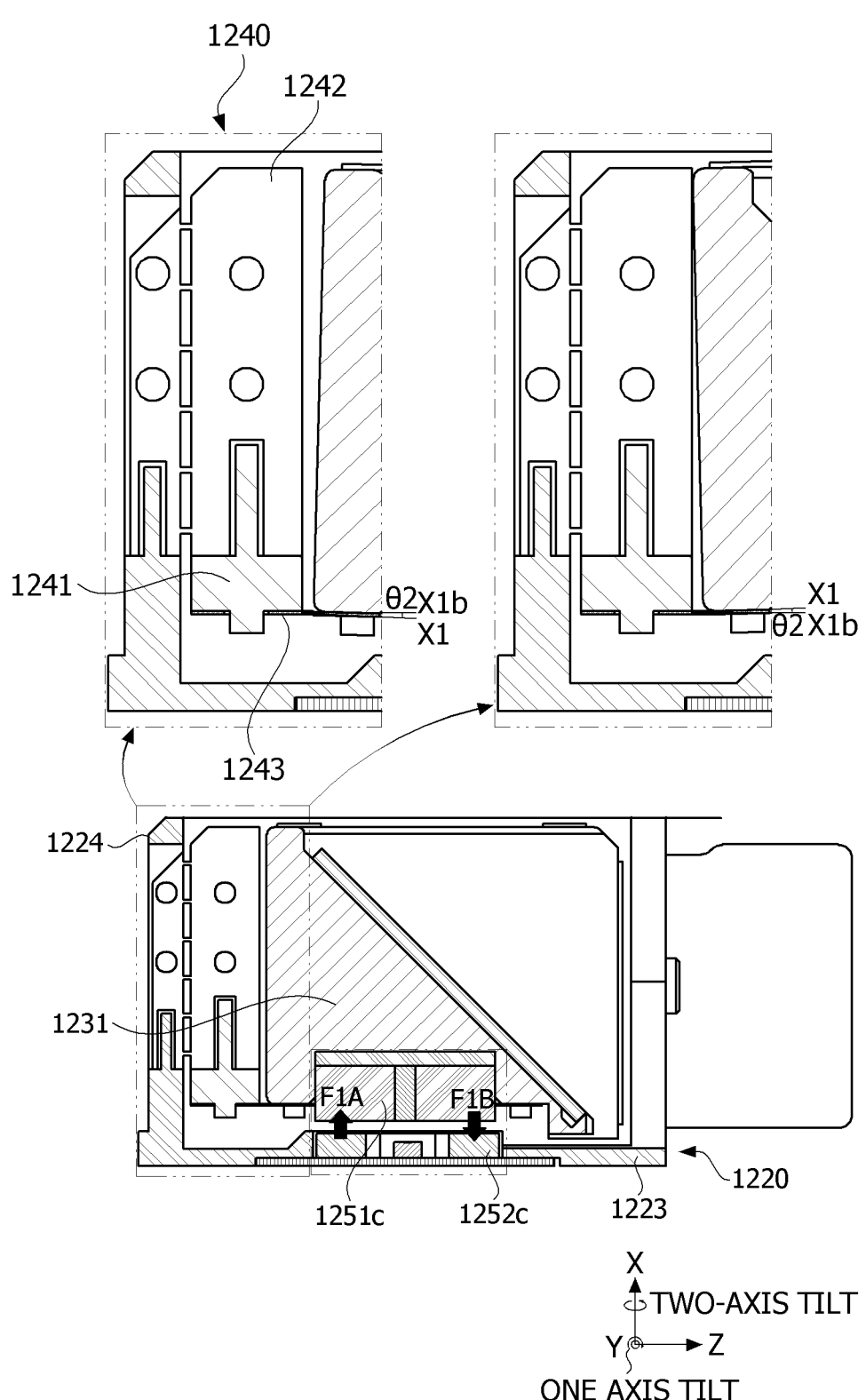

[FIG. 13]
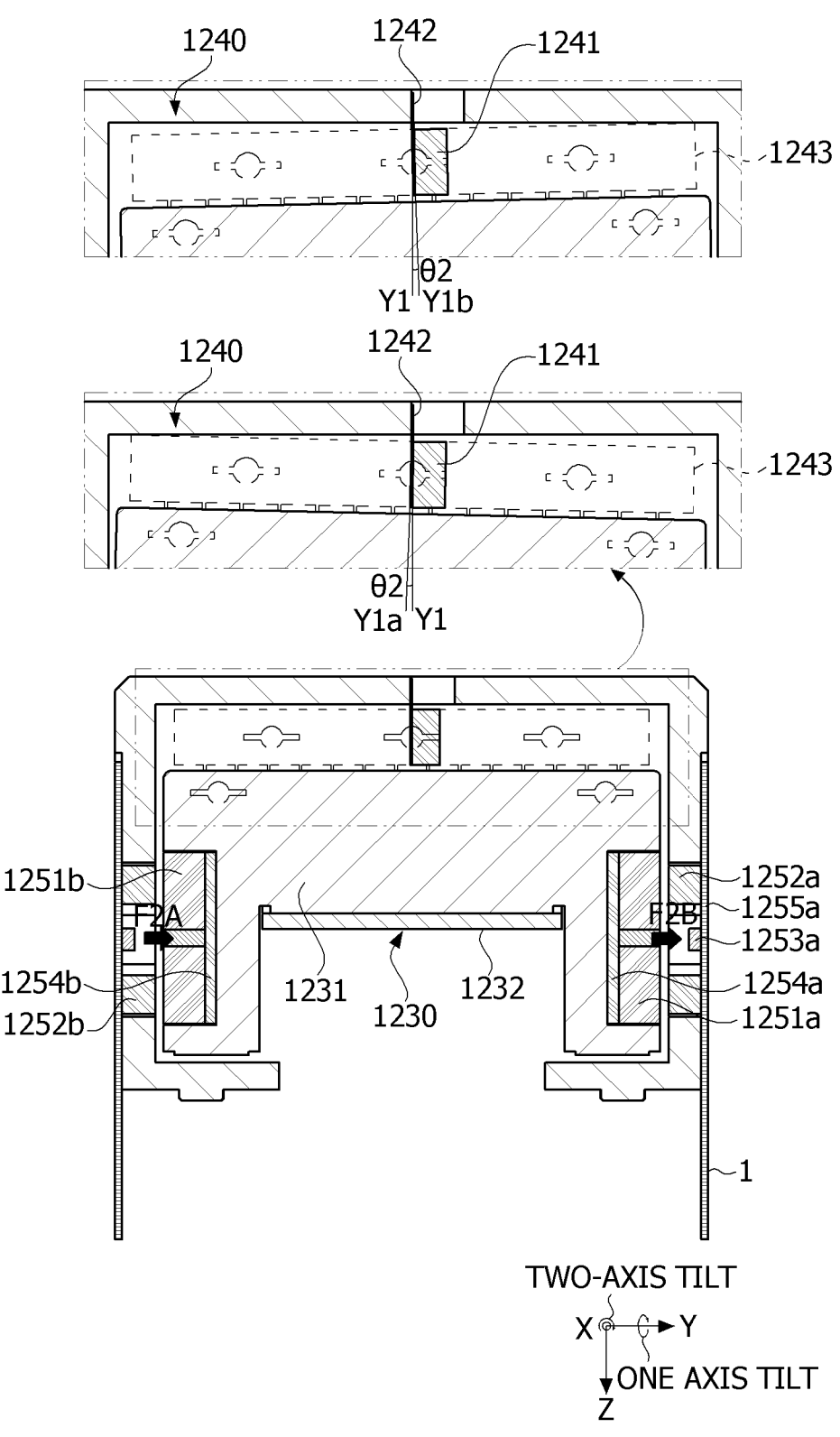

[FIG. 14]
1200
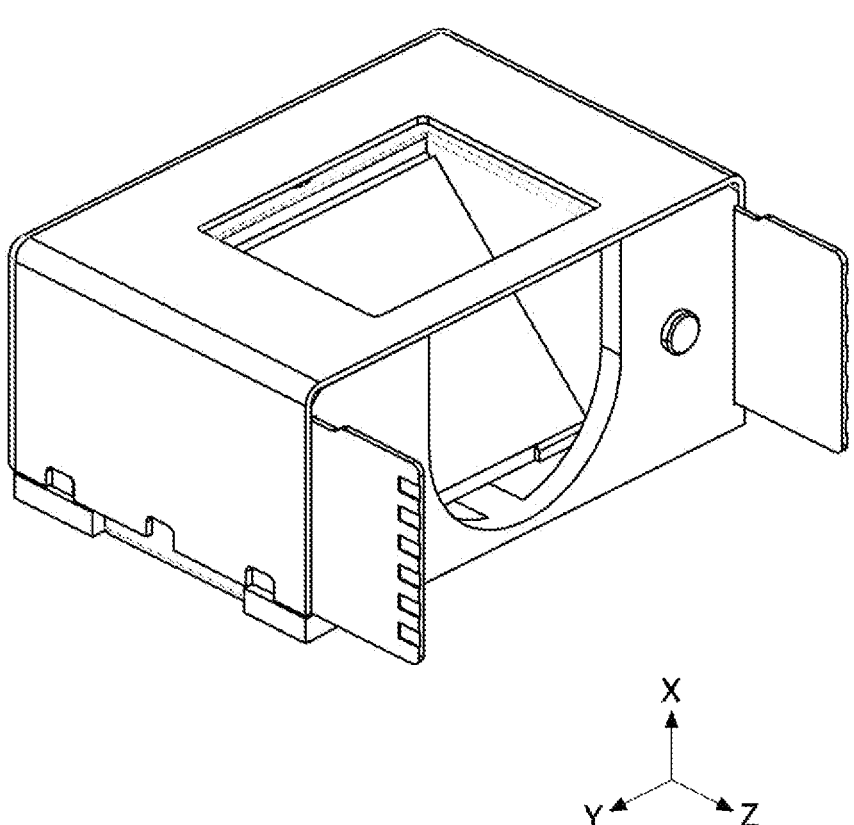

[FIG. 15]
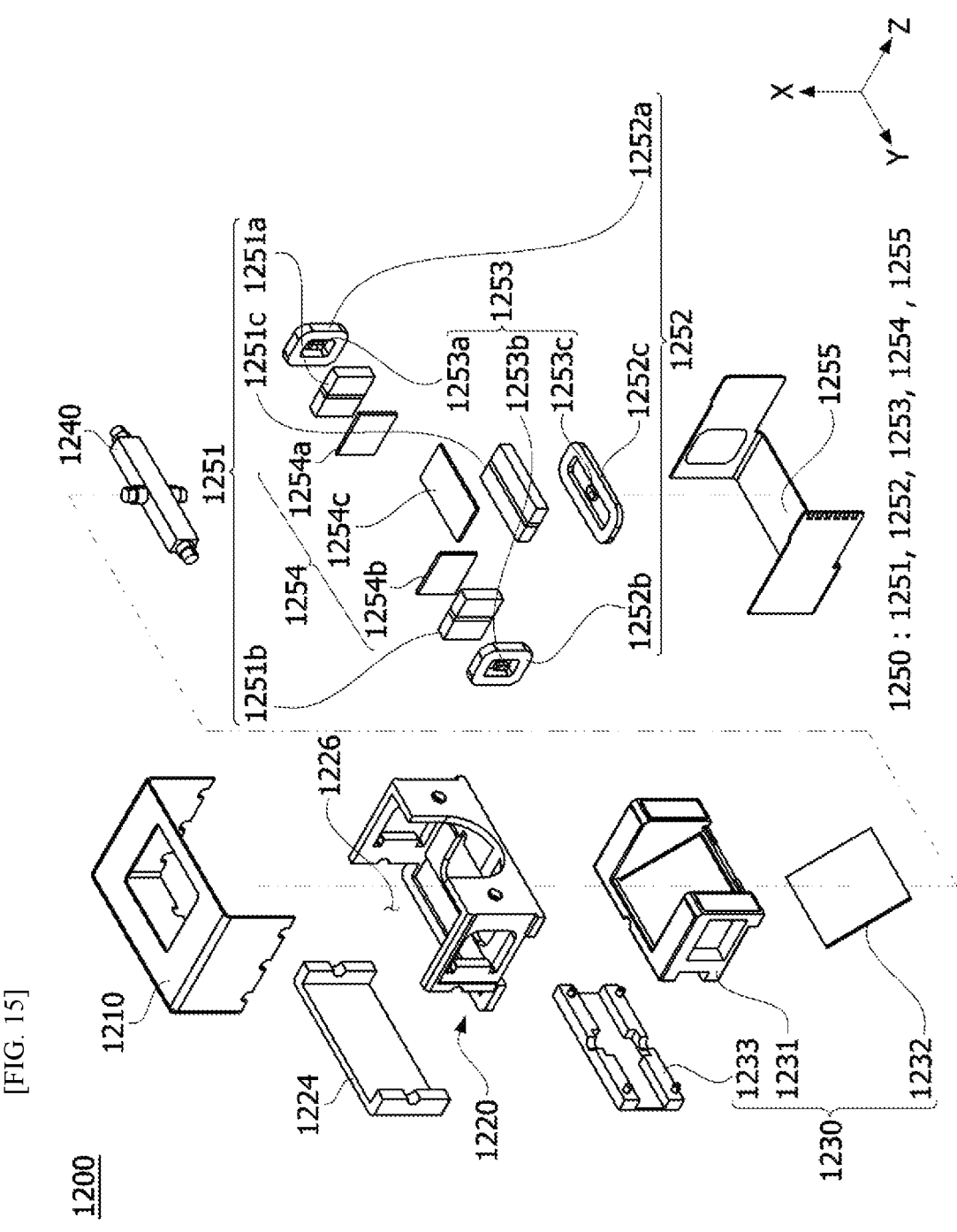

[FIG. 16a]
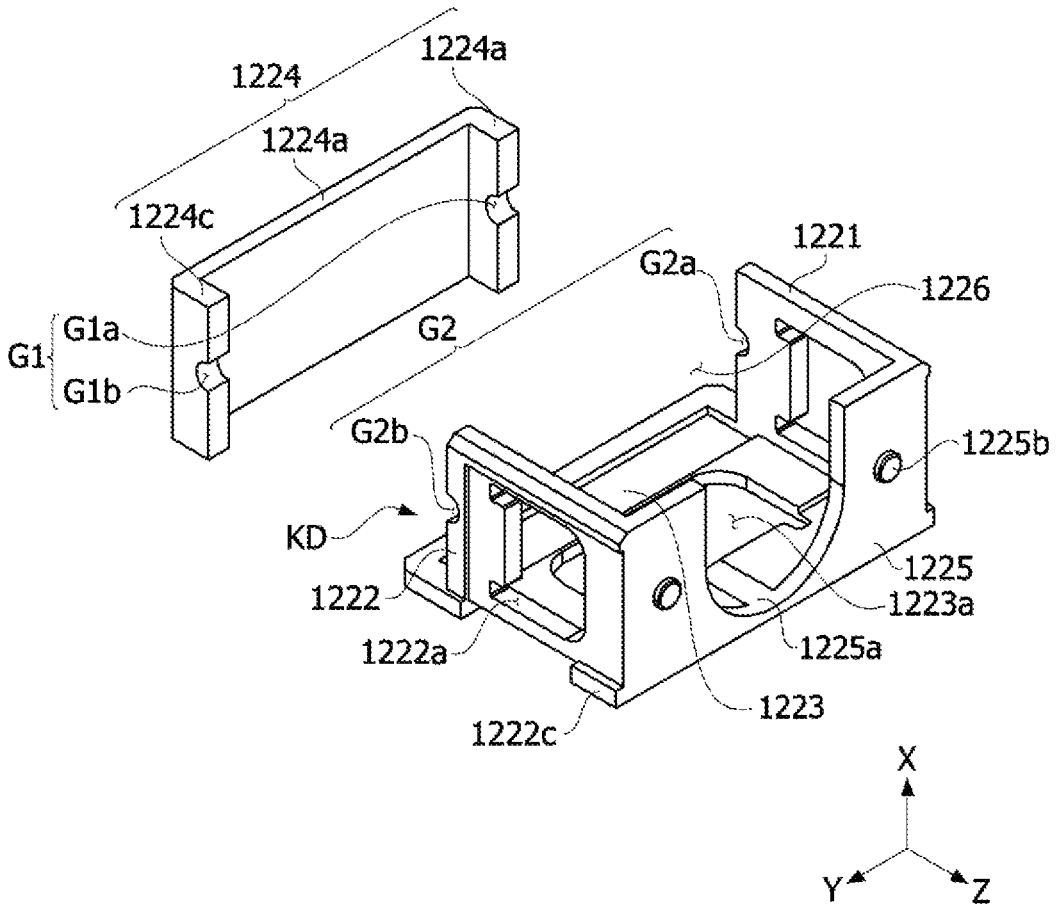
[FIG. 16b]
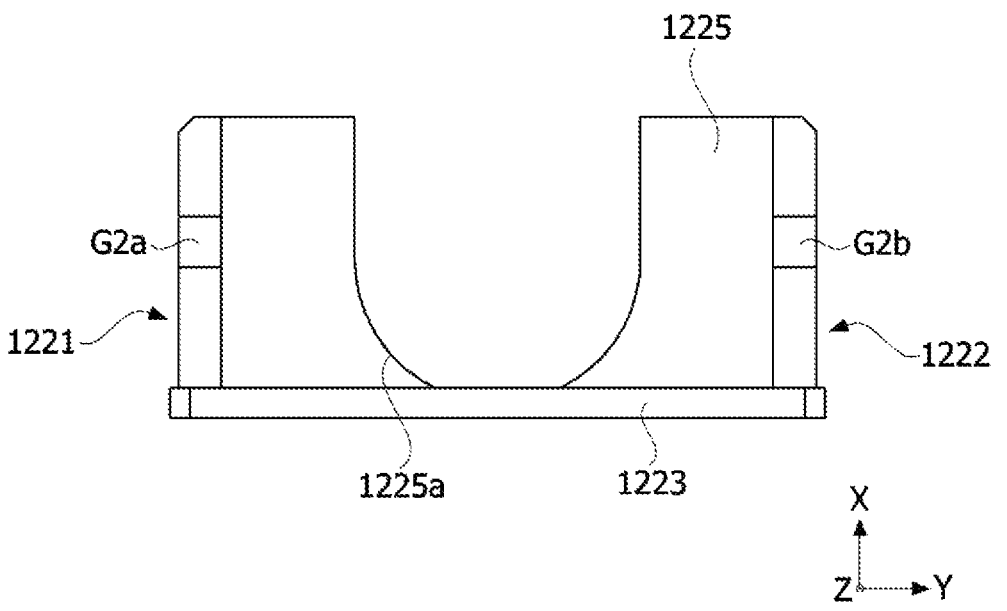

[FIG. 16c]
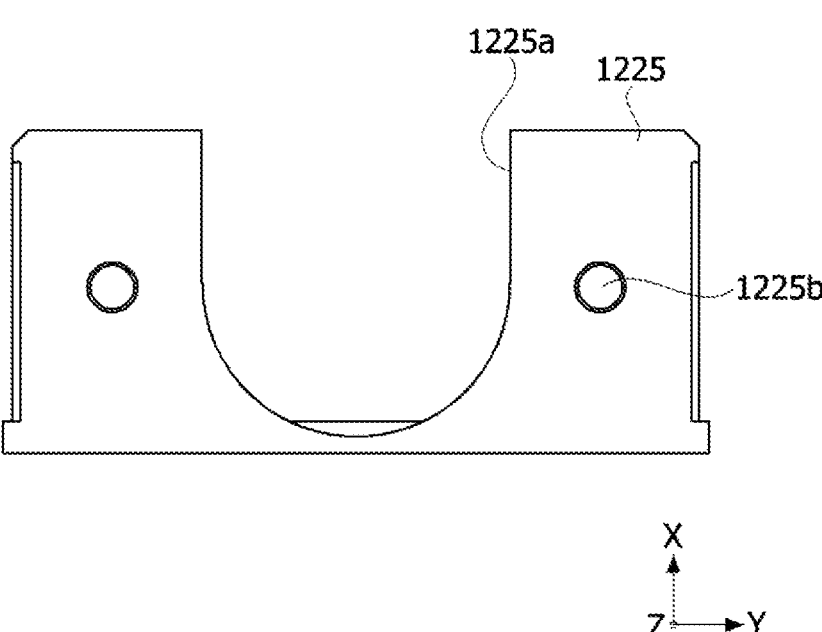

[FIG. 16d]
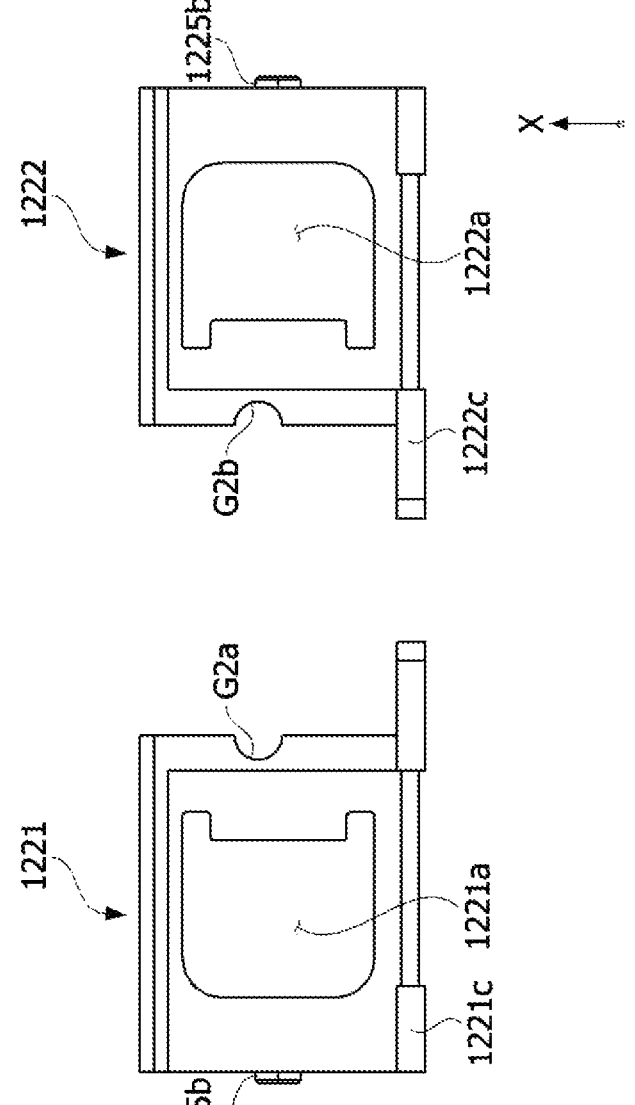

[FIG. 16e]
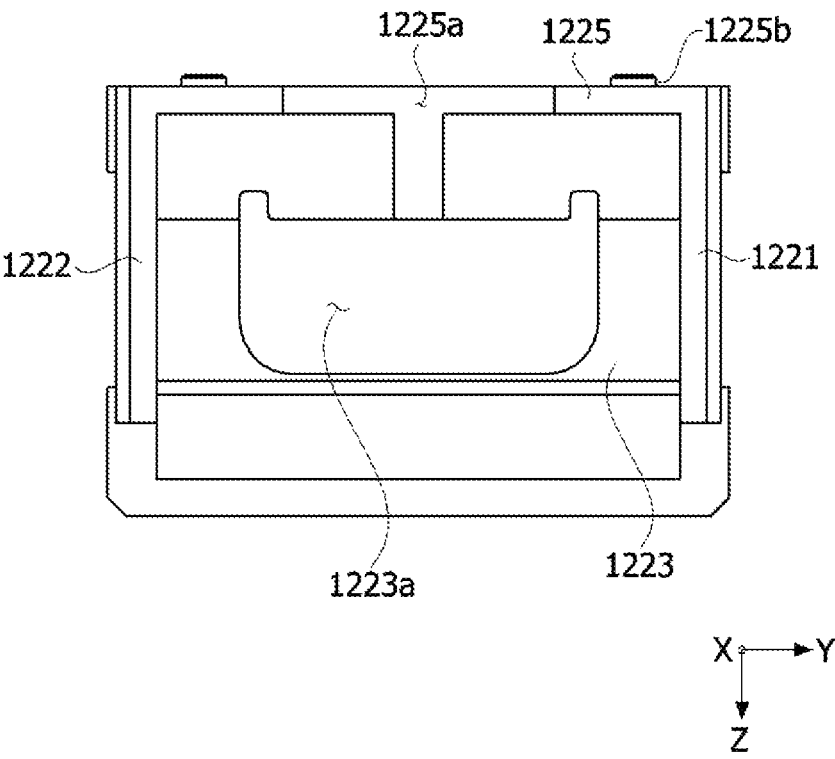
[FIG. 16f]
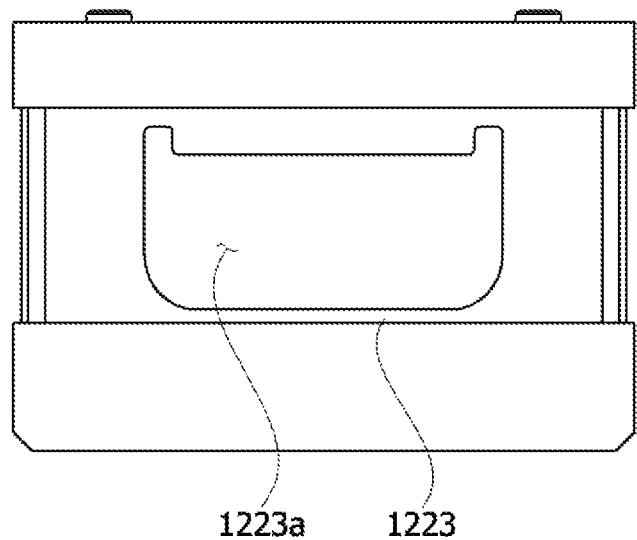
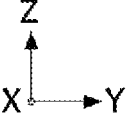

[FIG. 16g]
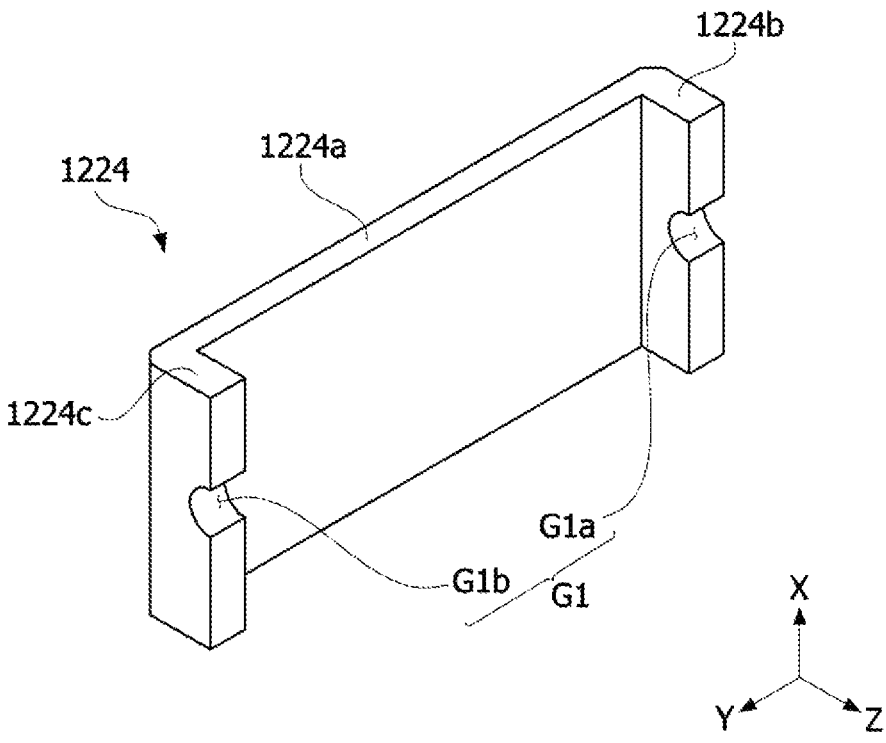
[FIG. 16h]
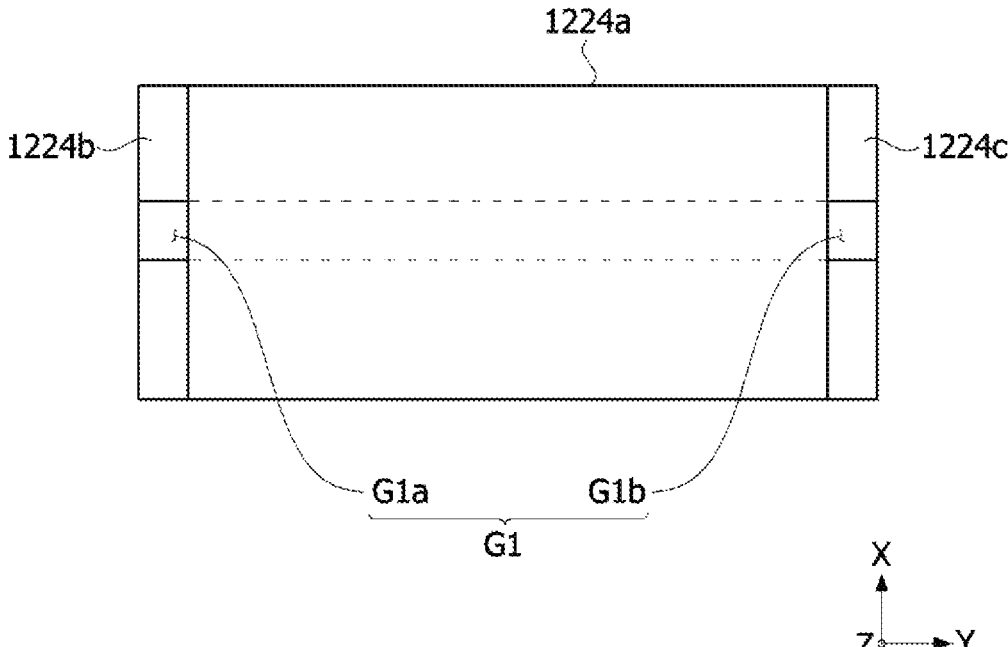

[FIG. 17a]
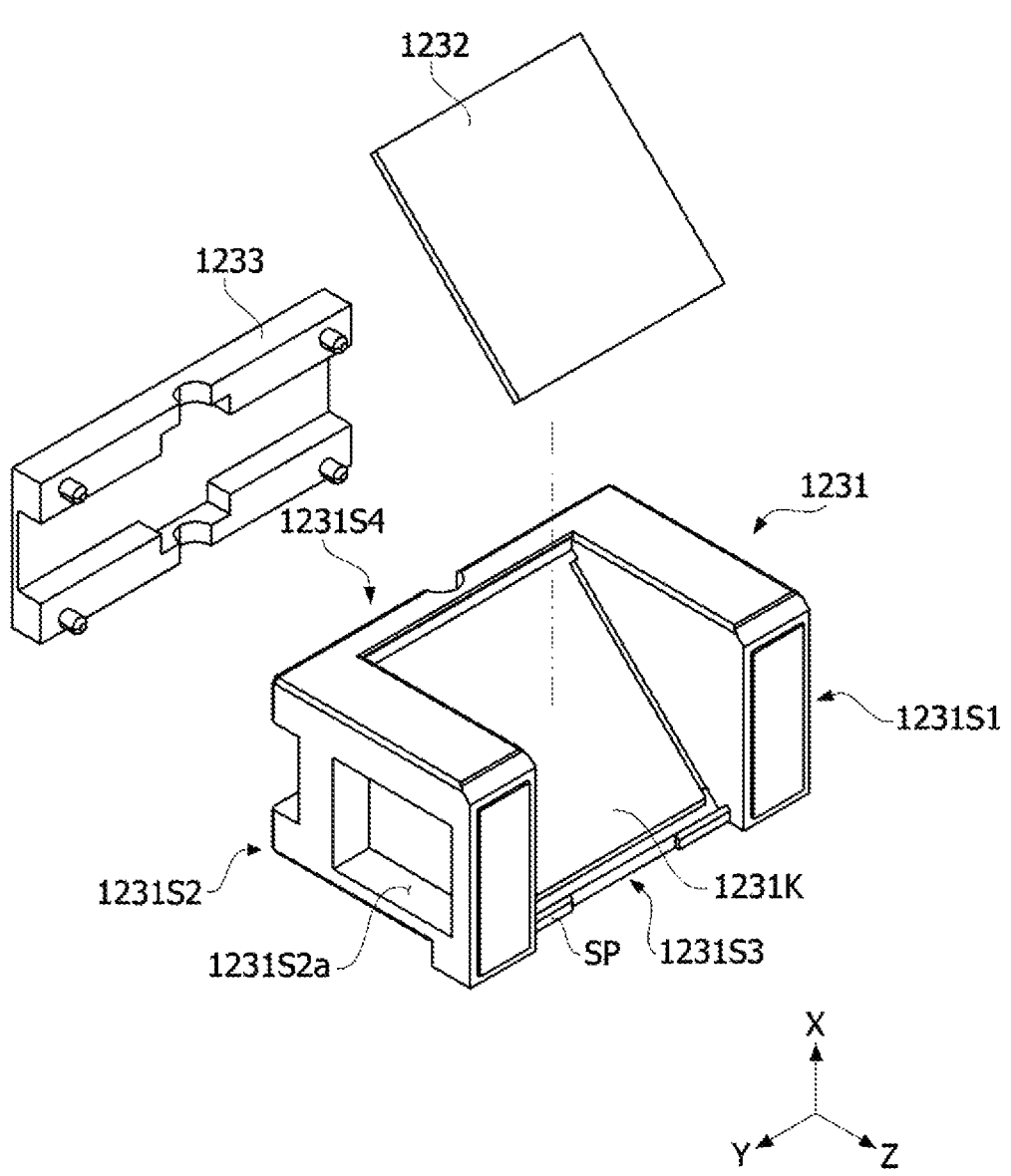

[FIG. 17b]
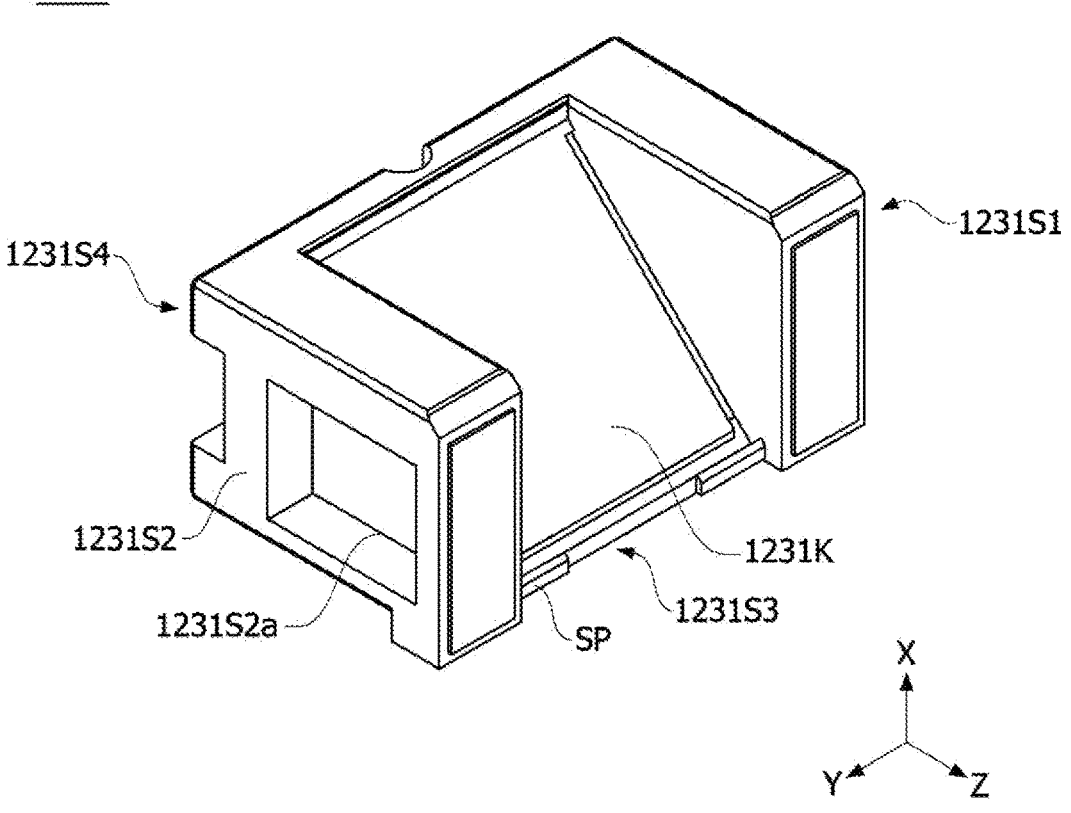
[FIG. 17c]
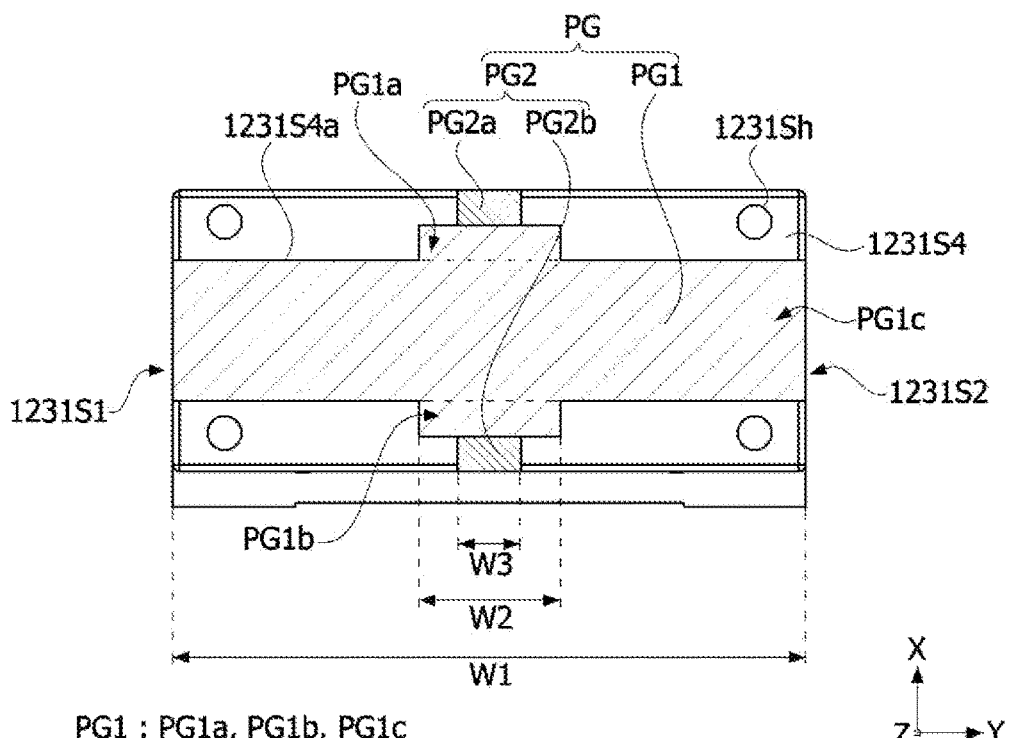
PG1 : PG1a, PG1b, PG1c

[FIG. 17d]
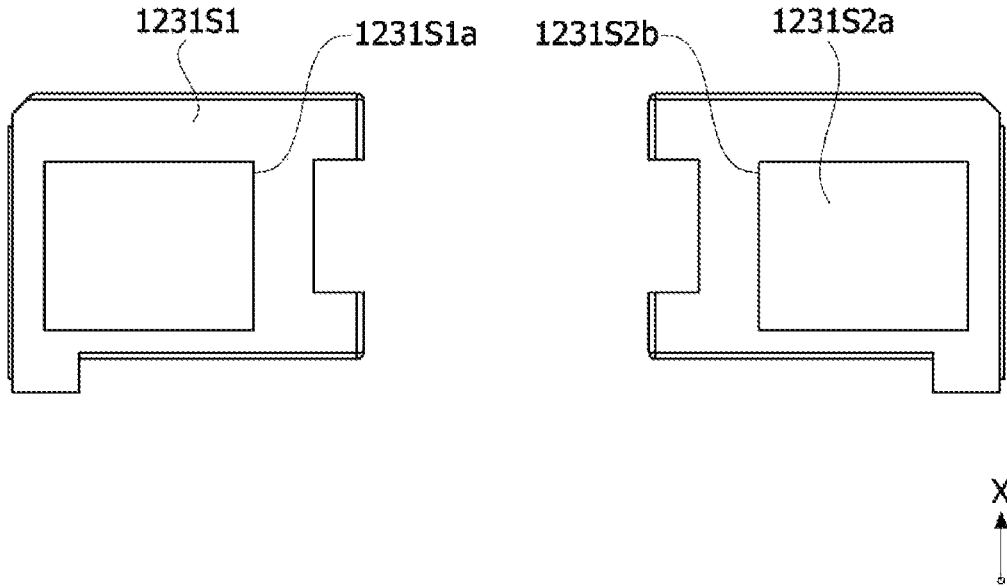
[FIG. 17e]
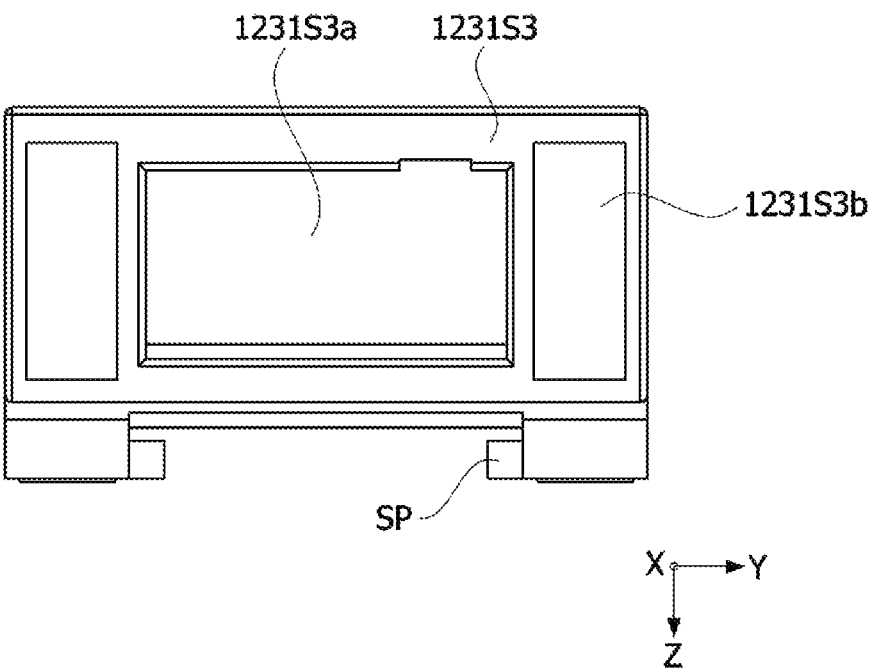

[FIG. 17f]
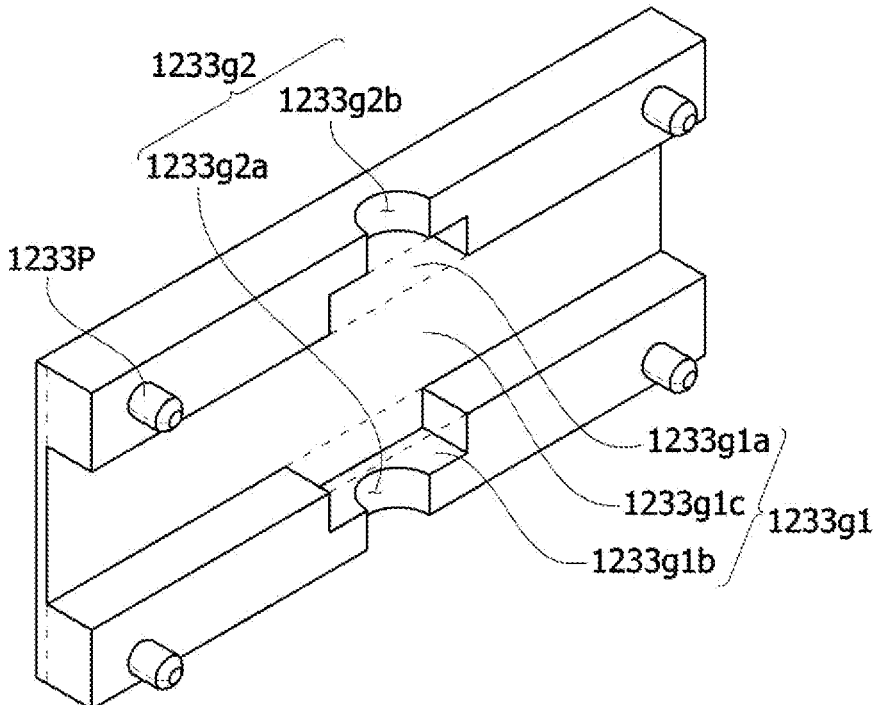
1233g : 1233g1, 1233g2
[FIG. 17g]
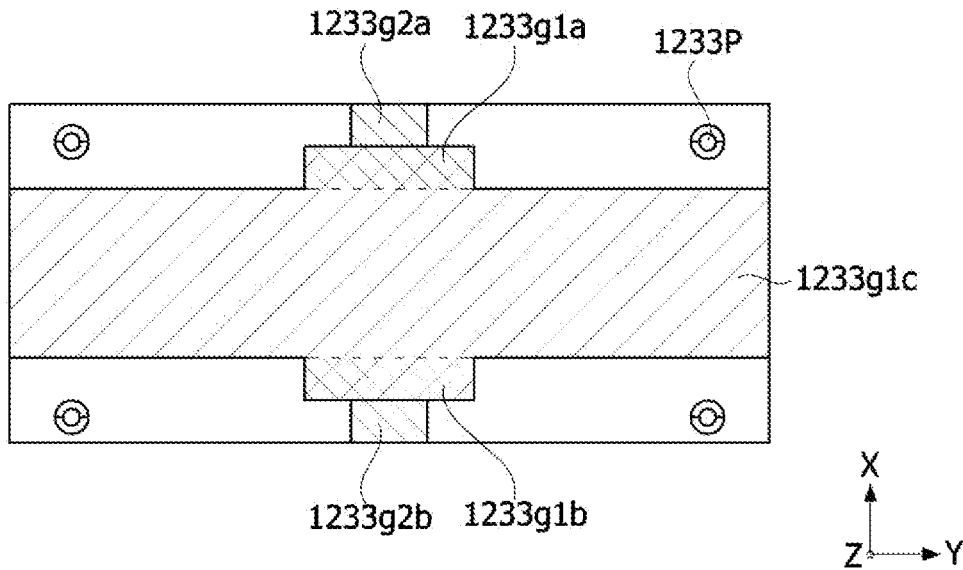

[FIG. 17h]
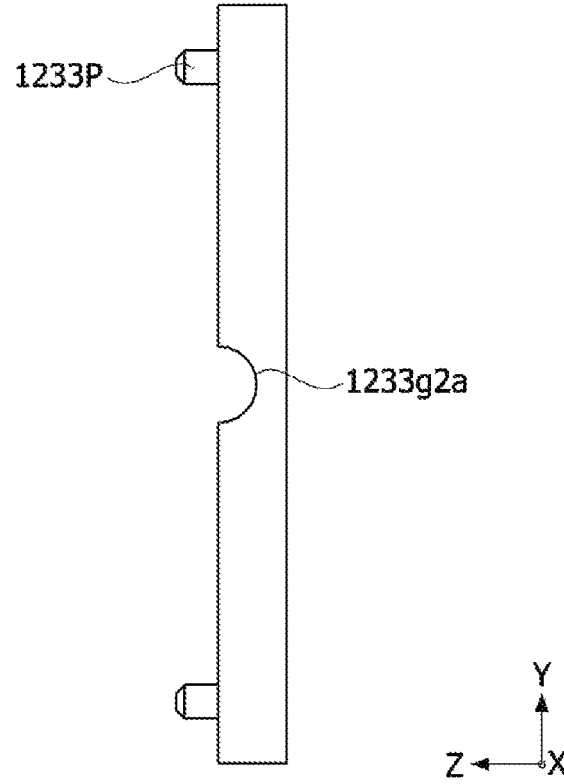
[FIG. 17i]
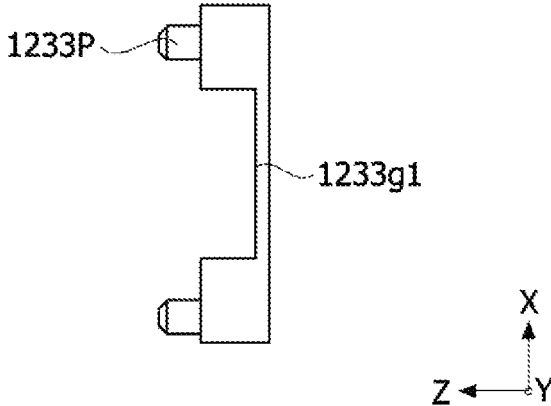

[FIG. 18a]
1240
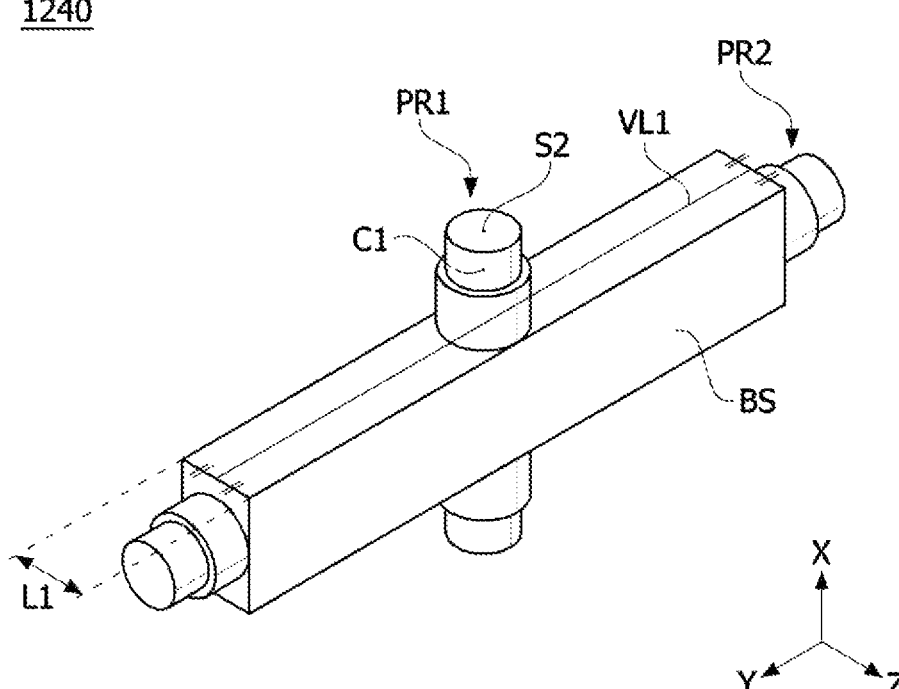

[FIG. 18b]
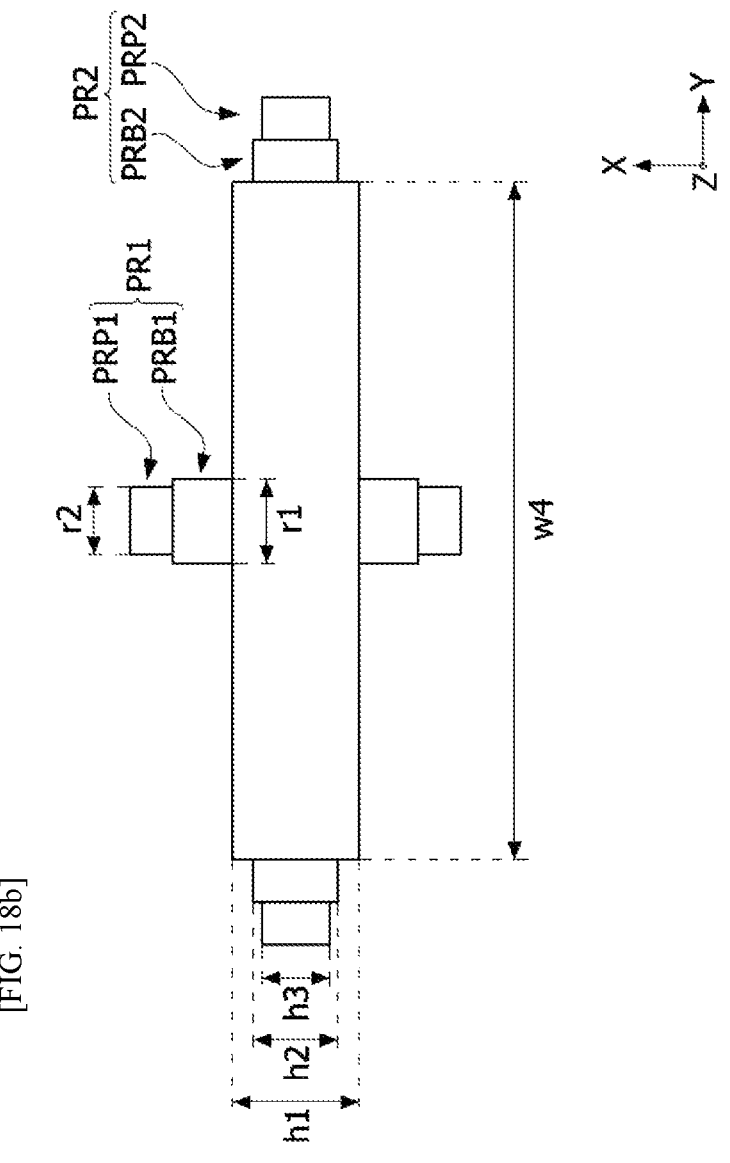

[FIG. 18c]
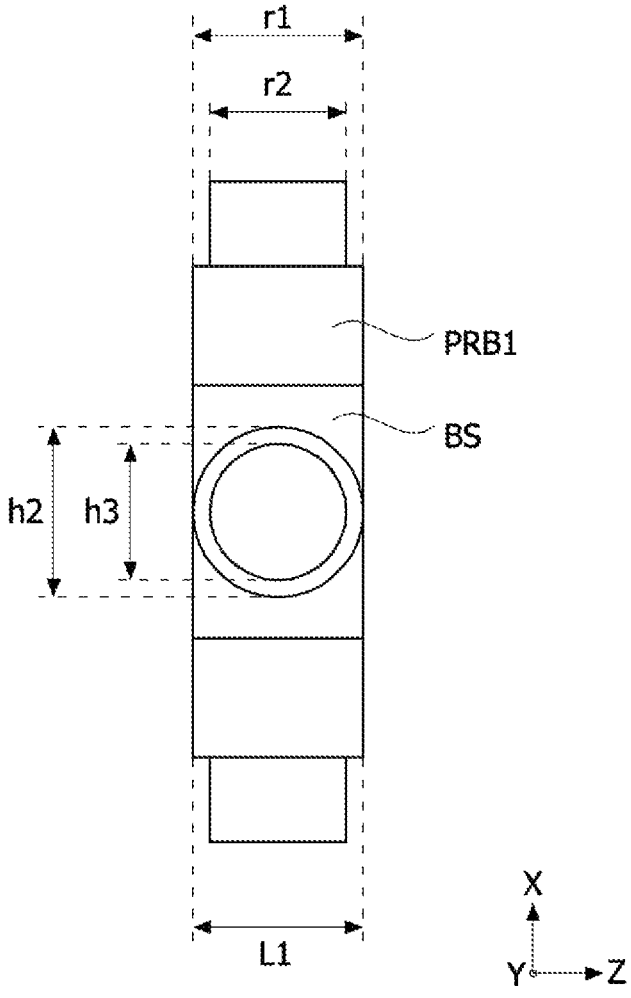
[FIG. 18d]
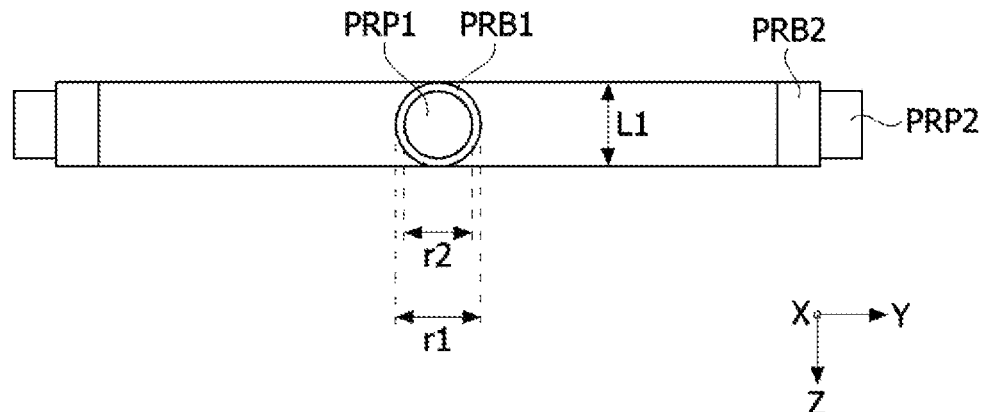

[FIG. 19]
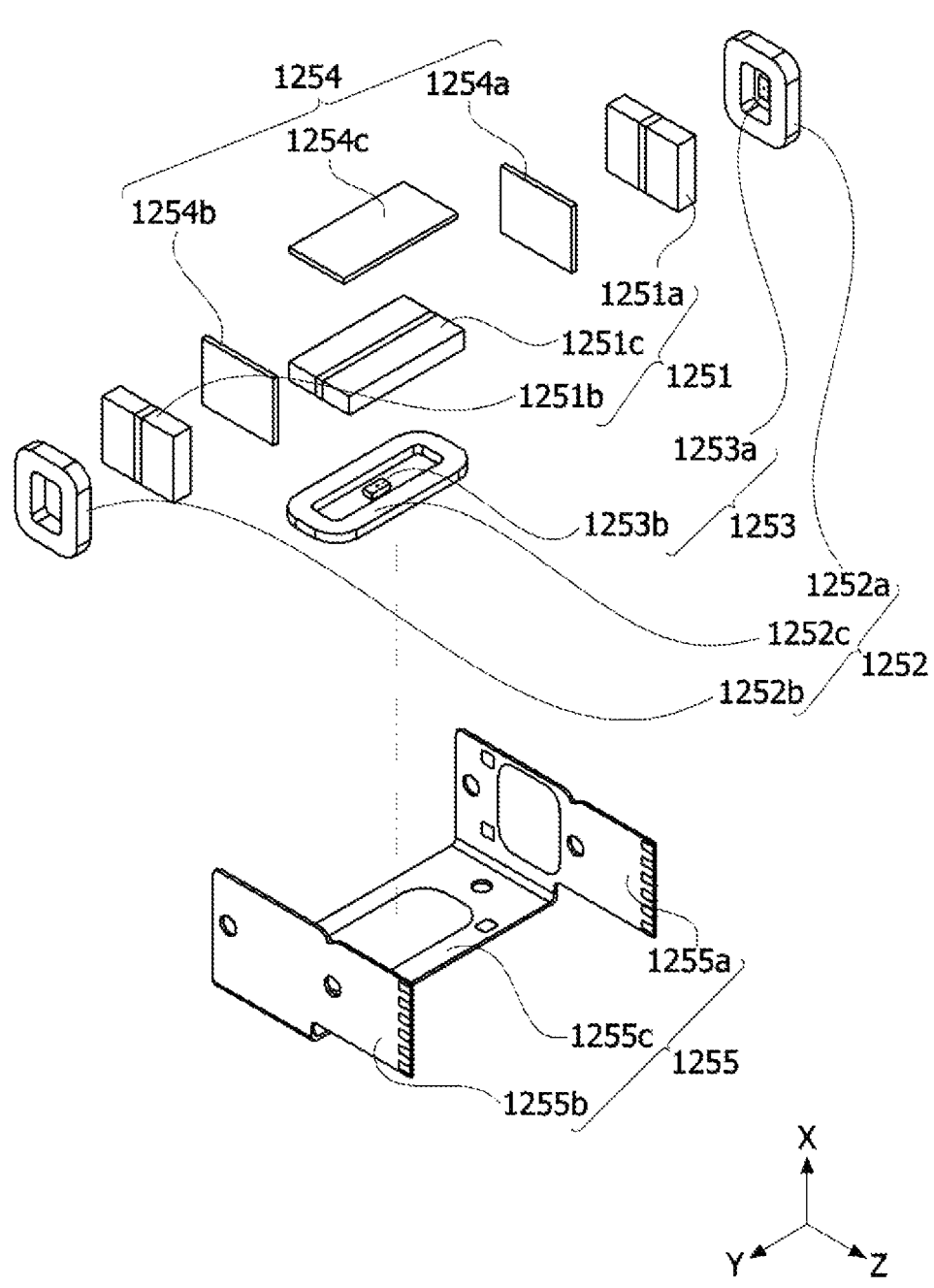

[FIG. 20]
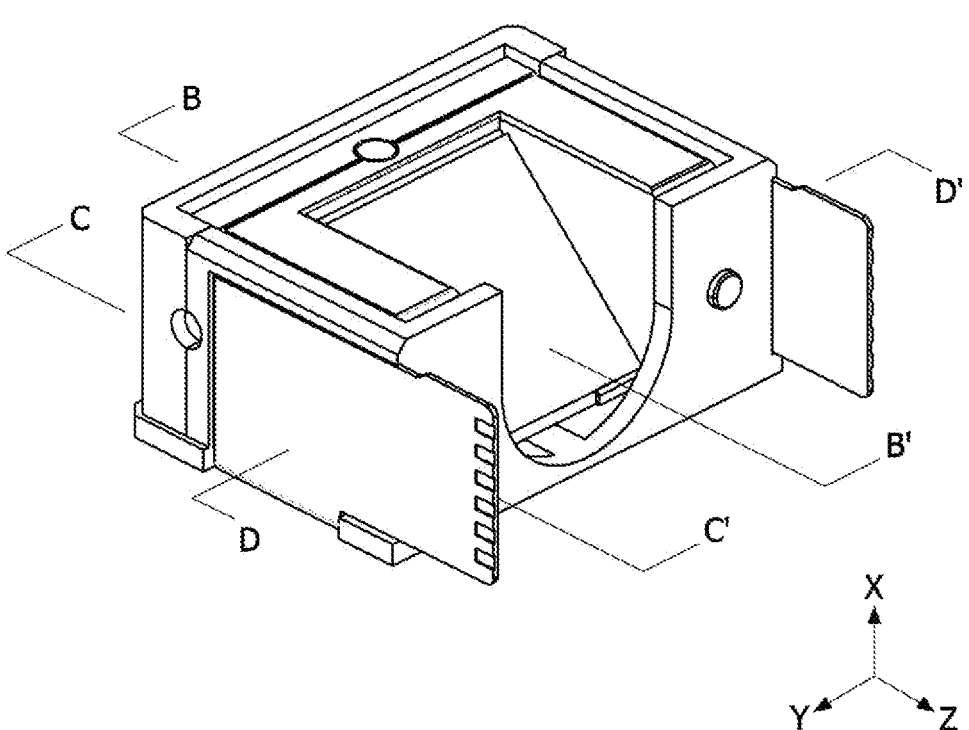

[FIG. 21a]
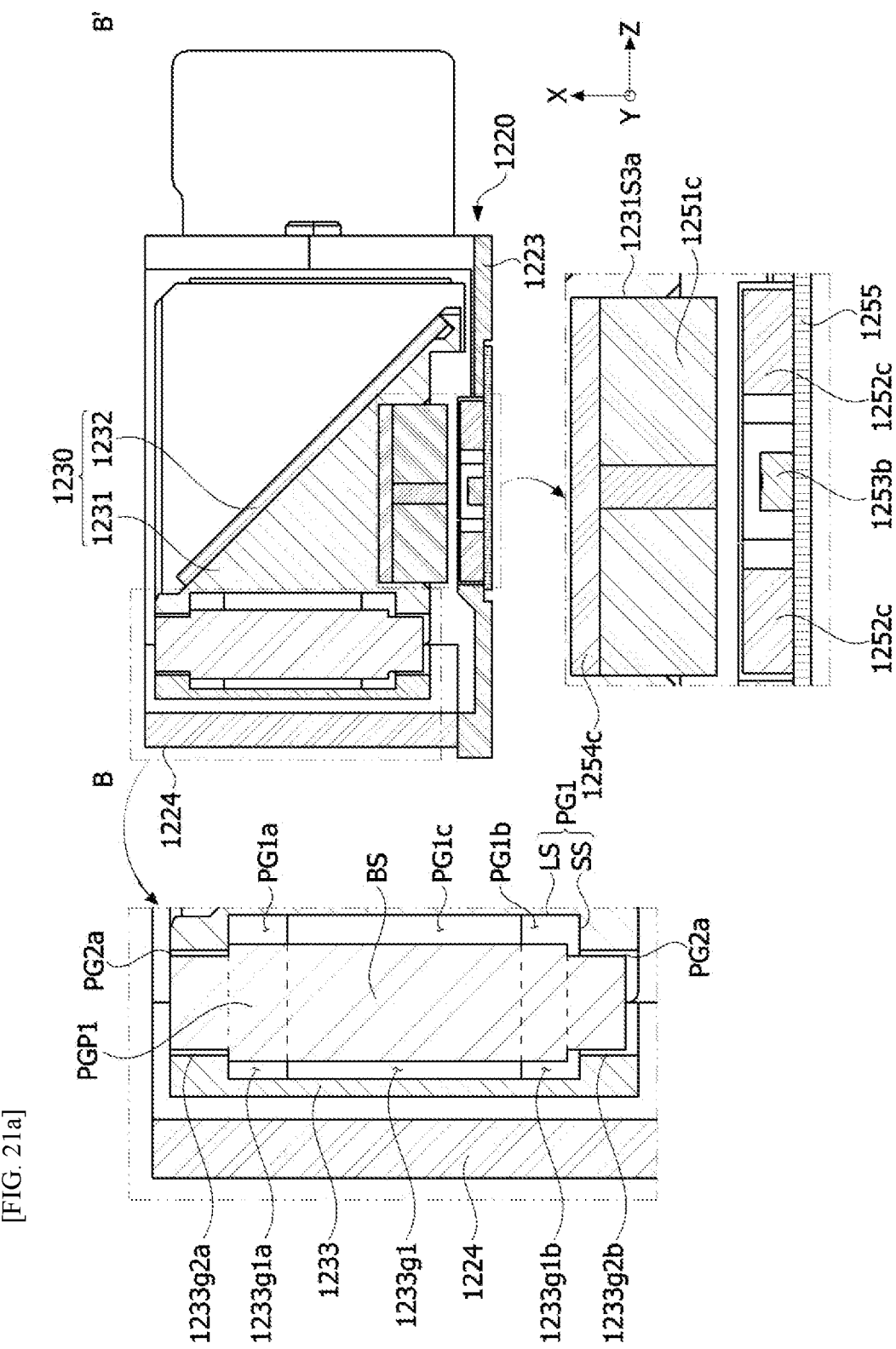

[FIG. 21b]
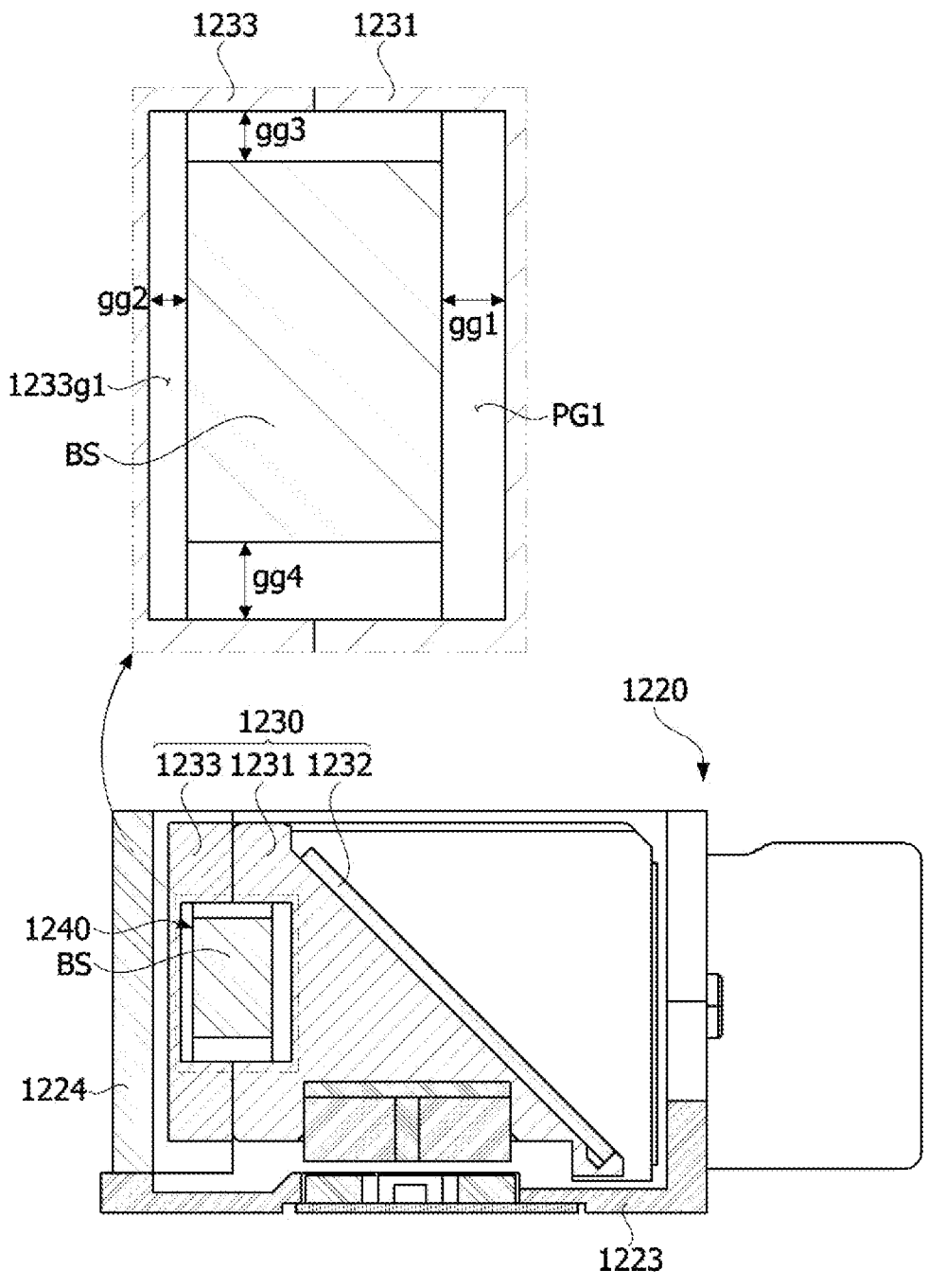

[FIG. 21c]
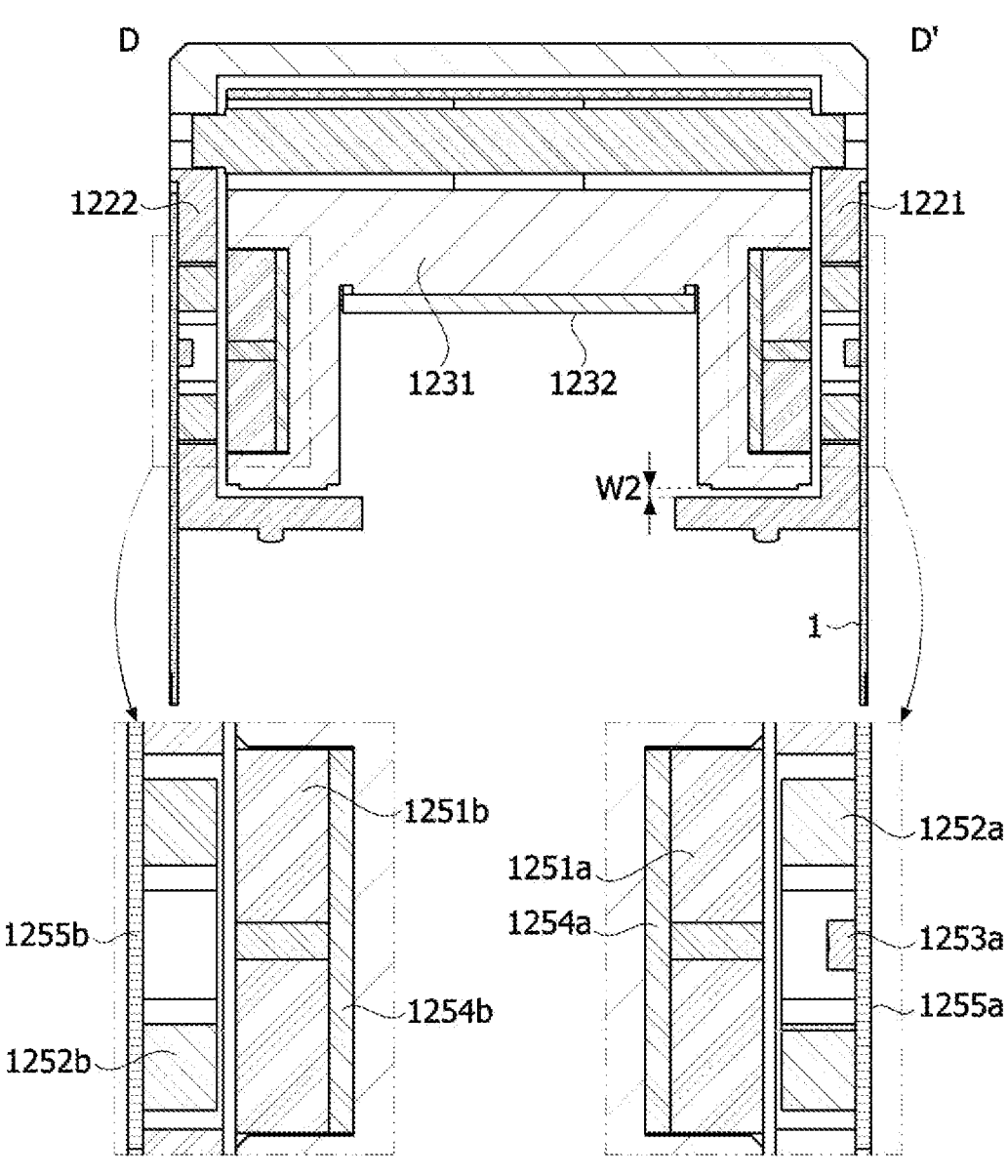

[FIG. 22]
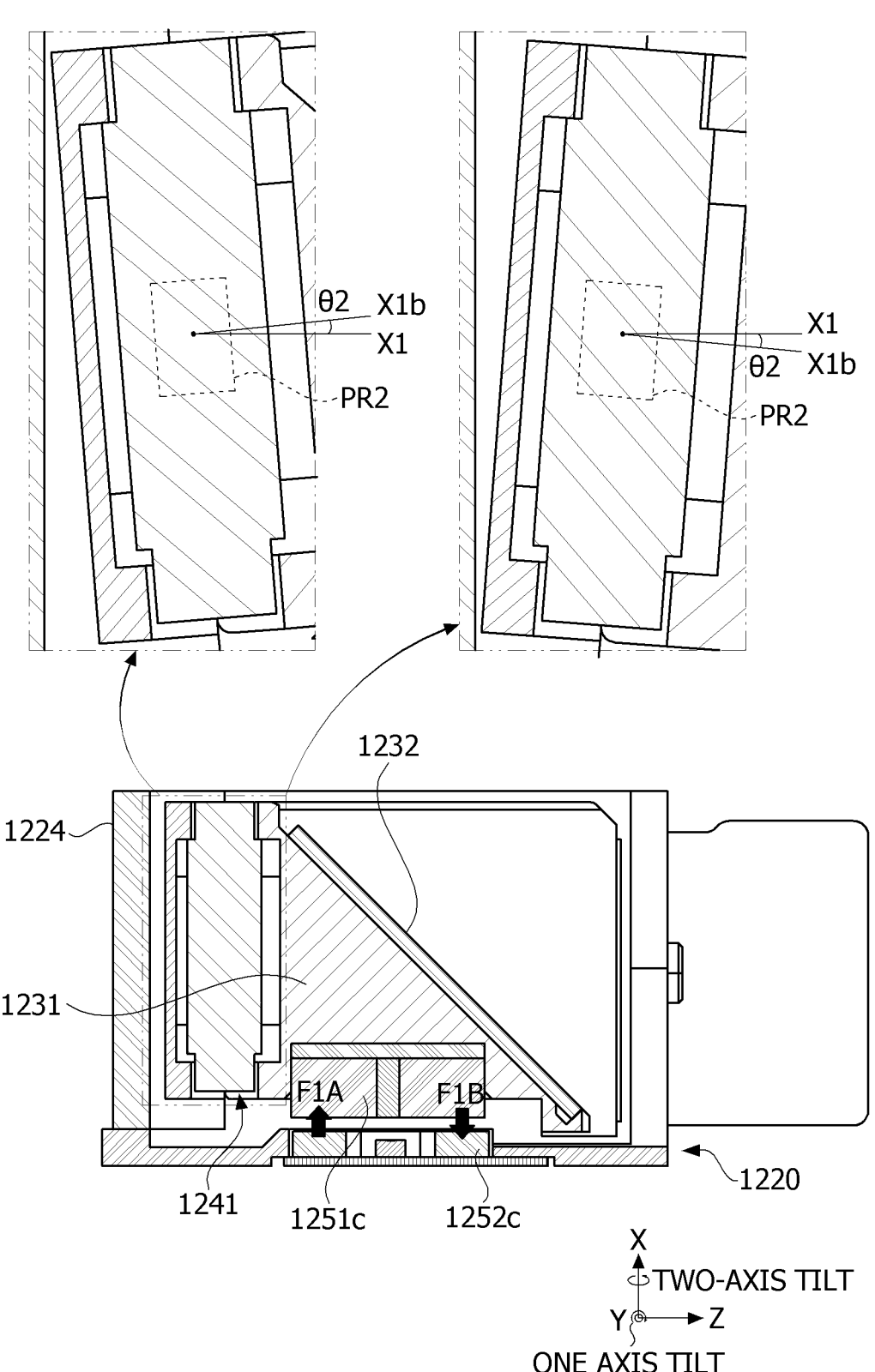

[FIG. 23]
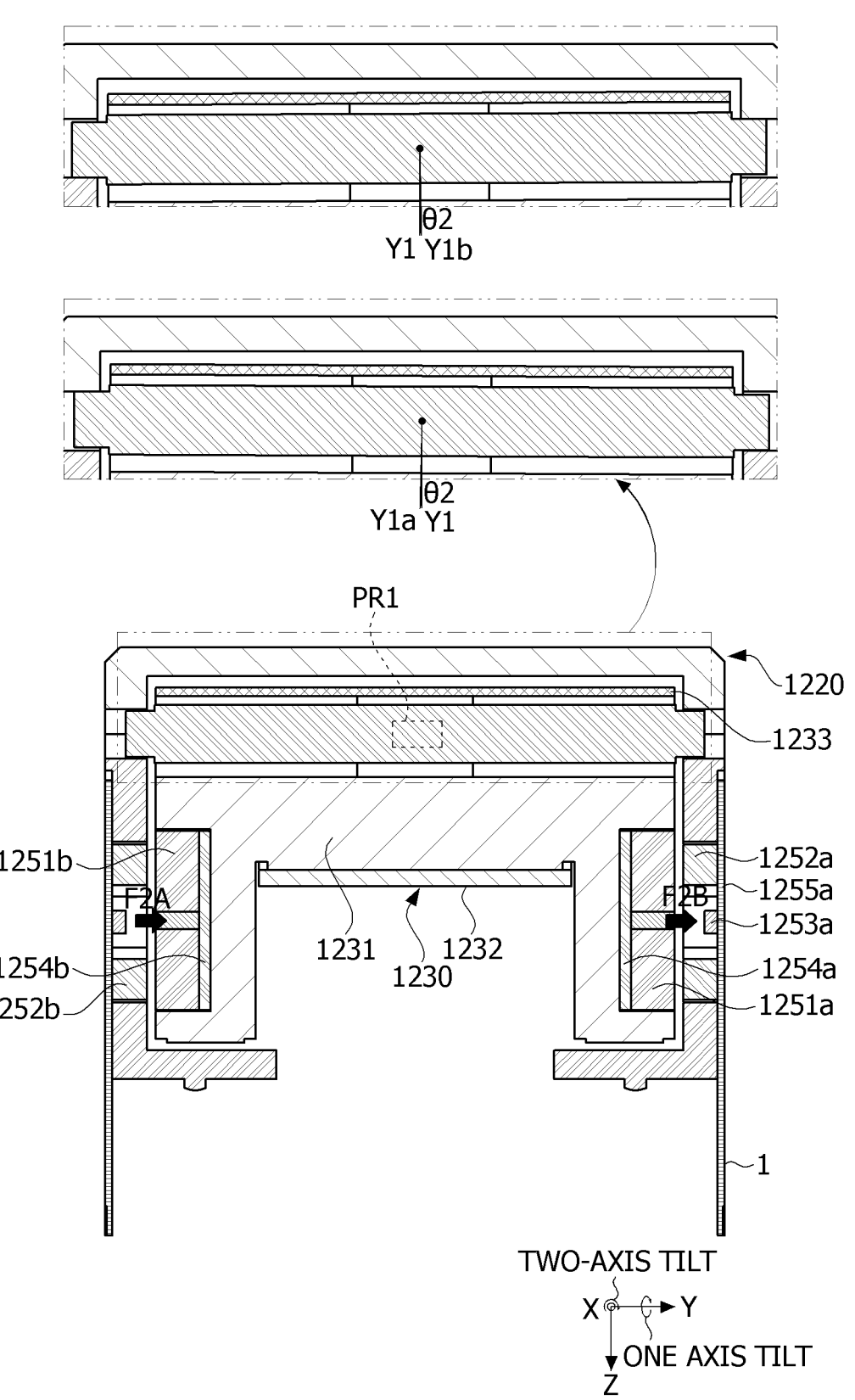

[FIG. 24]
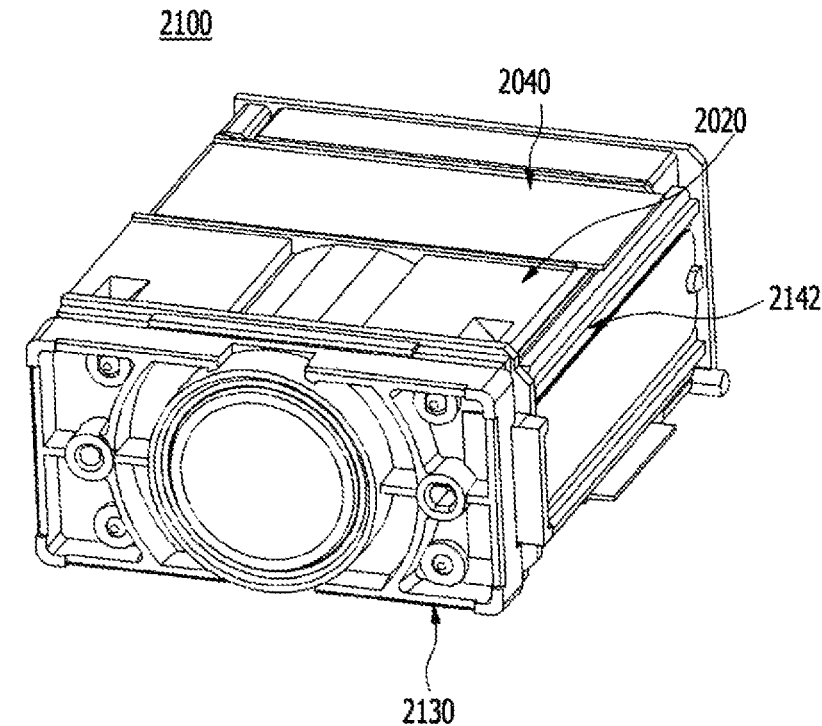
[FIG. 25]
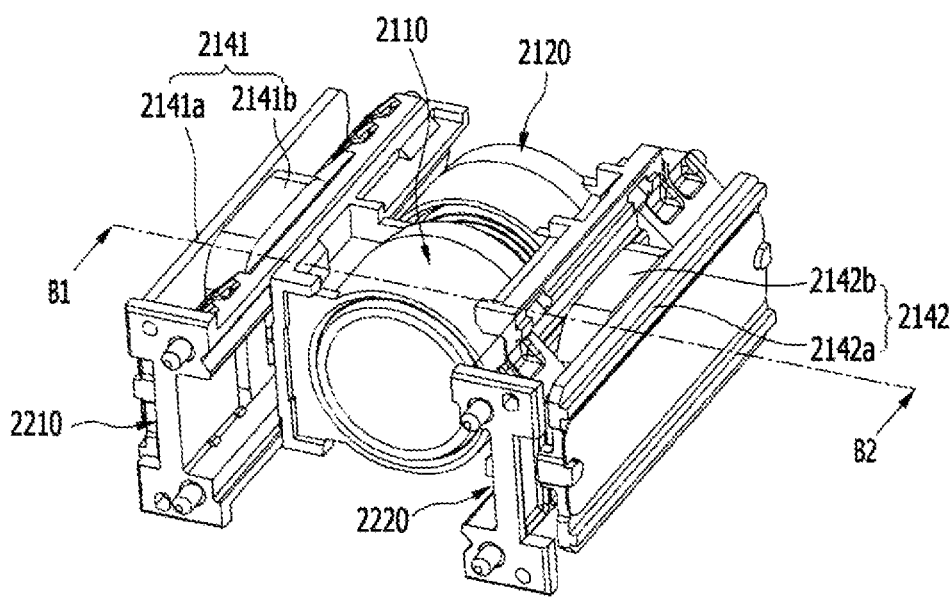

[FIG. 26]
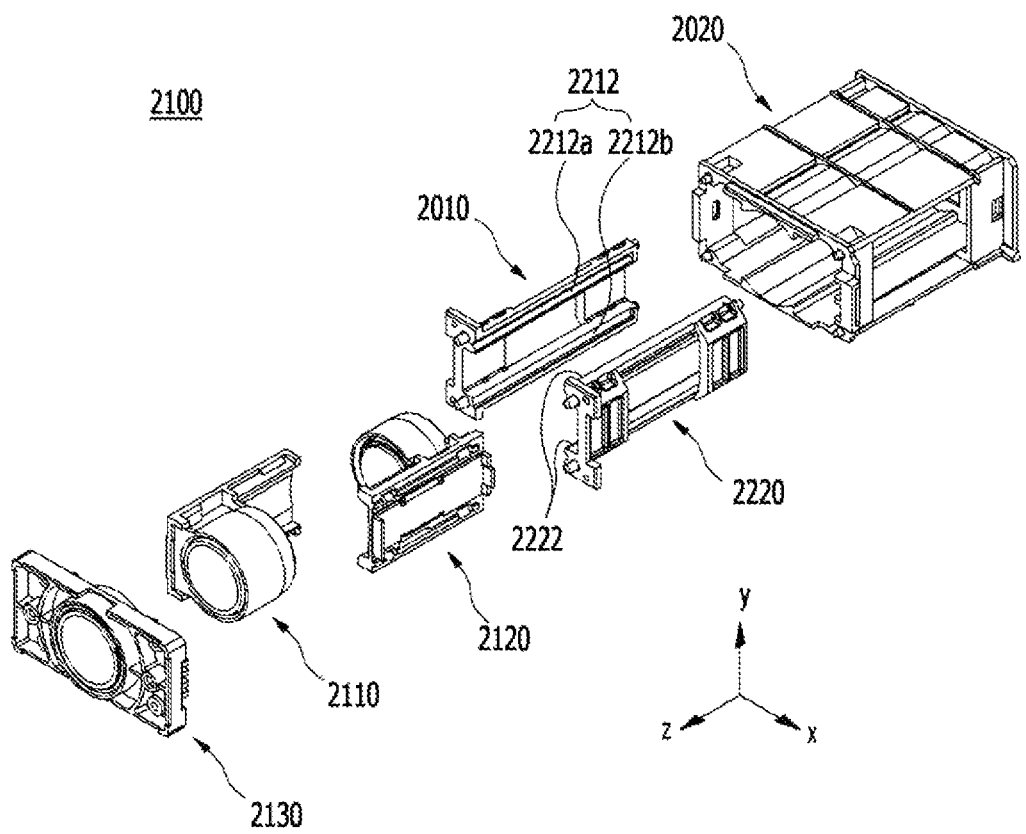
[FIG. 27a]
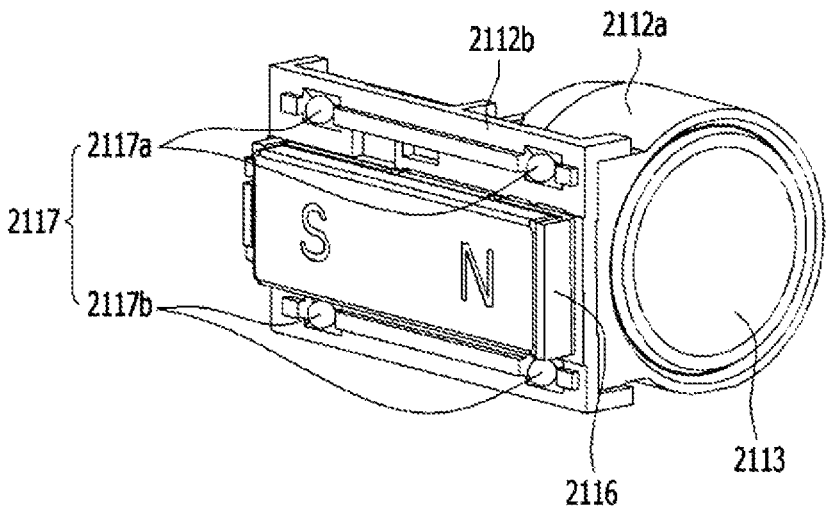

[FIG. 27b]
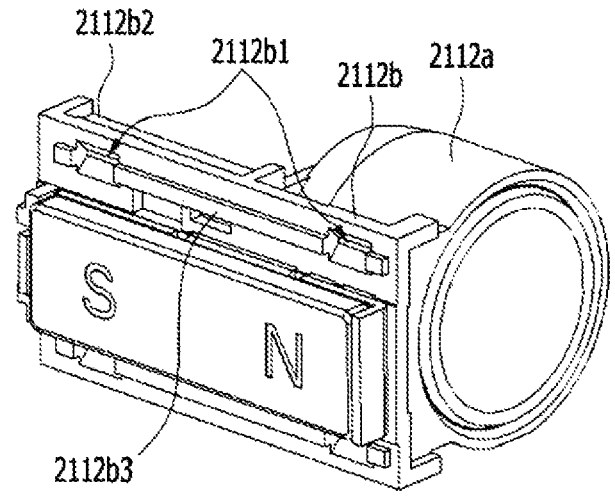
[FIG. 28]
2130
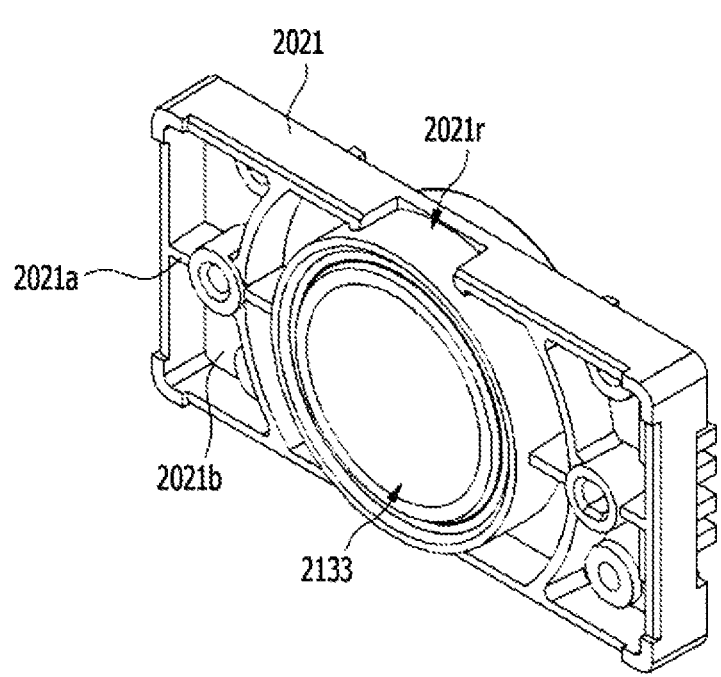

[FIG. 29]
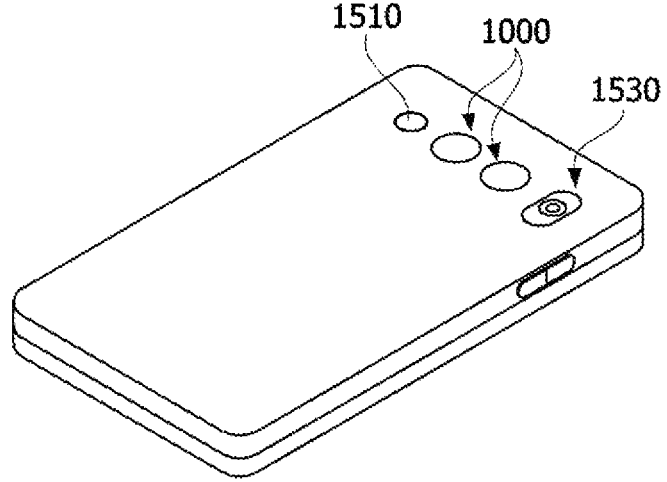
[FIG. 30]
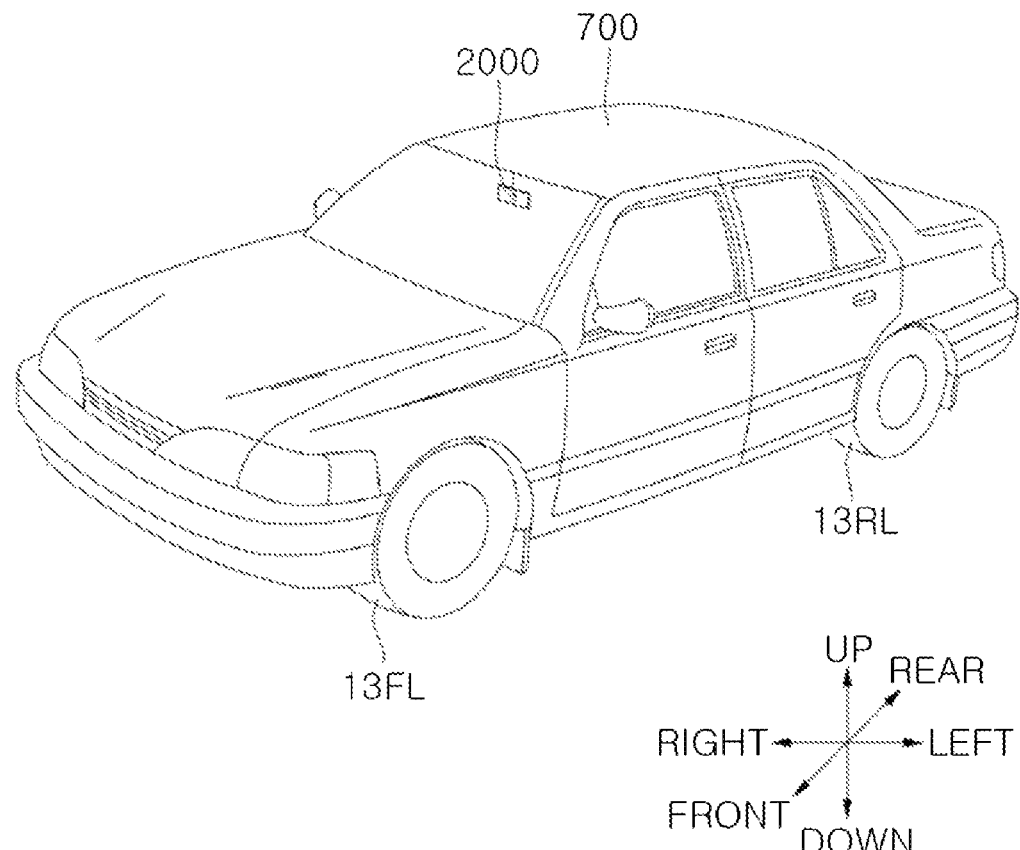

CAMERA ACTUATOR AND CAMERA DEVICE COMPRISING SAME

CROSS REFERENCE TO RELATED APPLICATIONS

This application is the National Phase of PCT International Application No. PCT/KR2021/005295, filed on Apr. 27, 2021, which claims priority under 35 U.S.C. 119(a) to Patent Application Nos. 10-2020-0051593, filed in the Republic of Korea on Apr. 28, 2020 and 10-2020-0053858, filed in the Republic of Korea on May 6, 2020, all of which are hereby expressly incorporated by reference into the present application.

TECHNICAL FIELD

The present invention relates to camera actuator and a camera device including the same.

BACKGROUND ART

Cameras are devices which capture images or moving images of subjects and are installed in portable devices, drones, vehicles, and the like. In order to improve the quality of an image, a camera device may have an image stabilization (IS) function that corrects or prevents image shake caused by user movement, an auto focusing (AF) function that automatically adjusts a distance between an image sensor and a lens so as to arrange a focal length of the lens, and a zooming function that increases or decreases a magnification of a subject using a zoom lens so as to capture an image of a distant subject.

Meanwhile, when the number of pixels of the image sensor increases, the resolution increases, and a size of a pixel decreases. As the size decreases, an amount of light received by the pixel for the same time decreases. Accordingly, as the number of pixels of a camera increases, an image shake phenomenon caused by hand shake occurring due to a decrease in shutter speed in a dark environment may more severely occur. An optical image stabilization (OIS) technique for correcting movement by changing an optical path is a typical image stabilization technique.

According to the general OIS technique, the movement of a camera can be detected by a gyro sensor or the like, and then a lens or a camera module including a lens and an image sensor can be tilted or moved based on the detected movement. When the lens or the camera module including the lens and the image sensor is tilted or moved for OIS, a space for tilting or moving needs to be additionally secured around the lens or the camera module.

Meanwhile, an actuator for OIS may be disposed around the lens. In this case, the actuator for OIS may include actuators responsible for tilting with respect to two axes which are perpendicular to an optical axis.

However, due to recent needs for ultra-slim and ultra-small camera devices, there have been many spatial restrictions on the arrangement of the actuators for OIS and the like, and it may be difficult to secure a sufficient space for a lens or a camera module including a lens and an image sensor to tilt or move for OIS. In addition, as the number of pixels of a camera increases, it is preferable for a size of the lens to increase in order to increase an amount of received light, but there may be a limit on increasing the size of the lens due to a space occupied by the actuator for OIS.

In addition, when a camera module has all of the zooming function, the AF function, and the OIS function, there is also a problem that a magnet for OIS and a magnet for AF or zooming are closely disposed to cause a magnetic field interference.

Technical Problem

The present invention is directed to providing a camera actuator to be applied to ultra-slim, ultra-small, and high-resolution cameras.

Technical Solution

One aspect of the present invention provides a camera actuator including a housing, a mover on which a reflective member is disposed, a guide part disposed between the housing and the mover, and a driving part which drives the mover, wherein the guide part includes a support part, a first elastic part coupled to the support part and the mover, and a second elastic part coupled to the support part and the housing, the first elastic part tilts the mover with respect to a first axis, and the second elastic part tilts the mover with respect to a second axis perpendicular to the first axis.

The first elastic part and the second elastic part may be disposed in directions perpendicular to each other.

The support part may include a first support part extending in a second axis direction and a second support part extending in a first axis direction.

The first support part may be disposed apart from a line, which bisects the mover in the first axis direction, in the first axis direction.

The first elastic part may include a first pattern disposed in the second axis direction, the second elastic part may include a second pattern disposed in the first axis direction, and a third direction may be a direction from the guide part toward the mover and is perpendicular to the first axis direction and the second axis direction.

The housing may include a coupling hole facing the first support part, the first elastic part may be coupled to the first support part and the coupling hole, and the first pattern may be disposed between the first support part and the coupling hole.

The first pattern may be symmetrically disposed with respect to the first axis direction.

The first elastic part may include a first pattern region, a 1-1 coupling region, and a 1-2 coupling region disposed in the third direction, the first pattern may be disposed in the first pattern region, the 1-1 coupling region may be disposed between the first pattern region and the mover, and the 1-2 coupling region may be disposed between the first pattern region and the housing.

The second elastic part may be coupled to the second support part and a lower surface of the mover, and the second pattern may be disposed between the second support part and the lower surface of the mover.

The second pattern may be symmetrically disposed with respect to the first direction.

The second elastic part may include a second pattern region, a 2-1 coupling region, and a 2-2 coupling region in the third direction, the second pattern may be disposed in the second pattern region, the 2-1 coupling region may be coupled to the second support part between the second pattern and the housing, and the 2-2 coupling region may be disposed between the second pattern region and the mover.

Each of the first pattern and the second pattern may be provided as at least one of a groove and a hole, and the support part may be disposed apart from the mover and the housing in the third direction.

The driving part may include driving magnets and driving coils, the driving magnets may include a first magnet, a second magnet, and a third magnet, the driving coils may include a first coil, a second coil, and a third coil, the first magnet and the second magnet may be symmetrically disposed with respect to the first axis on the mover, the first coil and the second coil may be symmetrically disposed with respect to the first axis between the housing and the mover, the third magnet may be disposed on a bottom surface of the mover, and the third coil may be disposed on a bottom surface of the housing.

Another aspect of the present invention provides a camera actuator including a housing, a mover on which a reflective member is disposed, and a guide part disposed between the housing and the mover, wherein the guide part includes a support part, a first elastic part coupled to a first surface of the support part and a lower side of the mover, and a second elastic part coupled to a second surface of the support part and the housing, the first surface and the second surface of the support part are perpendicular to each other, and one surface of the first elastic part coupled to the first surface of the support part is perpendicular to one surface of the second elastic part coupled to the second surface of the support part.

The first elastic part and the second elastic part may be disposed apart from each other.

Still another aspect of the present invention provides a camera actuator including a housing, a mover on which an optical member is seated and which is disposed in the housing, a rotating plate disposed between the housing and the mover, and a driving part which is disposed in the housing and drives the mover, wherein the rotating plate includes a base, first protruding parts disposed on an upper surface and a lower surface, which face each other, in a first direction on the base, and second protruding parts disposed on side surfaces facing each other in a second direction on the base, the first direction and the second direction are perpendicular to a third direction, and the third direction is a direction from the rotating plate toward the optical member.

The mover may include an accommodation groove which accommodates the rotating plate.

The first protruding parts may include first base protrusions disposed on the base and first extending protrusions disposed on the first base protrusions, and the second protruding parts may include second base protrusions disposed on the base and second extending protrusions disposed on the second base protrusions.

The accommodation groove may include a first accommodation groove, which accommodates the base, the first base protrusions, and the second base protrusions, and a second accommodation groove which accommodate the first extending protrusions.

A bottom surface of the first accommodation groove may be disposed apart from the base, the first base protrusions, and the second base protrusions in the third direction.

At least a part of a side surface of the first accommodation groove may overlap the base, the first base protrusions, and the second base protrusions in the first direction.

The second accommodation groove may overlap the first base protrusions and the base in the third direction.

The second accommodation groove may correspond to the first extending protrusions.

A length of the second accommodation groove in the third direction may be smaller than a length of the first accommodation groove in the third direction.

A diameter of each of the first base protrusions may be greater than a diameter of each of the first extending protrusions, and a diameter of each of the second base protrusions may be greater than a diameter of each of the second extending protrusions.

Advantageous Effects

According to embodiments of the present invention, a camera actuator which can be applied to ultra-slim, ultra-small, and high-resolution cameras can be provided. Particularly, an actuator for optical image stabilization (OIS) can be effectively disposed even without increasing the overall size of a camera module.

According to the embodiments of the present invention, magnetic field interference does not occur between tilting in an X axis direction and tilting in a Y axis direction, the tilting in the X axis direction and the tilting in the Y axis direction can be implemented through a stable structure, magnetic field interference also does not occur between an actuator for OIS and an actuator for auto focusing (AF) or zooming, and thus a precise OIS function can be implemented.

According to the embodiments of the present invention, since a size limitation of a lens is addressed, a sufficient light amount can be secured, and thus OIS with low power consumption can be implemented.

DESCRIPTION OF DRAWINGS

FIG. 1 is a perspective view illustrating a camera module according to an embodiment.

FIG. 2A is a perspective view illustrating a state in which a shield can is removed from the camera module illustrated in FIG. 1.

FIG. 2B is a plan view illustrating the camera module illustrated in FIG. 2A.

FIG. 3A is a perspective view illustrating a first camera module illustrated in FIG. 2A.

FIG. 3B is a side cross-sectional view illustrating the first camera module illustrated in FIG. 3A.

FIG. 4 is a perspective view illustrating a second camera actuator according to the embodiment.

FIG. 5 is an exploded perspective view illustrating the second camera actuator according to the embodiment.

FIG. 6A is a perspective view illustrating a housing according to the embodiment.

FIG. 6B is a side view illustrating a fourth housing side portion in the housing according to the embodiment.

FIG. 6C is a side view illustrating a fifth housing side portion.

FIG. 6D is a side view illustrating a first housing side portion and a second housing side portion.

FIG. 6E is a top view illustrating the housing according to the embodiment.

FIG. 6F is a bottom view illustrating the housing according to the embodiment.

FIG. 7A is a perspective view illustrating a mover according to the embodiment.

FIG. 7B is a perspective view illustrating a holder according to the embodiment.

FIG. 7C is a side view illustrating the mover according to the embodiment.

FIG. 7D is a bottom view illustrating the mover according to the embodiment.

FIG. 8A is a perspective view illustrating a guide part according to the embodiment.

FIG. 8B is a perspective view illustrating a support part according to the embodiment.

FIG. 8C is a side view illustrating the support part according to the embodiment.

FIG. 8D is a top view illustrating the support part according to the embodiment.

FIG. 8E is a perspective view illustrating a first elastic part according to the embodiment.

FIG. 8F is a plan view illustrating the first elastic part according to the embodiment.

FIG. 8G is a perspective view illustrating a second elastic part according to the embodiment.

FIG. 8H is a plan view illustrating the second elastic part according to the embodiment.

FIG. 8I is a view illustrating movement of the guide part by the first elastic part according to the embodiment.

FIG. 8J is a view illustrating movement of the guide part by the second elastic part according to the embodiment.

FIG. 8K is a perspective view illustrating a guide part according to another embodiment.

FIG. 9 is a view illustrating a driving part according to the embodiment.

FIG. 10 is a perspective view illustrating a state in which a shield can and a substrate are removed from the second camera actuator according to the embodiment.

FIG. 11A is a cross-sectional view along line BB' in FIG. 10.

FIG. 11B is a cross-sectional view along line CC' in FIG. 10.

FIG. 11C is a cross-sectional view along line DD' in FIG. 10.

FIG. 12 is an exemplary view illustrating movement of the second camera actuator illustrated in FIG. 11A.

FIG. 13 is an exemplary view illustrating movement of the second camera actuator illustrated in FIGS. 11B and 11C.

FIG. 14 is a perspective view illustrating a second camera actuator according to another embodiment.

FIG. 15 is an exploded perspective view illustrating the second camera actuator according to another embodiment.

FIG. 16A is a perspective view illustrating a housing according to another embodiment.

FIG. 16B is a side view illustrating the housing viewed in a direction KD in FIG. 16A.

FIG. 16C is a side view illustrating a fifth housing side portion.

FIG. 16D is a side view illustrating a first housing side portion and a second housing side portion.

FIG. 16E is a top view illustrating the housing according to another embodiment.

FIG. 16F is a bottom view illustrating the housing according to another embodiment.

FIG. 16G is a perspective view illustrating a fourth housing side portion.

FIG. 16H is a view illustrating an inner side surface of the fourth housing side portion.

FIG. 17A is a perspective view illustrating a mover according to another embodiment.

FIG. 17B is a perspective view illustrating a holder according to another embodiment.

FIGS. 17C and 17D are side views illustrating the mover according to the embodiment.

FIG. 17E is a bottom view illustrating the mover according to another embodiment.

FIG. 17F is a perspective view illustrating a plate cover according to another embodiment.

FIG. 17G is one side view illustrating the plate cover according to another embodiment.

FIG. 17H is a top view illustrating the plate cover according to another embodiment.

FIG. 17I is another side view illustrating the plate cover according to another embodiment.

FIG. 18A is a perspective view illustrating a rotating plate according to another embodiment.

FIG. 18B is a front view illustrating the rotating plate according to another embodiment.

FIG. 18C is a side view illustrating the rotating plate according to another embodiment.

FIG. 18D is a top view illustrating the rotating plate according to another embodiment.

FIG. 19 is a view illustrating a driving part according to another embodiment.

FIG. 20 is a perspective view illustrating a state in which a shield can and a substrate is removed from the second camera actuator according to the embodiment.

FIG. 21A is a cross-sectional view along line BB' in FIG. 20.

FIG. 21B is a cross-sectional view along line CC' in FIG. 20.

FIG. 21C is a cross-sectional view along line DD' in FIG. 20.

FIG. 22 is an exemplary view illustrating movement of the second camera actuator illustrated in FIG. 21A.

FIG. 23 is an exemplary view illustrating movement of the second camera actuator illustrated in FIG. 21C.

FIG. 24 is a perspective view illustrating an auto focusing (AF) or zoom actuator according to still another embodiment of the present invention.

FIG. 25 is a perspective view illustrating a state in which some components are omitted from the actuator according to the embodiment illustrated in FIG. 24.

FIG. 26 is an exploded perspective view illustrating a state in which some components are omitted from the actuator according to the embodiment illustrated in FIG. 24.

FIG. 27A is a perspective view illustrating a first lens assembly in the actuator according to the embodiment illustrated in FIG. 26.

FIG. 27B is a perspective view illustrating a state in which some components are removed from the first lens assembly illustrated in FIG. 27A.

FIG. 28 is a perspective view illustrating a third lens assembly in the actuator according to the embodiment illustrated in FIG. 26.

FIG. 29 is a perspective view illustrating a mobile terminal to which the camera module according to an embodiment is applied.

FIG. 30 is a perspective view illustrating a vehicle to which the camera module according to the embodiment is applied.

MODES OF THE INVENTION

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "second," "first," and the like may be used herein to describe various elements, these elements should not be limited by these terms. These terms are only used to distinguish one element from another element. For example, a second element could be called a first element, and a first element could similarly be called a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, embodiments will be described in detail with reference to the accompanying drawings, components that are the same or correspond to each other will be denoted by the same or corresponding reference numerals regardless of symbols of the accompanying drawings, and redundant descriptions will be omitted.

FIG. 1 is a perspective view illustrating a camera module according to an embodiment, FIG. 2A is a perspective view illustrating a state in which a shield can is removed from the camera module illustrated in FIG. 1, and FIG. 2B is a plan view illustrating the camera module illustrated in FIG. 2A.

Referring to FIG. 1, a camera module 1000 may include one camera module or a plurality of camera modules. For example, the camera module 1000 may include a first camera module 1000A and a second camera module 1000B. The first camera module 1000A and the second camera module 1000B may be covered by a predetermined shield can 1210.

Referring to all of FIGS. 1, 2A and 2B, the first camera module 1000A may include a single actuator or a plurality of actuators. For example, the first camera module 1000A may include a first camera actuator 1100 and a second camera actuator 1200.

The first camera actuator 1100 may be electrically connected to a circuit board 1410 of a first group, the second camera actuator 1200 may be electrically connected to a circuit board 1420 of a second group, and, although not illustrated in the drawings, the circuit board 1420 of the second group may also be electrically connected to the circuit board 1410 of the first group. The second camera module 1000B may be electrically connected to a circuit board 1430 of a third group.

The first camera actuator 1100 may be a zoom actuator or an auto focus (AF) actuator. For example, the first camera actuator 1100 may support a single lens or a plurality of lenses and perform the AF function or zoom function by moving the lenses according to a control signal of a predetermined control unit.

The second camera actuator 1200 may be an optical image stabilization (OIS) actuator.

The second camera module 1000B may include a lens disposed in a predetermined lens barrel (not shown). The lens may include a fixed focal length lens. The fixed focal length lens may be referred to as a "single focal length lens" or "single lens."

The second camera module 1000B may be disposed in a predetermined housing (not shown) and may include an actuator (not shown) which drives a lens part. The actuator may be a voice coil motor, a micro actuator, a silicone actuator, or the like, and may be variously applied in an electrostatic method, a thermal method, a bimorph method, an electrostatic force method, or the like, but the present invention is not limited thereto.

Next, FIG. 3A is a perspective view illustrating the first camera module illustrated in FIG. 2A, and FIG. 3B is a side cross-sectional view illustrating the first camera module illustrated in FIG. 3A.

Referring to FIG. 3A, the first camera module 1000A may include the first camera actuator 1100 which performs a zooming function and an AF function and the second camera actuator 1200 which is disposed at one side of the first camera actuator 1100 and performs an OIS function.

Referring to FIG. 3B, the first camera actuator 1100 may include an optical system and a lens driving part. For example, at least one among a first lens assembly 1110, a second lens assembly 1120, a third lens assembly 1130, and a guide pin 50 may be disposed in the first actuator 1100.

In addition, the first camera actuator 1100 may include a driving coil 1140 and a driving magnet 1160 to perform a high-magnification zooming function.

For example, the first lens assembly 1110 and the second lens assembly 1120 may be moving lenses which are moved by the driving coil 1140, the driving magnet 1160, and the guide pin 50, and the third lens assembly 1130 may be a fixed lens, but the present invention is not limited thereto. For example, the third lens assembly 1130 may perform a function of a focator which collects light to form an image at a specific position, and the first lens assembly 1110 may perform a function of a variator which reforms the image, which is formed through the third lens assembly 1130, at another position. Meanwhile, the first lens assembly 1110 may be in a state in which a change in magnification is large because a distance to a subject or an image distance is greatly changed, and the first lens assembly 110, which is a variator, may play an important role in changing a focal length or magnification of the optical system. Meanwhile, an image point at which an image is formed through the first lens assembly 1110, which is the variator, may slightly vary according to a position. Accordingly, the second lens assembly 1120 may perform a position compensation function for the image formed through the variator. For example, the second lens assembly 1120 may perform a function of a compensator which serves to accurately form the image formed through the first lens assembly 1110, which is the variator, at the actual position of an image sensor 1190.

For example, the first lens assembly 1110 and the second lens assembly 1120 may be driven by an electromagnetic force generated due to an interaction between the driving coil 1140 and the driving magnet 1160.

In addition, a predetermined image sensor 1190 may be disposed perpendicular to an optical axis direction of collimated light.

Next, details of the second camera actuator 1200 will be described below with reference to FIG. 4.

In addition, the camera module according to the embodiment may control an optical path using the camera actuator to implement OIS, and accordingly, the occurrence of a decent or tilt phenomenon can be minimized, and best optical properties can be realized.

Since FIGS. 1 to 3A and 3B and the description thereof are intended to describe an overall structure and an operating principle of the camera module according to the embodiment of the present invention, the embodiment of the present invention is not limited to the detailed configuration illustrated in FIGS. 1 to 3A and 3B.

Meanwhile, when the OIS actuator and the AF or zoom actuator are disposed according to the embodiment of the present invention, magnetic field interference with an AF or zoom magnet can be prevented when OIS is performed. Since the driving magnet of the second camera actuator 1200 is separately disposed from the first camera actuator 1100, the magnetic field interference between the first camera actuator 1100 and the second camera actuator 1200 may be prevented. In the present specification, OIS may be interchangeably used with terms such as hand shake correction, optical image stabilization, optical image correction, and shaking correction.

Hereinafter, a control method and a detailed structure of the second actuator according to one embodiment of the present invention will be more specifically described.

FIG. 4 is a perspective view illustrating a second camera actuator according to the embodiment, and FIG. 5 is an exploded perspective view illustrating the second camera actuator according to the embodiment.

Referring to FIGS. 4 and 5, a second camera actuator 1200 according to the embodiment includes a shield can 1210, a housing 1220, a mover 1230, a guide part 1240, and a driving part 1250. In addition, it should be understood that components are not assembled along a line (for example, a dashed two-dotted line) illustrated in the exploded perspective view.

First, the mover 1230 includes a holder 1231 and an optical member 1232 seated on the holder 1231. The guide part 1240 includes a support part 1241, a first elastic part 1242 connecting the support part 1241 and the housing 1220, and a second elastic part 1243 connecting the support part 1241 and the mover 1230. The guide part 1240 may perform a tilt with respect to two axes using the first elastic part 1242 and the second elastic part 1243. In the embodiment, the guide part 1240 may rotate (to correspond to second axis tilt) with respect to a first direction (X axis direction) using the first elastic part 1242. In addition, the guide part 1240 may rotate (to correspond to first axis tilt) with respect to a second direction (Y axis direction) using the second elastic part 1243. In addition, the driving part 1250 includes a driving magnet 1251, a driving coil 1252, a Hall sensor part 1253, a coupling part 1254, and a substrate part 1255. Hereinafter, each component will be described.

The shield can 1210 may be positioned at one region (for example, at an outermost side) of the second camera actuator 1200 to surround the guide part 1240 and the driving part 1250 which will be described below.

The shield can 1210 may block or reduce electromagnetic waves generated from the outside. Accordingly, the occurrence of a malfunction in the guide part 1240 or the driving part 1250 can be reduced.

The housing 1220 may be disposed in the shield can 1210. In addition, the housing 1220 may be positioned inside the substrate part 1255. The housing 1220 may be fastened to the shield can 1210 by being fitted thereinto or aligned therewith.

The housing 1220 may include a plurality of housing side portions. In the embodiment, the housing 1220 may include a first housing side portion to a fifth housing side portion. Details thereof will be described below.

The housing 1220 may include an accommodation portion 1226 which is a cavity between the plurality of housing side portions.

The mover 1230 includes the holder 1231 and the optical member 1232 seated on the holder 1231.

The holder 1231 may be seated in the accommodation portion 1226 of the housing 1220. The holder 1231 may include a first holder outer side surface to a fourth holder outer side surface respectively corresponding to the first housing side portion, the second housing side portion, the third housing side portion, and the fourth housing side portion. Details thereof will be described below.

The optical member 1232 may be seated on the holder 1231. To this end, the holder 1231 may include a seating surface, and the seating surface may be formed by the accommodation portion. The optical member 1232 may include a reflective part disposed therein. However, the present invention is not limited thereto. In addition, the optical member 1232 may reflect light reflected from the outside (for example, an object) into the camera module. In other words, the optical member 1232 may address a spatial limitation of a first camera actuator and the second camera actuator by changing a path of reflected light. Accordingly, it should be understood that the camera module may also provide a wide range of magnification by increasing an optical path while minimizing a thickness.

The optical member 1232 may include a reflective member such as a prism or mirror. The optical member may further include at least one lens in front of or behind the reflective member.

The guide part 1240 may be disposed in the housing 1220. In addition, as described above, the guide part 1240 may perform first axis tilt and second axis tilt on the mover 1230 using the first elastic part 1242 and the second elastic part 1243. Details thereof will be described below.

The driving part 1250 includes the driving magnet 1251, the driving coil 1252, the Hall sensor part 1253, the coupling part 1254, and the substrate part 1255.

The driving magnet 1251 may include a plurality of magnets. In the embodiment, the driving magnet 1251 may include a first magnet 1251a, a second magnet 1251b, and a third magnet 1251c.

The first magnet 1251a, the second magnet 1251b, and the third magnet 1251c may be positioned on the outer side surfaces of the holder 1231, respectively. In addition, the first magnet 1251a and the second magnet 1251b may be positioned to face each other. In addition, the third magnet 1251c may be positioned on the bottom surface among the outer side surfaces of the holder 1231. Details thereof will be described below.

The driving coil 1252 may include a plurality of coils. In the embodiment, the driving coil 1252 may include a first coil 1252a, a second coil 1252b, and a third coil 1252c.

The first coil 1252a may be positioned opposite to the first magnet 1251a. Accordingly, as described above, the first coil 1252a may be positioned in a first housing hole 1221a of a first housing side portion 1221.

In addition, the second coil 1252b may be positioned opposite to the second magnet 1251b. Accordingly, as described above, the second coil 1252*b* may be positioned in a second housing hole 1222*a* of a second housing side portion 1222.

The first coil 1252*a* may be positioned to face the second coil 1252*b*. That is, the first coil 1252*a* and the second coil 1252*b* may be symmetrically positioned with respect to the first direction. This may be equally applied to the first magnet 1251*a* and the second magnet 1251*b*. Due to this configuration, X axis tilting can be accurately performed without being inclined toward one side by an electromagnetic force between the first coil 1252*a* and the first magnet 1251*a* and an electromagnetic force between the second coil 1252*b* and the second magnet 1251*b*.

The third coil 1252*c* may be positioned opposite to the third magnet 1251*c*. Accordingly, as described above, the third coil 1252*c* may be positioned in a third housing hole 1223*a* of a third housing side portion 1223. The third coil 1252*c* and the third magnet 1251*c* generate an electromagnetic force to perform Y axis tilting of the mover 1230 and the guide part 1240 based on the housing 1220.

In this case, the X axis tilting is tilting with respect to the X axis (or is tilting with respect to a reference axis that is the X axis), and Y axis tilting is tilting with respect to the Y axis (or is tilting with respect to a reference axis that is the Y axis). In addition, the first direction is the X axis direction in the drawings and may be interchangeably used with a first axis direction, a first axis, and the like. The second direction is the Y axis direction in the drawings and may be interchangeably used with a second axis direction, a second axis, and the like. The second direction is a direction perpendicular to the first direction. In addition, a third direction is a Z axis direction in the drawings and may be interchangeably used with a third axis direction and the like. In addition, the third direction is a direction perpendicular to both the first direction and the second direction. In addition, in the present invention, the first direction (X axis direction) corresponds to a direction of an optical axis of light incident into the second camera actuator, and the second direction (Y axis direction) and the third direction (Z axis direction) are directions perpendicular to the optical axis and may be tilted by the second camera actuator. The third direction may correspond to a direction from the guide part to the optical member or the holder. In addition, a bottom surface refers to one side in the first direction, and in the housing, the third housing side portion may be the bottom surface, inward may be a direction toward a center of the camera actuator, and outward may be an opposite direction thereof. In the present invention, the present invention should be understood based on the above-described content. However, since the second camera actuator allows light to pass through the optical member to the image sensor of the first camera actuator, the optical axis will be described based on the third direction, that is, the Z axis direction. In the first camera actuator, which will be described below, it should be understood that the optical axis may also be changed to the Z axis. In addition, since the second camera actuator performs rotation with respect to the first direction and the second direction perpendicular to the third direction, which is the optical axis, the OIS function can be performed.

The Hall sensor part 1253 may include a plurality of Hall sensors. In the embodiment, the Hall sensor part 1253 may include a first Hall sensor 1253*a*, a second Hall sensor 1253*b*, and a third Hall sensor 1253*c*. The first Hall sensor 1253*a* and the second Hall sensor 1253*b* may be positioned inside the first coil 1252*a* or the second coil 1252*b*. The first Hall sensor 1253*a* and the second Hall sensor 1253*b* may detect a change in magnetic flux inside the first coil 1252*a* or the second coil 1252*b*. Accordingly, position sensing between the first and second magnets 1251*a* and 1251*b* and the first Hall sensor 1253*a* and the second Hall sensor 1253*b* may be performed. The camera actuator according to the embodiment may control the X axis tilt using this.

In addition, the third Hall sensor 1253*c* may be positioned inside the third coil 1252*c*. The third Hall sensor 1253*c* may detect a change in magnetic flux inside the third coil 1252*c*. Accordingly, position sensing between the third magnet 1251*c* and the third Hall sensor 1253*c* may be performed. The camera actuator according to the embodiment may control the Y axis tilt using this.

The coupling part 1254 may include a first coupling member 1254*a*, a second coupling member 1254*b*, and a third coupling member 1254*c*.

Each of the first coupling member 1254*a*, the second coupling member 1254*b*, and the third coupling member 1254*c* may be positioned in one of the seating grooves formed in the outer side surfaces of the holder 1231. In addition, the first coupling member 1254*a* and the second coupling member 1254*b* may be positioned to face each other. In addition, the third coupling member 1254*c* may be positioned on the bottom surface (for example, the third holder outer side surface) among the outer side surfaces of the holder 1231.

In addition, the first coupling member 1254*a*, the second coupling member 1254*b*, and the third coupling member 1254*c* may each be positioned between the first magnet 1251*a* to the third magnet 1251*c* and the holder 1231.

The first coupling member 1254*a*, the second coupling member 1254*b*, and the third coupling member 1254*c* may be yokes. Accordingly, the first coupling member 1254*a*, the second coupling member 1254*b*, and the third coupling member 1254*c* may be respectively coupled to the first magnet 1251*a*, the second magnet 1251*b*, and the third magnet 1251*c*.

In addition, the first coupling member 1254*a*, the second coupling member 1254*b*, and the third coupling member 1254*c* may be respectively disposed in a first seating groove, a second seating groove, and a third seating groove, and may be easily coupled to the first seating groove, the second seating groove, and the third seating groove using an adhesive member injected through grooves formed in the first seating groove, the second seating groove, and the third seating groove.

Accordingly, the first magnet 1251*a*, the second magnet 1251*b*, and the third magnet 1251*c* may be easily coupled to the holder 1231 by the first coupling member 1254*a*, the second coupling member 1254*b*, and the third coupling member 1254*c*, respectively.

Each of the first magnet 1251*a*, the second magnet 1251*b*, and the third magnet 1251*c* may be positioned in one of the outer side surfaces of the holder 1231. In addition, the first magnet 1251*a* and the second magnet 1251*b* may be positioned to face each other. In addition, the third magnet 1251*c* may be positioned on the bottom surface among the outer side surfaces of the holder 1231. Details thereof will be described below.

The substrate part 1255 may be positioned under the driving part 1250. The substrate part 1255 may be electrically connected to the driving coil 1252 and the Hall sensor part 1253. For example, the substrate part 1255 may be coupled to the driving coil 1252 and the Hall sensor part 1253 through surface-mount technology (SMT). However, the present invention is not limited to such a manner.

The substrate part 1255 may be positioned between the shield can 1210 and the housing 1220 and coupled to the shield can 1210 and the housing 1220. The coupling method may be variously performed as described above. In addition, through the above coupling, the driving coil 1252 and the Hall sensor part 1253 may be positioned inside the outer side surfaces of the housing 1220.

The substrate part 1255 may include a circuit board having an electrically connectable wiring pattern such as a rigid printed circuit board (rigid PCB), a flexible PCB, a rigid-flexible PCB, or the like. However, the present invention is not limited to such a type.

FIG. 6A is a perspective view illustrating the housing according to the embodiment, FIG. 6B is a side view illustrating the fourth housing side portion in the housing according to the embodiment, and FIG. 6C is a side view illustrating the fifth housing side portion. FIG. 6D is a side view illustrating the first housing side portion and the second housing side portion, FIG. 6E is a top view illustrating the housing according to the embodiment, and FIG. 6F is a bottom view illustrating the housing according to the embodiment.

Referring to FIGS. 6A to 6G, the housing 1220 may include the first housing side portion 1221, the second housing side portion 1222, the third housing side portion 1223, a fourth housing side portion 1224, and a fifth housing side portion 1225.

The first housing side portion 1221 and the second housing side portion 1222 may be disposed to face each other. In other words, the first housing side portion 1221 and the second housing side portion 1222 may be positioned to correspond to each other in the first direction. In addition, the third housing side portion 1223 may be disposed at the bottom surface of the housing 1220. The fourth housing side portion 1224 and the fifth housing side portion 1225 may be disposed to face each other and disposed between the first housing side portion 1221 and the second housing side portion 1222. In addition, the fourth housing side portion 1224 and the fifth housing side portion 1225 may be positioned to correspond to each other in the first direction.

The third housing side portion 1223 may be in contact with the first housing side portion 1221, the second housing side portion 1222, the fourth housing side portion 1224, and the fifth housing side portion 1225.

The first housing side portion 1221 may include the first housing hole 1221*a*. The first coil, which will be described below, may be positioned in the first housing hole 1221*a*.

The first housing side portion 1221 may include a first coupling protrusion (not shown). The first housing side portion 1221 may be easily coupled to the substrate part using the first coupling protrusion (not shown).

In addition, the first housing side portion 1221 may include a first seating protrusion 1221*c*. The first seating protrusion 1221*c* may be positioned in an upper portion or a lower portion of the first housing side portion 1221. The first seating protrusion 1221*c* may easily support the substrate part. Accordingly, a coupling force between the first housing side portion and the substrate part can be increased.

In addition, the second housing side portion 1222 may include the second housing hole 1222*a*. In addition, the second coil, which will be described below, may be positioned in the second housing hole 1222*a*.

The first housing hole 1221*a* and the second housing hole 1222*a* may be positioned to face each other. For example, the first housing hole 1221*a* and the second housing hole 1222*a* may be symmetrically disposed with respect to the first direction (X axis direction) or the third direction (Z axis direction). In addition, the first coil and the second coil may be electrically connected and coupled to the substrate part disposed outside the part housing 1220 through the first housing hole 1221*a* and the second housing hole 1222*a*. The first coil and the second coil may be electrically connected to the substrate part, and a current may flow therethrough. The current is a component of an electromagnetic force by which the second camera actuator may perform tilting with respect to the X axis.

The second housing side portion 1222 may include a second coupling protrusion (not shown). The second housing side portion 1222 may be easily coupled to the substrate part using the second coupling protrusion (not shown).

In addition, the second housing side portion 1222 may include a second seating protrusion 1222*c*. The second seating protrusion 1222*c* may be positioned in an upper portion or a lower portion of the second housing side portion 1222. The second seating protrusion 1222*c* may easily support the substrate part. Accordingly, a coupling force between the second housing side portion and the substrate part can be increased.

In addition, the third housing side portion 1223 may include the third housing hole 1223*a*. The third coil, which will be described below, may be positioned in the third housing hole 1223*a*. The third coil may be coupled to the substrate part. In the embodiment, the third coil may be electrically connected to the substrate part 1255, and a current may flow therethrough. The current is a component of an electromagnetic force by which the second camera actuator may perform tilting with respect to the Y axis.

The third housing side portion 1223 may include a third coupling protrusion (not shown). The third housing side portion 1223 may be easily coupled to the substrate part using the third coupling protrusion (not shown).

The fourth housing side portion 1224 may be in contact with the first housing side portion 1221, the second housing side portion 1222, and the third housing side portion 1223. Particularly, the fourth housing side portion 1224 may be disposed on the third housing side portion 1223. A lower surface of the fourth housing side portion 1224 may be in contact with an upper surface of the third housing side portion 1223, and the fourth housing side portion 1224 may be supported by the third housing side portion 1223. The fourth housing side portion 1224 may not be positioned on the optical path.

The fourth housing side portion 1224 may include a coupling hole CH. Accordingly, the fourth housing side portion 1224 may include an inner side surface CHS of the coupling hole CH. In addition, the fourth housing side portion 1224 may include a protruding part CHP positioned on the inner side surface CHS.

The protruding part CHP may be positioned on a bisector of the fourth housing side portion 1224 in the second direction (Y axis direction). In addition, the coupling hole CH may be positioned to correspond to a first support part of the support part which will be described below. In the embodiment, the coupling hole CH may overlap the first support part of the support part in the third direction (Z axis direction).

In addition, the first support part may be seated in the coupling hole CH. Accordingly, the first support part and the fourth housing side portion 1224 may be coupled to each other.

In the coupling hole CH, the protruding part CHP may be positioned on one of surfaces CHS facing in the second direction (Y axis direction). That is, the first support part may be easily inserted into and coupled to the coupling hole CH, when compared to a case in which the protruding part CHP is positioned on one of surfaces CHS' facing in the first direction (X axis direction) in the coupling hole CH.

The fifth housing side portion 1225 may be disposed to face the fourth housing side portion 1224. The fifth housing side portion 1225 may include an opening 1225*a*. Accordingly, light passing through or reflected by the optical member may move through the opening 1225*a*.

In addition, the fifth housing side portion 1225 may include housing protrusions 1225*b*. The housing protrusions 1225*b* may protrude outward. The housing 1220 may be coupled to the first camera actuator, which is disposed outside, using the housing protrusions 1225*b*. Accordingly, the reliability of the camera module can be improved.

In addition, the fifth housing side portion 1225 may include protrusions 1225*b* and a pattern part (not shown) having a pattern around the housing protrusions 1225*b*. The pattern part (not shown) may be positioned to be stepped further inward than the housing protrusions 1225*b*. That is, the pattern part (not shown) may be positioned further inward than the housing protrusions 1225*b*.

An adhesive member may be applied on the pattern part (not shown). Accordingly, a contact area between the adhesive member and the fifth housing side portion 1225 may be increased on the pattern part (not shown). Accordingly, a coupling force of the second actuator (or the housing 1220) and the first actuator may be increased.

In addition, the housing 1220 may include the accommodation portion 1226 formed therein by the first to fifth housing side portions 1221 to 1225. The mover 1230 and the guide part 1240 may be positioned in the accommodation portion 1226.

FIG. 7A is a perspective view illustrating the mover according to the embodiment, and FIG. 7B is a perspective view illustrating the holder according to the embodiment. FIG. 7C is a side view illustrating the mover according to the embodiment, and FIG. 7D is a bottom view illustrating the mover according to the embodiment.

Referring to FIGS. 7A to 7D, the mover 1230 according to the embodiment may include the holder 1231 and the optical member 1232 seated on the holder 1231.

First, the optical member 1232 may be seated on the holder 1231. The optical member 1232 may be the prism, the mirror, or the like as described above but is not limited thereto.

In addition, the holder 1231 may include a seating surface 1231*k* on which the optical member 1232 is seated. The seating surface 1231*k* may be an inclined surface. In addition, the holder 1231 may include a jaw portion SP at a lower portion thereof. The jaw portion SP in the holder 1231 may prevent movement of the optical member 1232. Accordingly, light incident through an upper portion may pass through the optical member 1232 and the opening of the fifth housing side portion and move in the third direction (Z axis direction).

In addition, the holder 1231 may include the plurality of outer side surfaces. For example, the holder 1231 may include a first holder outer side surface 1231S1, a second holder outer side surface 1231S2, a third holder outer side surface 1231S3, and a fourth holder outer side surface 1231S4.

The first holder outer side surface 1231S1 may be positioned to face the second holder outer side surface 1231S2. That is, the first holder outer side surface 1231S1 and the second holder outer side surface 1231S2 may be symmetrically disposed with respect to the first direction (X axis direction).

The first holder outer side surface 1231S1 may be positioned to face the first housing side portion 1221. In addition, the second holder outer side surface 1231S2 may be positioned to face the second housing side portion 1222.

In addition, the first holder outer side surface 1231S1 may include a first seating groove 1231S1*a*. In addition, the second holder outer side surface 1231S2 may include a second seating groove 1231S2*a*. The first seating groove 1231S1*a* and the second seating groove 1231S2*a* may be symmetrically disposed with respect to the first direction (X axis direction).

In addition, the first coupling member and the first magnet, which will be described below, may be disposed in the first seating groove 1231S1*a*, and the second coupling member and the second magnet 1251*b* may be disposed in the second seating groove 1231S2*a*. The first magnet and the second magnet may also be symmetrically disposed with respect to the first direction (X axis direction). In addition, the first coupling member and the second coupling member may also be symmetrically disposed with respect to the first direction (X axis direction).

In addition, the first magnet and the second magnet may overlap in the second direction, and the first coupling member and the second coupling member may overlap in the second direction. As described above, due to positions of the first and second seating grooves and the first and second magnets, electromagnetic forces induced by the magnets may be coaxially provided to the first holder outer side surface 1231S1 and the second holder outer side surface 1231S2. For example, a region (for example, a portion in which the electromagnetic force is strongest) of the first holder outer side surface S1231S1 on which the electromagnetic force is applied and a region (for example, a portion in which the electromagnetic force is strongest) of the second holder outer side surface S1231S1 on which the electromagnetic force is applied may be positioned on an axis parallel to the second direction (Y axis direction). Accordingly, X axis tilting can be accurately performed.

In addition, the first holder outer side surface 1231S1 and the second holder outer side surface 1231S2 may additionally include grooves (not shown). Due to the grooves (not shown), a weight of the holder 1231 is decreased, and thus, when a one-axis tilt or two-axis tilt is performed, energy consumption can be minimized. That is, an amount of current applied to the first coil, the second coil, and the third coil can be minimized, and accordingly, energy efficiency can be improved. In addition, the above-described grooves (not shown) may be symmetrically disposed with respect to the first direction (X axis direction). Accordingly, a center of gravity of the holder 1231 is prevented from being biased to one side, and thus tilting can be performed by a uniform force.

The third holder outer side surface 1231S3 may be an outer side surface which is in contact with the first holder outer side surface 1231S1 and the second holder outer side surface 1231S2 and extends between the first holder outer side surface 1231S1 and the second holder outer side surface 1231S2 in the second direction (Y axis direction). Accordingly, the third holder outer side surface 1231S3 may be positioned between the first holder outer side surface 1231S1 and the second holder outer side surface 1231S2.

In addition, the third holder outer side surface 1231S3 may be the bottom surface of the holder 1231. The third holder outer side surface 1231S3 may be positioned to face the third housing side portion 1223. In addition, the third holder outer side surface 1231S3 may be in contact with the third housing side portion 1223.

In addition, the third holder outer side surface 1231S3 may include a third seating groove 1231S3a. The third magnet 1251c may be disposed in the third seating groove 1231S3a. In addition, at least a part of the third housing hole 1223a may overlap the third seating groove 1231S3a in the first direction (X axis direction). Accordingly, the third magnet 1251c in the third seating groove 1231S3a and the third coil 1252c in the third housing hole 1223a may be positioned to face each other. In addition, the third magnet 1251c and the third coil 1252c generate an electromagnetic force, and thus the camera actuator may perform Y axis tilting.

In addition, although the X axis tilt is performed by the plurality of magnets (the first and second magnets 1251a and 1251b), the Y axis tilt may be performed by only the third magnet 1251c. In the embodiment, an area of the third seating groove 1231S3a may be different from an area of the first seating groove 1231S1a or the second seating groove 1231S2a. For example, the area of the third seating groove 1231S3a may be greater than the area of the first seating groove 1231S1a or the second seating groove 1231S2a. Due to this configuration, the Y axis tilt can be performed by current control similar to current control by which the X axis tilt is performed.

The third holder outer side surface 1231S3 may additionally include a groove 1231S3b. Due to the groove 1231S3b, a weight of the holder 1231 decreases, and thus, when the one-axis tilt or two-axis tilt is performed, energy consumption can be minimized. That is, an amount of current applied to the first coil, the second coil, and the third coil can be minimized, and accordingly, energy efficiency can be improved.

In addition, the additional groove 1231S3b may be provided as a plurality of grooves 1231S3b in the third holder outer side surface 1231S3, and when there are the plurality of grooves 1231S3b, the plurality of grooves 1231S3b may be symmetrically disposed with respect to the first direction (X axis direction).

The fourth holder outer side surface 1231S4 may be an outer side surface which is in contact with the first holder outer side surface 1231S1 and the second holder outer side surface 1231S2 and extends from the third holder outer side surface 1231S3 in the first direction (X axis direction). In addition, the fourth holder outer side surface 1231S4 may be positioned between the first holder outer side surface 1231S1 and the second holder outer side surface 1231S2.

FIG. 8A is a perspective view illustrating the guide part according to the embodiment, and FIG. 8B is a perspective view illustrating the support part according to the embodiment. FIG. 8C is a side view illustrating the support part according to the embodiment, and FIG. 8D is a top view illustrating the support part according to the embodiment. FIG. 8E is a perspective view illustrating the first elastic part according to the embodiment, and FIG. 8F is a plan view illustrating the first elastic part according to the embodiment. FIG. 8G is a perspective view illustrating the second elastic part according to the embodiment, and FIG. 8H is a plan view illustrating the second elastic part according to the embodiment. FIG. 8I is a view illustrating movement of the guide part by the first elastic part according to the embodiment, and FIG. 8J is a view illustrating movement of the guide part by the second elastic part according to the embodiment. FIG. 8K is a perspective view illustrating a guide part according to another embodiment.

First, referring to FIG. 8A, the guide part 1240 according to the embodiment may include the support part 1241, the first elastic part 1242, and the second elastic part 1243.

Positions of the first elastic part 1242 and the second elastic part 1243 may be changed, and in the present specification, the present invention will be described based on the drawings.

The support part 1241 according to the embodiment may be coupled to the mover and the housing using the first elastic part and the second elastic part. In addition, the support part 1241 may move relative to the first direction (X axis direction). However, the support part 1241 does not move relative to the second direction (Y axis direction). Details thereof will be described below.

In addition, the first elastic part 1242 may be disposed between the support part 1241 and the mover and may connect the support part 1241 and the mover. The first elastic part 1242 may be disposed in the first direction (X axis direction) and may include a first pattern positioned between the first support part and the coupling hole. The first elastic part 1242 may perform a second axis tilt (or move in the second direction) based on the first pattern.

In addition, the second elastic part 1243 may be disposed between the support part 1241 and the housing and may connect the support part 1241 and the housing. The second elastic part 1243 may include a second pattern disposed in the second direction (Y axis direction). The second elastic part 1243 may perform a first axis tilt (or move in the first direction) based on the second pattern. Details thereof will be described below.

In the embodiment, the first elastic part 1242 may be disposed in a direction perpendicular to the second elastic part 1243.

Referring to FIGS. 8B to 8D, the support part 1241 according to the embodiment may be disposed apart from the mover and the housing in the third direction (Z axis direction). Accordingly, a two-axis tilt may be performed using the support part 1241 at a desired angle.

In addition, the support part 1241 may include a first support part SA1 extending in the first direction (X axis direction) and a second support part SA2 extending in the second direction (Y axis direction).

The first support part SA1 may extend in the first direction (X axis direction). For example, in the first support part SA1, a length in the first direction (X axis direction) may be greater than a length in the second direction (Y axis direction) in an XY plane.

The second support part SA2 may extend in the second direction (Y axis direction). For example, in the second support part SA2, a length in the second direction (Y axis direction) may be greater than a length in the first direction (X axis direction) in the XY plane.

In the embodiment, a length L2 of the first support part SA1 in the second direction (Y axis direction) may be smaller than a length L1 of the second support part SA2 in the second direction (Y axis direction).

The first support part SA1 may be positioned on the second support part SA2. In other words, the second support part SA2 may be positioned under the first support part SA1. In addition, the first support part SA1 may be supported by the second support part SA2. The first support part SA1 and the second support part SA2 according to the embodiment may be coupled to each other. For example, the first support part SA1 and the second support part SA2 may be integrally formed.

The first support part SA1 may not overlap a virtual line IV1 bisecting the mover or the second support part SA2 in the second direction (Y axis direction). That is, the first support part SA1 may be disposed apart from the virtual line IV1 in the second direction (Y axis direction). In other words, the first support part SA1 may be disposed to be shifted from the virtual line IV1 in the second direction (Y axis direction).

The first support part SA1 may be in contact with an upper surface SA2u of the second support part SA2. In addition, the first support part SA1 may include a first coupling protrusion PP1 disposed on one side surface SA1s. At least a part of the first coupling protrusion PP1 may overlap the above-described virtual line IV1 in the third direction (Z axis direction). Due to this configuration, the first elastic part may be coupled to the support part 1241 using the first coupling protrusion PP1 and rotated at the same time.

The first coupling protrusion PP1 may be coupled to the first elastic part which will be described below. In the embodiment, the first coupling protrusion PP1 may be in contact with one side surface SA1s and the upper surface SA2u of the second support part SA2.

The first coupling protrusion PP1 may be positioned on a bisector or a region on one side surface SA1s of the first support part SA1 in the third direction (Z axis direction). Accordingly, a supporting force of the first coupling protrusion PP1 for the first elastic part may be uniformly applied to the support part, that is, may prevent a phenomenon in which the supporting force is concentrated on one side of the support part.

As described above, the second support part SA2 may be connected to the first support part SA1 and the first coupling protrusion PP1 on the upper surface SA2u.

In addition, the second support part SA2 may include a second coupling protrusion PP2 disposed on a lower surface SA2b. The second coupling protrusion PP2 may protrude downward from the lower surface SA2b of the second support part SA2. In addition, the second coupling protrusion PP2 may be coupled to coupling holes of the second elastic part which will be described below. Accordingly, the second elastic part may be positioned under the support part 1241 and the mover to easily support the support part 1241 and the mover.

In addition, the second coupling protrusion PP2 may be provided as one or more second coupling protrusions PP2. In addition, the second coupling protrusions PP2 may be symmetrically disposed with respect to the first direction (X axis direction). Due to this configuration, a coupling force between the support part 1241 and the mover may be prevented from being concentrated on one side of the second support part SA2 by the second elastic part.

In addition, a second coupling protrusion PP2 may be positioned in a central portion of the second support part SA2 in the third direction (Z axis direction). Due to this configuration, a force may be uniformly applied to the support part 1241 through the second coupling protrusions PP2.

In addition, according to the embodiment, as described above, the first elastic part 1242 may be coupled to one side surface of the support part, particularly, to one side surface SA1s of the first support part. In addition, the first elastic part may be coupled to a lower side surface of the mover.

In addition, the second elastic part 1243 may be coupled to a lower surface of the support part, particularly, to the lower surface SA2b of the second support part SA2. In addition, the second elastic part 1243 may be coupled to the housing.

In addition, one side surface SA1s of the first support part and the lower surface SA2b of the second support part SA2 may be perpendicular to each other. Accordingly, the first elastic part and the second elastic part can tilt with respect to directions perpendicular to each other, and ultimately, the mover can be ultimately tilted with respect to two axes.

Referring to FIGS. 8E and 8F, as described above, the first elastic part 1242 according to the embodiment may be coupled to the first support part SA1. A length of the first elastic part 1242 in the first direction (X axis direction) may be greater than a length thereof in the second direction (Y axis direction). In addition, at least a part of the first elastic part 1242 may overlap the above-described virtual line IV1 (see FIG. 8C). Accordingly, in the first elastic part 1242, a 1-1 coupling region 1242b, which will be described below, may rotate or move with respect to the first direction (X axis direction) or a virtual line. Accordingly, the support part connected to the first elastic part 1242, the second elastic part, and the mover may move in response to movement of the 1-1 coupling region 1242b.

First, the first elastic part 1242 may include a first pattern PT1 disposed in the first direction (X axis direction). The first pattern PT1 may be grooves or holes. Hereinafter, the first pattern PT1 will be described based on the holes as in the drawings. The first pattern PT1 may be disposed side by side in the first direction (X axis direction). In other words, the plurality of holes may be disposed side by side in the first direction (X axis direction).

The first pattern PT1 may be symmetrically disposed with respect to the second direction (Y axis direction). Accordingly, even during rotation through the first pattern PT1, the reliability of the first elastic part 1242 can be improved.

The first elastic part 1242 may be formed with a first pattern region 1242a, the 1-1 coupling region 1242b, and a 1-2 coupling region 1242c in the third direction (Z axis direction).

The first pattern region 1242a may be a region in which the first pattern PT1 is disposed. The first pattern region 1242a may be a region extending in the first direction (X axis direction) and corresponding to the first pattern PT1.

In addition, the 1-1 coupling region 1242b and the 1-2 coupling region 1242c may be partitioned by the first pattern region 1242a.

The 1-1 coupling region 1242b may be positioned between the first pattern region 1242a and the mover. In other words, the 1-1 coupling region 1242b may be coupled to the first support part.

The 1-2 coupling region 1242c may be positioned between the first pattern region 1242a and the housing (for example, the fourth housing side portion). In other words, the 1-2 coupling region 1242c may be positioned in the coupling hole of the fourth housing side portion.

Since the first pattern region 1242a includes the first pattern PT1, the rigidity of the first pattern region 1242a may be smaller than that of each of the 1-1 coupling region 1242b and the 1-2 coupling region 1242c. Accordingly, the 1-1 coupling region 1242b and the 1-2 coupling region 1242c may be folded along the first pattern region 1242a. That is, the 1-1 coupling region 1242b and the 1-2 coupling region 1242c may move.

In addition, in the first pattern region 1242a, the holes, which are the first pattern PT1, are disposed in the first direction (X axis direction), and thus the 1-1 coupling region 1242b and the 1-2 coupling region 1242c may rotate with respect to the first direction (X axis direction).

The 1-1 coupling region 1242b may be coupled to the first support part. The 1-1 coupling region 1242b may include 1-1 elastic holes 1242h1 and a 1-1 elastic groove 1242p1.

The 1-1 elastic holes 1242h1 may be disposed apart from the 1-1 elastic groove 1242p1 in the 1-1 coupling region 1242b. An adhesive member may be applied in the 1-1 elastic holes 1242*h*1. In addition, the 1-1 coupling region 1242*b* may be coupled to the support part by the adhesive member.

In addition, the 1-1 elastic groove 1242*p*1 may be positioned in a lower portion of the 1-1 coupling region 1242*b*. Accordingly, the lower portion of the 1-1 coupling region 1242*b* may be open due to the 1-1 elastic groove 1242*p*1. Accordingly, manufacturing of the 1-1 coupling region 1242*b* can be facilitated, and the 1-1 coupling region 1242*b* and the support part can be easily coupled at the same time. For example, the 1-1 coupling region 1242*b* and the support part can be coupled through insertion. In addition, a load is applied downward, and thus a coupling force between the elements can be increased.

The adhesive member may be applied in the 1-1 elastic groove 1242*p*1.

The 1-2 coupling region 1242*c* may be coupled to the protruding part of the coupling hole of the fourth housing side portion. The 1-2 coupling region 1242*c* may include 1-2 elastic holes 1242*h*2 and a 1-2 elastic groove 1242*p*2

The 1-2 elastic holes 1242*h*2 may be disposed apart from the 1-2 elastic groove 1242*p*2 in the 1-2 coupling region 1242*c*. An adhesive member may be disposed in the 1-2 elastic holes 1242*h*2. In addition, the 1-2 coupling region 1242*c* may be coupled to the fourth housing side portion by the adhesive member.

In addition, the 1-2 elastic groove 1242*p*2 may be positioned in a lower portion of the 1-2 coupling region 1242*c*. Accordingly, the lower portion of the 1-2 coupling region 1242*c* may be open due to the 1-2 elastic groove 1242*p*2. Accordingly, manufacturing of the 1-2 coupling region 1242*c* can be facilitated, and the 1-2 coupling region 1242*c* and the support part can be easily coupled at the same time. For example, the 1-2 coupling region 1242*c* and the support part may be coupled through insertion. In addition, a load is applied downward, and thus a coupling force between the elements can be increased. In addition, an adhesive member may be applied in the 1-2 elastic groove 1242*p*2.

Referring to FIGS. 8G to 8H, as described above, the second elastic part 1243 according to the embodiment may be coupled to the second support part SA2. A length of the second elastic part 1243 in the second direction (Y axis direction) may be greater than a length thereof in the first direction (X axis direction).

The second elastic part 1243 may be bisected by the above-described virtual line IV1 (see FIG. 8C). In other words, a bisector of the second elastic part 1243 in the second direction (Y axis direction) may correspond to the above-described virtual line.

In addition, in the second elastic part 1243, a 2-1 coupling region 1243*b*, which will be described below, may rotate or move with respect to the second direction (Y axis direction). Accordingly, the mover connected to the second elastic part 1243 may move in response to movement of a 2-2 coupling region 1243*c*.

First, the second elastic part 1243 may include a second pattern PT2 disposed in the second direction (Y axis direction). The second pattern PT2 may be grooves or holes. Hereinafter, the second pattern PT2 will be described based on the holes as in the drawings. The second pattern PT2 may be disposed side by side in the second direction (Y axis direction). In other words, the plurality of holes may be disposed side by side in the second direction (Y axis direction). The second pattern PT2 may be positioned between a lower surface of the mover and the second support part.

The second pattern PT2 may be symmetrically disposed with respect to the first direction (X axis direction). Accordingly, when rotation through the second pattern PT2 is performed, a load applied to the second elastic part 1243 is uniform, and thus the reliability of the second elastic part 1243 can be improved.

The second elastic part 1243 may be formed with a second pattern region 1243*a*, the 2-1 coupling region 1243*b*, and the 2-2 coupling region 1243*c* in the third direction (Z axis direction).

The second pattern region 1243*a* may be a region in which the second pattern PT2 is disposed. The second pattern region 1243*a* may be a region extending in the second direction (Y axis direction) and corresponding to the second pattern PT2.

In addition, the 2-1 coupling region 1243*b* and the 2-2 coupling region 1243*c* may be partitioned by the second pattern region 1243*a*. First, the 2-1 coupling region 1243*b* may be positioned between the second pattern region 1243*a* and the fourth housing side portion. In other words, the 2-1 coupling region 1243*b* may be coupled to the second support part.

The 2-2 coupling region 1243*c* may be positioned between the second pattern region 1243*a* and the mover. In other words, the 2-2 coupling region 1243*c* may be positioned between the fifth housing side portion and the mover.

Since the second pattern region 1243*a* includes the second pattern PT2, the rigidity of the second pattern region 1243*a* may be smaller than that of each of the 2-1 coupling region 1243*b* and the 2-2 coupling region 1243*c*. Accordingly, the 2-1 coupling region 1243*b* and the 2-2 coupling region 1243*c* may be folded along the first pattern region 1243*a*. That is, the 2-1 coupling region 1243*b* and the 2-2 coupling region 1243*c* may move.

In addition, in the second pattern region 1243*a*, the holes, which are the second pattern PT2, are disposed in the first direction (X axis direction), and thus the 2-1 coupling region 1243*b* and the 2-2 coupling region 1243*c* may rotate with respect to the second direction (Y axis direction).

The 2-1 coupling region 1243*b* may be coupled to the second support part. The 2-1 coupling region 1243*b* may include 2-1 elastic holes 1243*h*1.

The 2-1 elastic holes 1243*h*1 may be coupled to the above-described second coupling protrusions PP2. That is, the 2-1 elastic holes 1243*h*1 may be positioned to correspond to the second coupling protrusions PP2. Accordingly, the 2-1 elastic holes 1243*h*1 may be symmetrically positioned with respect to the first direction (X axis direction) or the third direction (Z axis direction). An adhesive member may be applied in the 2-1 elastic hole 1243*h*1. In addition, the 2-1 coupling region 1243*b* may be coupled to the second support part by the adhesive member.

The 2-2 coupling region 1243*c* may be coupled to the lower surface of the mover. The 2-2 coupling region 1243*c* may include 2-2 elastic holes 1243*h*2, a 2-3 elastic hole 1243*h*3, and 2-4 elastic holes 1243*h*4.

In the 2-2 coupling region 1243*c*, the 2-2 elastic holes 1243*h*2 may be coupled to mover protrusions of a lower portion of the mover. An adhesive member may be applied in the 2-2 elastic holes 1243*h*2. In addition, the 2-2 coupling region 1243*c* may be coupled to the mover by the adhesive member.

The 2-3 elastic hole 1243*h*3 may be positioned to correspond to the third seating groove in the lower portion of the mover. In addition, the 2-3 elastic hole 1243*h*3 may be positioned to correspond to the third magnet seated in the third seating groove. Due to this configuration, the 2-3 elastic hole 1243*h*3 may prevent a reduction in an electro-magnetic force generated between the third magnet and the third coil.

In addition, the 2-4 elastic holes 1243*h*4 may simultaneously reduce a weight of the second elastic part 1243 and an influence of the first magnet and the second magnet disposed in the first seating groove and the second seating groove. That is, the generation of a magnetic force or the like between the second elastic part 1243 and the first magnet or the second magnet may be prevented by the 2-4 elastic holes 1243*h*4. Accordingly, a more accurate and efficient two-axis tilt can be performed.

In addition, a length L4 of the 2-1 coupling region 1243*b* in the third direction (Z axis direction) may be smaller than a length L3 of the 2-2 coupling region 1243*c* in the third direction (Z axis direction). Accordingly, the second elastic part 1243 may easily support a load of the mover through the 2-2 coupling region 1243*c*.

Referring to FIG. 8I, as described above, the rigidity of the second pattern region 1243*a* of the second elastic part 1243 is smaller than the rigidity of each of the other regions 1243*b* and 1243*c*, and thus a first axis tilt may be performed based on the second pattern region 1243*a*. That is, the first axis tilt of the 2-2 coupling region 1243*c* of the second elastic part 1243 may be performed, and the first axis tilt of the mover disposed on the 2-2 coupling region 1243*c* may also be performed.

Referring to FIG. 8J, as described above, the rigidity of the first pattern region 1242*a* of the first elastic part 1242 is smaller than the rigidity of each of the other regions 1242*b* and 1242*c*, a second axis tilt may be performed based on the first pattern region 1242*a*. That is, the second axis tilt of the 1-1 coupling region 1242*b* of the first elastic part 1242 may be performed, and the first axis tilt of the mover disposed on the 1-1 coupling region 1242*b* may also be performed.

Referring to FIG. 8K, in a support part 1241' of a guide part 1240 according to another embodiment, a plurality of first support parts SA1*a* and SA1*b* may be provided. That is, the plurality of first support parts SA1*a* and SA1*b* may be disposed to face each other based on the above-described virtual line.

Accordingly, a coupling force between a first elastic part 1242 and the first support parts SA1*a* and SA1*b* may be increased. Accordingly, even when the first elastic part 1242 tilts the more components than a second elastic part 1243, a two-axis tilt can be easily performed.

FIG. 9 is a view illustrating the driving part according to the embodiment.

Referring to FIG. 9, as described above, the driving part 1250 includes the driving magnet 1251, the driving coil 1252, the Hall sensor part 1253, the coupling part 1254, and the substrate part 1255.

In addition, as described above, the driving magnet 1251 may include the first magnet 1251*a*, the second magnet 1251*b*, and the third magnet 1251*c* which provide a driving force by an electromagnetic force. Each of the first magnet 1251*a*, the second magnet 1251*b*, and the third magnet 1251*c* may be positioned in one of the outer side surfaces of the holder 1231.

In addition, the driving coil 1252 may include a plurality of coils. In the embodiment, the driving coil 1252 may include the first coil 1252*a*, the second coil 1252*b*, and the third coil 1252*c*.

The first coil 1252*a* may be positioned opposite to the first magnet 1251*a*. Accordingly, as described above, the first coil 1252*a* may be positioned in the first housing hole 1221*a* of the first housing side portion 1221. In addition, the second coil 1252*b* may be positioned opposite to the second magnet 1251*b*. Accordingly, as described above, the second coil 1252*b* may be positioned in the second housing hole 1222*a* of the second housing side portion 1222.

The second camera actuator according to the embodiment can minimize the occurrence of a decent or tilt phenomenon to provide best optical properties when OIS is implemented by controlling the mover 1230 to rotate in the first direction (X axis direction) or the second direction (Y axis direction) using an electromagnetic force between the driving magnet 1251 and the driving coil 1252.

In addition, according to the embodiment, since OIS is implemented using the guide part 1240 of the guide part disposed between the housing 1220 and the mover 1230, a size limitation of the actuator is addressing, and thus an ultra-slim and ultra-small camera actuator and a camera module including the same can be provided.

The coupling part 1254 may include the first coupling member 1254*a*, the second coupling member 1254*b*, and the third coupling member 1254*c*.

In addition, the first coupling member 1254*a*, the second coupling member 1254*b*, and the third coupling member 1254*c* may each be positioned between the first magnet 1251*a* to the third magnet 1251*c* and the holder 1231.

The first coupling member 1254*a*, the second coupling member 1254*b*, and the third coupling member 1254*c* may be yokes. Accordingly, the first coupling member 1254*a*, the second coupling member 1254*b*, and the third coupling member 1254*c* may be respectively coupled to the first magnet 1251*a*, the second magnet 1251*b*, and the third magnet 1251*c*.

In addition, the first coupling member 1254*a*, the second coupling member 1254*b*, and the third coupling member 1254*c* may be respectively disposed in the first seating groove, the second seating groove, and the third seating groove and may be easily respectively coupled to the first seating groove, the second seating groove, and the third seating groove by the adhesive member injected through the grooves formed in the first seating groove, the second seating groove, and the third seating groove.

The substrate part 1255 may include a first substrate side portion 1255*a*, a second substrate side portion 1255*b*, and a third substrate side portion 1255*c*.

The first substrate side portion 1255*a* and the second substrate side portion 1255*b* may be disposed to face each other. In addition, the third substrate side portion 1255*c* may be positioned between the first substrate side portion 1255*a* and the second substrate side portion 1255*b*.

In addition, the first substrate side portion 1255*a* may be positioned between the first housing side portion and the shield can, and the second substrate side portion 1255*b* may be positioned between the second housing side portion and the shield can. In addition, the third substrate side portion 1255*c* may be positioned between the third housing side portion and the shield can and may be a bottom surface of the substrate part 1255.

The first substrate side portion 1255*a* may be coupled and electrically connected to the first coil 1252*a*. In addition, the first substrate side portion 1255*a* may be coupled and electrically connected to the first Hall sensor 1253*a*.

The second substrate side portion 1255*b* may be coupled and electrically connected to the second coil 1252*b*. In addition, it should be understood that the second substrate side portion 1255*b* may also be coupled and electrically connected to the second Hall sensor 1253*b*.

In addition, the first substrate side portion 1255*a* and the second substrate side portion 1255*b* may extend in the third direction (Z axis direction). Accordingly, the first substrate side portion 1255*a* and the second substrate side portion 1255*b* may have regions extending in the third direction (Z axis direction) from the fifth housing side portion.

In addition, the third substrate side portion 1255*c* may be coupled and electrically connected to the third coil 1252*c*. In addition, the third substrate side portion 1255*c* may be coupled and electrically connected to the third Hall sensor 1253*c*.

FIG. 10 is a perspective view illustrating a state in which the shield can and the substrate are removed from the second camera actuator according to the embodiment. FIG. 11A is a cross-sectional view along line BB' in FIG. 10, FIG. 11B is a cross-sectional view along line CC' in FIG. 10, and FIG. 11C is a cross-sectional view along line DD' in FIG. 10.

Referring to FIGS. 10 and 11A to 11C, the first coil 1252*a* may be positioned on the first housing side portion 1221, and the first magnet 1251*a* and the first coupling member 1254*a* may be positioned on the first holder outer side surface 1231S1 of the holder 1231.

In addition, the first coil 1252*a* and the first magnet 1251*a* may be positioned opposite to each other. At least a part of the first magnet 1251*a* may overlap the first coil 1252*a* in the second direction (Y axis direction). In addition, at least a part of the first coupling member 1254*a* may overlap the first coil 1252*a* in the second direction (Y axis direction).

In addition, the second coil 1252*b* may be positioned on the second housing side portion 1222, and the second magnet 1251*b* and the second coupling member 1254*b* may be positioned on the second holder outer side surface 1231S2 of the holder 1231. Accordingly, the second coil 1252*b* and the second magnet 1251*b* may be positioned opposite to each other. At least a part of the second magnet 1251*b* may overlap the second coil 1252*b* in the second direction (Y axis direction). In addition, at least a part of the second coupling member 1254*b* may overlap the second coil 1252*b* in the second direction (Y axis direction).

In addition, the first coil 1252*a* and the second coil 1252*b* may overlap in the second direction (Y axis direction), and the first magnet 1251*a* and the second magnet 1251*b* may overlap in the second direction (Y axis direction). With this configuration, an electromagnetic force applied to the outer side surfaces (the first holder outer side surface and the second holder outer side surface) of the holder is positioned along an axis parallel to the second direction (Y axis direction), and thus an X axis tilt can be accurately and precisely performed.

In addition, as described above, the first Hall sensor 1253*a* and the second Hall sensor 1253*b* may be positioned outside to be electrically connected and coupled to the substrate part 1255. However, positions of the first Hall sensor 1253*a* and the second Hall sensor 1253*b* are not limited thereto.

In addition, the third coil 1252*c* may be positioned on the third housing side portion 1223, and the third magnet 1251*c* may be positioned on the third holder outer side surface 1231S3 of the holder 1231. At least a part of the third coil 1252*c* and the third magnet 1251*c* may overlap in the first direction (X axis direction). Accordingly, the magnitude of an electromagnetic force between the third coil 1252*c* and the third magnet 1251*c* can be easily controlled.

As described above, the guide part 1240 may be positioned between the holder 1231 and the fourth housing side portion 1224.

In addition, at least a part of the first elastic part 1242 may be disposed to overlap the line or the like which bisects the mover 1230 in the second direction (Y axis direction). That is, the first elastic part 1242 may be positioned in a central portion of the holder 1231 of the mover 1230.

Accordingly, in the first elastic part 1242, the support part coupled to the 1-1 coupling region may move in the second direction (Y axis direction) based on the first pattern region in which the first pattern PT1 is positioned, or a first axis tilt thereof may be performed.

In the guide part 1240, the first elastic part 1242 may be coupled to the protruding part CHP positioned on one surface of the coupling hole CH of the housing 1220. In the first elastic part 1242, the elastic groove 1242*p*1 positioned in the 1-2 coupling region and the protruding part CHP may be coupled to each other.

In addition, the 1-2 elastic groove 1242*p*2 positioned in the 1-1 coupling region may be coupled to the first coupling protrusion PP1 of the support part 1241. Accordingly, the housing 1220, the first elastic part 1242, and the support part 1241 may be coupled to each other. In addition, the support part 1241 may be coupled to the second coupling protrusion PP2 of the support part 1241 through the second elastic part 1243. In addition, the second elastic part 1243 may be coupled to the mover protrusion of the mover through the 2-2 coupling region. Accordingly, all of the housing 1220, the guide part 1240, and the mover 1230 may be coupled, and a two-axis tilt of the mover may be performed by the first elastic part 1241 and the second elastic part 1242.

In addition, a lower surface of the 1-1 elastic groove 1242*p*1 and a lower surface of the 1-2 elastic groove 1242*p*2 may be coplanar.

In addition, the 1-2 elastic holes 1242*h*2 and the 1-1 elastic holes 1242*h*1 may be disposed side by side in the third direction (Z axis direction). Accordingly, a coupling force can be further increased.

FIG. 12 is an exemplary view illustrating movement of the second camera actuator illustrated in FIG. 11A, and FIG. 13 is an exemplary view illustrating movement of the second camera actuator illustrated in FIGS. 11B and 11C.

Referring to FIG. 12, a Y axis tilt may be performed. That is, rotation may be performed in the first direction (X axis direction) to implement OIS.

In the embodiment, the third magnet 1251*c* disposed in the lower portion of the holder 1231 and the third coil 1252*c* may generate an electromagnetic force to tilt or rotate the mover 1230 in the first direction (X axis direction). That is, by the above-described electromagnetic force, the holder 1231 and the second elastic part 1243 coupled to the holder 1231 may move in the first direction (X axis direction).

More specifically, the 2-2 coupling region of the second elastic part 1243 and the mover 1230 may rotate in the first direction (X axis direction) based on the second pattern region.

That is, the mover 1230 may rotate or tilt based on the second pattern or the second pattern region serving as a reference axis (or a rotation axis).

For example, while the mover 1230 is rotated (X1→X1a or X1→X1b) by a first angle θ1 in the X axis direction by first electromagnetic forces F1A and F1B between the third magnet 1251*c* disposed in the third seating groove and the third coil 1252*c* disposed on the third substrate side portion, OIS may be implemented. The first angle θ1 may be in the range of ±1° to ±3°. However, the present invention is not limited thereto.

Referring to FIG. 13, an X axis tilt may be performed. That is, rotation may be performed in the second direction (Y axis direction) to implement OIS.

OIS may be implemented while the mover 1230 tilts or rotates (or X axis tilts) in the Y axis direction.

In the embodiment, the first magnet 1251*a* and the second magnet 1251*b*, which are disposed in the holder 1231, along with the first coil 1252*a* and the second coil 1252*b* may generate an electromagnetic force to tilt or rotate the guide part 1240 and the mover 1230 in the second direction (Y axis direction). That is, by the above-described electromagnetic force, the holder 1231 and the guide part 1240 coupled to the holder 1231 may rotate or move in the second direction (Y axis direction).

Specifically, in the guide part 1240, the 1-1 coupling region of the first elastic part 1242, the support part 1241, the second elastic part 1243, and the mover 1231 may rotate or tilt in the second direction (X axis tilt) based on the first pattern or the first pattern region of the first elastic part 1242 serving as a reference axis (or a rotation axis).

For example, while mover 1230 is rotated (Y1→Y1a or Y1→Y1b) by a second angle θ2 in the Y axis direction by second electromagnetic forces F2A and F2B between the first and second magnets 1251*a* and 1251*b*, which are disposed in the first seating groove, and the first and second coils 1252*a* and 1252*b*, which are disposed on the first and second substrate side portions, OIS may be implemented. The second angle θ2 may be in the range of ±1° to ±3°. However, the present invention is not limited thereto.

As described above, the second camera actuator according to the embodiment may minimize a decent or tilt phenomenon to provide best optical properties when OIS is implemented by controlling the guide part 1240 and the mover 1230 to rotate in the first direction (X axis direction) or the second direction (Y axis direction) using an electromagnetic force between the driving magnet in the holder and the driving coil disposed in the housing. In addition, as described above, the term "Y axis tilt" corresponds to rotation or tilting in the first direction (X axis direction), and the term "X axis tilt" corresponds to rotation or tilting in the second direction (Y axis direction).

FIG. 14 is a perspective view illustrating a second camera actuator according to another embodiment, and FIG. 15 is an exploded perspective view illustrating the second camera actuator according to another embodiment.

Referring to FIGS. 14 and 15, a second camera actuator 1200 according to the embodiment includes a shield can 1210, a housing 1220, a mover 1230, a rotating plate 1240, and a driving part 1250. In addition, it should be understood that components are not assembled along a line (for example, a dashed two-dotted line) illustrated in the exploded perspective view. In the second camera actuator 1200 according to another embodiment, the shield can 1210, the housing 1220, the mover 1230, and the driving part 1250 which are described above, correspond to the shield can 1210, the housing 1220, the mover 1230, and the driving part 1250 which will be described below, and the above-described content may be applied thereto. In addition, although the rotating plate 1240 which will be described below is different from the guide part 1240 which performs the X axis tilt and Y axis tilt, the rotating plate 1240 may perform tilt driving in the same manner. In addition, other components except for the rotating plate and the components coupled to the guide part may be equally applied to the embodiment and another embodiment.

First, the mover 1230 includes a holder 1231, an optical member 1232 seated on the holder 1231, and a plate cover 1233 which covers the rotating plate 1240 and is coupled to the holder 1231. The rotating plate 1240 may be positioned between the holder 1231 and the plate cover 1233 and may be coupled to the mover 1230 and the housing 1220. In addition, the rotating plate 1240 may perform a tilt with respect to two axes. In the embodiment, the rotating plate 1240 may rotate (to correspond to a second axis tilt) in a first direction (X axis direction). In addition, the rotating plate 1240 may rotate (to correspond to a first axis tilt) in a second direction (Y axis direction). In addition, the driving part 1250 includes a driving magnet 1251, a driving coil 1252, a Hall sensor part 1253, a coupling part 1254, and a substrate part 1255. Hereinafter, the components will be described.

The shield can 1210 may be positioned at one region (for example, an outermost side) of the second camera actuator 1200 to surround the rotating plate 1240 and the driving part 1250 which will be described below.

The shield can 1210 may block or reduce electromagnetic waves generated from the outside. Accordingly, the occurrence of a malfunction in the rotating plate 1240 or the driving part 1250 can be reduced.

The housing 1220 may be disposed in the shield can 1210. In addition, the housing 1220 may be positioned inside the substrate part 1255. The housing 1220 may be fastened to the shield can 1210 by being fitted thereinto or aligned therewith.

The housing 1220 may include a plurality of housing side portions. In the embodiment, the housing 1220 may include a first housing side portion to a fifth housing side portion. Details thereof will be described below.

The housing 1220 may include an accommodation portion 1226 which is a cavity between the plurality of housing side portions.

The mover 1230 includes the holder 1231 and the optical member 1232 seated on the holder 1231.

The holder 1231 may be seated in the accommodation portion 1226 of the housing 1220. The holder 1231 may include a first holder outer side surface to a fourth holder outer side surface respectively corresponding to the first housing side portion, the second housing side portion, the third housing side portion, and the fourth housing side portion. Details thereof will be described below.

The optical member 1232 may be seated on the holder 1231. To this end, the holder 1231 may include a seating surface, and the seating surface may be formed by the accommodation portion. The optical member 1232 may include a reflective part disposed therein. However, the present invention is not limited thereto. In addition, the optical member 1232 may reflect light reflected from the outside (for example, an object) into the camera module. In other words, the optical member 1232 may address a spatial limitation of a first camera actuator and the second camera actuator by changing a path of reflected light. Accordingly, it should be understood that the camera module may also provide a wide range of magnification by increasing an optical path while minimizing a thickness.

The optical member 1232 may be formed with a prism, mirror, or the like formed with at least one lens.

The rotating plate 1240 may be disposed in the mover 1230. In addition, the rotating plate 1240 may be surrounded by the plate cover 1233 and holder 1231 of the mover 1230 and coupled to the mover 1230. In addition, the rotating plate 1240 may be coupled to the housing 1220 through second protruding parts.

The rotating plate 1240 may include first protruding parts protruding upward and downward (for example, toward a third housing side portion and the shield can) and the second protruding parts protruding toward the housing (for example, the first housing side portion and the second housing side portion). The mover 1230 may perform a first axis tilt and a second axis tilt using the first protruding parts and the second protruding parts. Details thereof will be described below.

The driving part 1250 includes the driving magnet 1251, the driving coil 1252, the Hall sensor part 1253, the coupling part 1254, and the substrate part 1255.

The driving magnet 1251 may include a plurality of magnets. In the embodiment, the driving magnet 1251 may include a first magnet 1251*a*, a second magnet 1251*b*, and a third magnet 1251*c*.

Each of the first magnet 1251*a*, the second magnet 1251*b*, and the third magnet 1251*c* may be positioned in one of the outer side surfaces of the holder 1231. In addition, the first magnet 1251*a* and the second magnet 1251*b* may be positioned to face each other. In addition, the third magnet 1251*c* may be positioned on the bottom surface among the outer side surfaces of the holder 1231. Details thereof will be described below.

The driving coil 1252 may include a plurality of coils. In the embodiment, the driving coil 1252 may include a first coil 1252*a*, a second coil 1252*b*, and a third coil 1252*c*.

The first coil 1252*a* may be positioned opposite to the first magnet 1251*a*. Accordingly, as described above, the first coil 1252*a* may be positioned in a first housing hole 1221*a* of a first housing side portion 1221.

In addition, the second coil 1252*b* may be positioned opposite to the second magnet 1251*b*. Accordingly, as described above, the second coil 1252*b* may be positioned in a second housing hole 1222*a* of a second housing side portion 1222.

The first coil 1252*a* may be positioned to face the second coil 1252*b*. That is, the first coil 1252*a* and the second coil 1252*b* may be symmetrically positioned with respect to the first direction. This may be equally applied to the first magnet 1251*a* and the second magnet 1251*b*. Due to this configuration, X axis tilting can be accurately performed without being inclined toward one side by an electromagnetic force between the first coil 1252*a* and the first magnet 1251*a* and an electromagnetic force between the second coil 1252*b* and the second magnet 1251*b*.

The third coil 1252*c* may be positioned opposite to the third magnet 1251*c*. Accordingly, as described above, the third coil 1252*c* may be positioned in a third housing hole 1223*a* of a third housing side portion 1223. The third coil 1252*c* and the third magnet 1251*c* generate an electromagnetic force to perform Y axis tilting of the mover 1230 and the guide part 1240 based on the housing 1220.

In this case, the X axis tilting is tilting with respect to the X axis (or is tilting with respect to a reference axis that is the X axis), and Y axis tilting is tilting with respect to the Y axis (or is tilting with respect to a reference axis that is the Y axis). In addition, the first direction is the X axis direction in the drawings and may be interchangeably used with a second axis direction, a second axis, and the like. The second direction is the Y axis direction in the drawings and may be interchangeably used with a first axis direction, a first axis, and the like. The second direction is a direction perpendicular to the first direction. In addition, a third direction is a Z axis direction in the drawings and may be interchangeably used with a third axis direction and the like. In addition, the third direction is a direction perpendicular to both the first direction and the second direction. In addition, in the present invention, the first direction (X axis direction) corresponds to a direction of an optical axis of light incident into the second camera actuator, and the second direction (Y axis direction) and the third direction (Z axis direction) are directions perpendicular to the optical axis and may be tilted by the second camera actuator. The third direction may correspond to a direction from the rotating plate to the optical member or the holder. In addition, a bottom surface refers to one side in the first direction, and in the housing, the third housing side portion may be the bottom surface, inward may be a direction toward a center of the camera actuator, and outward may be an opposite direction thereof. In the present invention, the present invention should be understood based on the above-described content. However, in the first camera actuator, which will be described below, it should be understood that the optical axis may also be changed to the Z axis.

The Hall sensor part 1253 may include a plurality of Hall sensors. In the embodiment, the Hall sensor part 1253 may include a first Hall sensor 1253*a*, a second Hall sensor 1253*b*, and a third Hall sensor 1253*c*. The first Hall sensor 1253*a* and the second Hall sensor 1253*b* may be positioned inside the first coil 1252*a* or the second coil 1252*b*. The first Hall sensor 1253*a* and the second Hall sensor 1253*b* may detect a change in magnetic flux inside the first coil 1252*a* or the second coil 1252*b*. Accordingly, position sensing between the first and second magnets 1251*a* and 1251*b* and the first Hall sensor 1253*a* and the second Hall sensor 1253*b* may be performed. The camera actuator according to the embodiment may control the X axis tilt using this.

In addition, the third Hall sensor 1253*c* may be positioned inside the third coil 1252*c*. The third Hall sensor 1253*c* may detect a change in magnetic flux inside the third coil 1252*c*. Accordingly, position sensing between the third magnet 1251*c* and the third Hall sensor 1253*c* may be performed. The camera actuator according to the embodiment may control the Y axis tilt using this.

The coupling part 1254 may include a first coupling member 1254*a*, a second coupling member 1254*b*, and a third coupling member 1254*c*.

Each of the first coupling member 1254*a*, the second coupling member 1254*b*, and the third coupling member 1254*c* may be positioned in one of the seating grooves formed in the outer side surfaces of the holder 1231. In addition, the first coupling member 1254*a* and the second coupling member 1254*b* may be positioned to face each other. In addition, the third coupling member 1254*c* may be positioned on the bottom surface (for example, the third holder outer side surface) among the outer side surfaces of the holder 1231.

In addition, the first coupling member 1254*a*, the second coupling member 1254*b*, and the third coupling member 1254*c* may each be positioned between the first magnet 1251*a* to the third magnet 1251*c* and the holder 1231.

The first coupling member 1254*a*, the second coupling member 1254*b*, and the third coupling member 1254*c* may be yokes. Accordingly, the first coupling member 1254*a*, the second coupling member 1254*b*, and the third coupling member 1254*c* may be respectively coupled to the first magnet 1251*a*, the second magnet 1251*b*, and the third magnet 1251*c*.

In addition, the first coupling member 1254*a*, the second coupling member 1254*b*, and the third coupling member 1254*c* may be respectively disposed in a first seating groove, a second seating groove, and a third seating groove of the holder 1231 and may be easily coupled to the first seating groove, the second seating groove, and the third seating groove using an adhesive member injected through grooves formed in the first seating groove, the second seating groove, and the third seating groove.

Accordingly, the first magnet 1251*a*, the second magnet 1251*b*, and the third magnet 1251*c* may be easily coupled to the holder 1231 by the first coupling member 1254*a*, the second coupling member 1254*b*, and the third coupling member 1254*c*, respectively.

Each of the first magnet 1251*a*, the second magnet 1251*b*, and the third magnet 1251*c* may be positioned in one of the outer side surfaces of the holder 1231. In addition, the first magnet 1251*a* and the second magnet 1251*b* may be positioned to face each other. In addition, the third magnet 1251*c* may be positioned on the bottom surface among the outer side surfaces of the holder 1231. Details thereof will be described below.

The substrate part 1255 may be positioned under the driving part 1250. The substrate part 1255 may be electrically connected to the driving coil 1252 and the Hall sensor part 1253. For example, the substrate part 1255 may be coupled to the driving coil 1252 and the Hall sensor part 1253 through surface-mount technology (SMT). However, the present invention is not limited to such a manner.

The substrate part 1255 may be positioned between the shield can 1210 and the housing 1220 and coupled to the shield can 1210 and the housing 1220. The coupling method may be variously performed as described above. In addition, through the above coupling, the driving coil 1252 and the Hall sensor part 1253 may be positioned inside the outer side surfaces of the housing 1220.

The substrate part 1255 may include a circuit board having an electrically connectable wiring pattern such as a rigid printed circuit board (rigid PCB), a flexible PCB, a rigid-flexible PCB, or the like. However, the present invention is not limited to such a type.

FIG. 16A is a perspective view illustrating the housing according to another embodiment, FIG. 16B is a side view illustrating the housing viewed in a direction KD in FIG. 16A, and FIG. 16C is a side view illustrating the fifth housing side portion. FIG. 16D is a side view illustrating the first housing side portion and a second housing side portion, FIG. 16E is a top view illustrating the housing according to another embodiment, and FIG. 16F is a bottom view illustrating the housing according to another embodiment. FIG. 16G is a perspective view illustrating the fourth housing side portion, and FIG. 16H is a view illustrating an inner side surface of the fourth housing side portion.

Referring to FIGS. 16A to 16I, the housing 1220 may include the first housing side portion 1221, the second housing side portion 1222, the third housing side portion 1223, a fourth housing side portion 1224, and a fifth housing side portion 1225.

The first housing side portion 1221 and the second housing side portion 1222 may be disposed to face each other. In addition, the third housing side portion 1223 may be disposed at the bottom surface of the housing 1220. The fourth housing side portion 1224 and the fifth housing side portion 1225 may be disposed to face each other and disposed between the first housing side portion 1221 and the second housing side portion 1222.

The third housing side portion 1223 may be in contact with the first housing side portion 1221, the second housing side portion 1222, the fourth housing side portion 1224, and the fifth housing side portion 1225.

The first housing side portion 1221 may include the first housing hole 1221*a*. The first coil, which will be described below, may be positioned in the first housing hole 1221*a*.

The first housing side portion 1221 may include a first coupling protrusion (not shown). The first housing side portion 1221 may be easily coupled to the substrate part using the first coupling protrusion (not shown).

In addition, the first housing side portion 1221 may include a first seating protrusion 1221*c*. The first seating protrusion 1221*c* may be positioned in an upper portion or a lower portion of the first housing side portion 1221. The first seating protrusion 1221*c* may easily support the substrate part. Accordingly, a coupling force between the first housing side portion and the substrate part can be increased.

In addition, the first housing side portion 1221 and the second housing side portion 1222 may include second protrusion accommodation grooves G2 formed inward from side surfaces or convexly formed in the third direction. The second protrusion accommodation grooves G2 include a 2-1 protrusion accommodation groove G2*a* and a 2-2 protrusion accommodation groove G2*b*, and hereinafter, the present invention will be described based thereon. First, the first housing side portion 1221 may include the 2-1 protrusion accommodation groove G2*a* formed inward from the side surface.

The 2-1 protrusion accommodation groove G2*a* may be disposed in a surface at which the first housing side portion 1221 is in contact with the fourth housing side portion 1224. The 2-1 protrusion accommodation groove G2*a* may be positioned to correspond to a 1-1 protrusion accommodation groove G1*a* of the fourth housing side portion 1224 which will be described below.

The second protruding parts, which will be described below, may be seated between the 2-1 protrusion accommodation groove G2*a* and the 1-1 protrusion accommodation groove G1*a*. Accordingly, the rotating plate, the housing 1220, and the mover 1230 may be coupled to each other.

In addition, the second housing side portion 1222 may include the second housing hole 1222*a*. In addition, the second coil, which will be described below, may be positioned in the second housing hole 1222*a*.

The first housing hole 1221*a* and the second housing hole 1222*a* may be positioned to face each other. For example, the first housing hole 1221*a* and the second housing hole 1222*a* may be symmetrically disposed with respect to the first direction (X axis direction) or the third direction (Z axis direction). In addition, the first coil and the second coil may be electrically connected and coupled to the substrate part disposed outside the part housing 1220 through the first housing hole 1221*a* and the second housing hole 1222*a*. The first coil and the second coil may be electrically connected to the substrate part, and a current may flow therethrough. The current is a component of an electromagnetic force by which the second camera actuator may perform tilting with respect to the X axis.

The second housing side portion 1222 may include a second coupling protrusion (not shown). The second housing side portion 1222 may be easily coupled to the substrate part using the second coupling protrusion (not shown).

In addition, the second housing side portion 1222 may include a second seating protrusion 1222*c*. The second seating protrusion 1222*c* may be positioned in an upper portion or a lower portion of the second housing side portion 1222. The second seating protrusion 1222*c* may easily support the substrate part. Accordingly, a coupling force between the second housing side portion and the substrate part can be increased.

In addition, the second housing side portion 1222 may include the 2-2 protrusion accommodation groove G2*b* formed inward from the side surface. The 2-2 protrusion accommodation groove G2*b* may be disposed in a surface at which the second housing side portion 1222 is in contact with the fourth housing side portion 1224. The 2-2 protrusion accommodation groove G2*b* may be positioned to correspond to a 1-2 protrusion accommodation groove G1b of the fourth housing side portion 1224.

The second protruding parts, which will be described below, may be seated between the 2-2 protrusion accommodation groove G2b and the 1-2 protrusion accommodation groove G1b. Accordingly, the rotating plate, the housing 1220, and the mover 1230 may be coupled to each other.

In addition, the third housing side portion 1223 may include the third housing hole 1223a. The third coil, which will be described below, may be positioned in the third housing hole 1223a. The third coil may be coupled to the substrate part. In the embodiment, the third coil may be electrically connected to the substrate part 1255, and a current may flow therethrough. The current is a component of an electromagnetic force by which the second camera actuator may perform tilting with respect to the Y axis.

The third housing side portion 1223 may include a third coupling protrusion (not shown). The third housing side portion 1223 may be easily coupled to the substrate part using the third coupling protrusion (not shown).

The fourth housing side portion 1224 may be in contact with the first housing side portion 1221, the second housing side portion 1222, and the third housing side portion 1223. Particularly, the fourth housing side portion 1224 may be disposed on the third housing side portion 1223. A lower surface of the fourth housing side portion 1224 may be in contact with an upper surface of the third housing side portion 1223, and the fourth housing side portion 1224 may be supported by the third housing side portion 1223. The fourth housing side portion 1224 may not be positioned on the optical path.

The fourth housing side portion 1224 may include a first housing base 1224a, a first housing extension part 1224b, and a second housing extension part 1224c.

The first housing extension part 1224b and the second housing extension part 1224c may extend from the first housing base 1224a in the third direction (Z axis direction). Particularly, the first housing extension part 1224b and the second housing extension part 1224c extend from the first housing base 1224a toward the fifth housing side portion 1225.

The first housing base 1224a may be positioned opposite to the fifth housing side portion 1225. In addition, the first housing base 1224a may be disposed a predetermined distance apart from the plate cover, which will be described below, and may face the plate cover.

The first housing extension part 1224b and the second housing extension part 1224c may be positioned at end portions of the first housing base 1224a in the second direction (Y axis direction) and may extend in the third direction (Z axis direction).

The first housing extension part 1224b and the second housing extension part 1224c may be in contact with the first housing side portion 1221 and the second housing side portion 1222, respectively.

In addition, the fourth housing side portion 1224 may include the first protrusion accommodation groove G1 in the inner side surface. The first protrusion accommodation groove G1 may include the 1-1 protrusion accommodation groove G1a and the 1-2 protrusion accommodation groove G1b.

The 1-1 protrusion accommodation groove G1a may be positioned in a surface at which the first housing extension part 1224b and the first housing side portion 1221 are in contact with each other. In addition, the 1-2 protrusion accommodation groove G1b may be positioned in a surface at which the second housing extension part 1224c and the second housing side portion 1222 are in contact with each other.

The second protruding parts, which will be described below, may be positioned in the 1-1 protrusion accommodation groove G1a and the 1-2 protrusion accommodation groove G1b. In addition, the 1-1 protrusion accommodation groove G1a and the 1-2 protrusion accommodation groove G1b may be disposed side by side in the second direction (Y axis direction). That is, the 1-1 protrusion accommodation groove G1a and the 1-2 protrusion accommodation groove G1b may overlap in the second direction (Y axis direction). Accordingly, the second protruding parts seated in the 1-1 protrusion accommodation groove G1a and the 1-2 protrusion accommodation groove G1b may rotate based on the second direction (Y axis direction). That is, a one axis tilt may be performed by the second protruding parts.

As described above, the 1-1 protrusion accommodation groove G1a may be positioned to correspond to the 2-1 protrusion accommodation groove G2a. In addition, as described above, the 1-2 protrusion accommodation groove G1b may be positioned to correspond to the 2-2 protrusion accommodation groove G2b.

The fifth housing side portion 1225 may be disposed to face the fourth housing side portion 1224. The fifth housing side portion 1225 may include an opening 1225a. Accordingly, light passing through or reflected by the optical member may move through the opening 1225a.

In addition, the fifth housing side portion 1225 may include housing protrusions 1225b. The housing protrusions 1225b may protrude outward. The housing 1220 may be coupled to the first camera actuator, which is disposed outside, using the housing protrusions 1225b. Accordingly, the reliability of the camera module can be improved.

In addition, the fifth housing side portion 1225 may include protrusions 1225b and a pattern part (not shown) having a pattern around the housing protrusions 1225b. The pattern part (not shown) may be positioned to be stepped further inward than the housing protrusions 1225b. That is, the pattern part (not shown) may be positioned further inward than the housing protrusions 1225b.

An adhesive member may be applied on the pattern part (not shown). Accordingly, a contact area between the adhesive member and the fifth housing side portion 1225 may be increased on the pattern part (not shown). Accordingly, a coupling force of the second actuator (or the housing 1220) and the first actuator may be increased.

In addition, the housing 1220 may include the accommodation portion 1226 formed inside by the first to fifth housing side portions 1221 to 1225. The mover 1230 and the rotating plate 1240 may be positioned in the accommodation portion 1226.

FIG. 17A is a perspective view illustrating the mover according to another embodiment, and FIG. 17B is a perspective view illustrating the holder according to another embodiment. FIGS. 17C and 17D are side views illustrating the mover according to the embodiment, and FIG. 17E is a bottom view illustrating the mover according to another embodiment.

Referring to FIGS. 17A to 17E, the mover 1230 according to the embodiment may include the holder 1231, the optical member 1232 seated on the holder 1231, and the plate cover 1233 which covers the rotating plate 1240 and is coupled to the holder 1231.

First, the optical member 1232 may be seated on the holder 1231. The optical member 1232 may be the prism, the mirror, or the like as described above but is not limited thereto.

In addition, the holder 1231 may include a seating surface 1231*k* on which the optical member 1232 is seated. The seating surface 1231*k* may be an inclined surface. In addition, the holder 1231 may include a jaw portion SP at a lower portion thereof. The jaw portion SP in the holder 1231 may prevent movement of the optical member 1232. Accordingly, light incident through an upper portion may pass through the optical member 1232 and the opening of the fifth housing side portion and move in the third direction (Z axis direction).

In addition, the holder 1231 may include the plurality of outer side surfaces. For example, the holder 1231 may include a first holder outer side surface 1231S1, a second holder outer side surface 1231S2, a third holder outer side surface 1231S3, and a fourth holder outer side surface 1231S4.

The first holder outer side surface 1231S1 may be positioned to face the second holder outer side surface 1231S2. That is, the first holder outer side surface 1231S1 and the second holder outer side surface 1231S2 may be symmetrically disposed with respect to the first direction (X axis direction).

The first holder outer side surface 1231S1 may be positioned to face the first housing side portion 1221. In addition, the second holder outer side surface 1231S2 may be positioned to face the second housing side portion 1222.

In addition, the first holder outer side surface 1231S1 may include a first seating groove 1231S1*a*. In addition, the second holder outer side surface 1231S2 may include a second seating groove 1231S2*a*. The first seating groove 1231S1*a* and the second seating groove 1231S2*a* may be symmetrically disposed with respect to the first direction (X axis direction).

In addition, the first coupling member and the first magnet, which will be described below, may be disposed in the first seating groove 1231S1*a*, and the second coupling member and the second magnet 1251*b* may be disposed in the second seating groove 1231S2*a*. The first magnet and the second magnet may also be symmetrically disposed with respect to the first direction (X axis direction). In addition, the first coupling member and the second coupling member may also be symmetrically disposed with respect to the first direction (X axis direction).

In addition, the first magnet and the second magnet may overlap in the second direction, and the first coupling member and the second coupling member may overlap in the second direction. As described above, due to positions of the first and second seating grooves and the first and second magnets, electromagnetic forces induced by the magnets, may be coaxially provided to the first holder outer side surface 1231S1 and the second holder outer side surface 1231S2. For example, a region (for example, a portion in which the electromagnetic force is strongest) of the first holder outer side surface S1231S1 on which the electromagnetic force is applied and a region (for example, a portion in which the electromagnetic force is strongest) of the second holder outer side surface S1231S1 on which the electromagnetic force is applied may be positioned on an axis parallel to the second direction (Y axis direction). Accordingly, X axis tilting can be accurately performed.

In addition, the first holder outer side surface 1231S1 and the second holder outer side surface 1231S2 may additionally include grooves (not shown). Due to the grooves (not shown), a weight of the holder 1231 is decreased, and thus, when a one-axis tilt or two-axis tilt is performed, energy consumption can be minimized. That is, an amount of current applied to the first coil, the second coil, and the third coil can be minimized, and accordingly, energy efficiency can be improved. In addition, the above-described grooves (not shown) may be symmetrically disposed with respect to the first direction (X axis direction). Accordingly, a center of gravity of the holder 1231 is prevented from being biased to one side, and thus tilting can be performed by a uniform force.

The third holder outer side surface 1231S3 may be an outer side surface which is in contact with the first holder outer side surface 1231S1 and the second holder outer side surface 1231S2 and extends between the first holder outer side surface 1231S1 and the second holder outer side surface 1231S2 in the second direction (Y axis direction). Accordingly, the third holder outer side surface 1231S3 may be positioned between the first holder outer side surface 1231S1 and the second holder outer side surface 1231S2.

In addition, the third holder outer side surface 1231S3 may be the bottom surface of the holder 1231. The third holder outer side surface 1231S3 may be positioned to face the third housing side portion 1223. In addition, the third holder outer side surface 1231S3 may be in contact with the third housing side portion 1223.

In addition, the third holder outer side surface 1231S3 may include a third seating groove 1231S3*a*. The third magnet 1251*c* may be disposed in the third seating groove 1231S3*a*. In addition, at least a part of the third housing hole 1223*a* may overlap the third seating groove 1231S3*a* in the first direction (X axis direction). Accordingly, the third magnet 1251*c* in the third seating groove 1231S3*a* and the third coil 1252*c* in the third housing hole 1223*a* may be positioned to face each other. In addition, the third magnet 1251*c* and the third coil 1252*c* generate an electromagnetic force, and thus the camera actuator may perform Y axis tilting.

In addition, although the X axis tilt is performed by the plurality of magnets (the first and second magnets 1251*a* and 1251*b*), the Y axis tilt may be performed by only the third magnet 1251*c*.

In the embodiment, an area of the third seating groove 1231S3*a* may be different from an area of the first seating groove 1231S1*a* or the second seating groove 1231S2*a*. For example, the area of the third seating groove 1231S3*a* may be greater than the area of the first seating groove 1231S1*a* or the second seating groove 1231S2*a*. Due to this configuration, the Y axis tilt can be performed by current control similar to current control by which the X axis tilt is performed.

The third holder outer side surface 1231S3 may additionally include a groove 1231S3*b*. Due to the groove 1231S3*b*, a weight of the holder 1231 decreases, and thus, when the one-axis tilt or two-axis tilt is performed, energy consumption can be minimized. That is, an amount of current applied to the first coil, the second coil, and the third coil can be minimized, and accordingly, energy efficiency can be improved.

In addition, the additional groove 1231S3*b* may be provided as a plurality of grooves 1231S3*b* in the third holder outer side surface 1231S3, and when there are the plurality of grooves 1231S3*b*, the plurality of grooves 1231S3*b* may be symmetrically disposed with respect to the first direction (X axis direction).

The fourth holder outer side surface 1231S4 may be an outer side surface which is in contact with the first holder outer side surface 1231S1 and the second holder outer side surface 1231S2 and extends from the third holder outer side surface 1231S3 in the first direction (X axis direction). In addition, the fourth holder outer side surface 1231S4 may be positioned between the first holder outer side surface 1231S1 and the second holder outer side surface 1231S2.

The fourth holder outer side surface 1231S4 may include an accommodation groove PG.

The rotating plate may be seated in the accommodation groove PG. That is, the accommodation groove PG may accommodate the rotating plate.

In the embodiment, the accommodation groove PG may include a first accommodation groove PG1 and second accommodation grooves PG2. The first accommodation groove PG1 may accommodate a base, a first base protrusion, and a second base protrusion of the rotating plate. In addition, the second accommodation grooves PG2 may accommodate first extending protrusions.

A length of each of the second accommodation grooves PG2 may be different from a length of the first accommodation groove PG1 in the third direction. Accordingly, the rotating plate in the first accommodation groove PG1 may be maintained in the mover 1230. In addition, both accuracy and reliability of the camera actuator according to the embodiment can be improved.

The first accommodation groove PG1 may include a first accommodation region PG1a, a second accommodation region PG1b, and a third accommodation region PG1c in which the base is seated.

In the embodiment, the first protruding parts may be seated in the first accommodation region PG1a and the second accommodation region PG1b. In addition, the base of the rotating plate may be seated in the third accommodation region PG1c.

The first accommodation region PG1a and the second accommodation region PG1b may be positioned above and below the third accommodation region PG1c. In addition, the first accommodation region PG1a and the second accommodation region PG1b may be positioned on a bisector of the third accommodation region PG1c in the second direction (Y axis direction). In other words, the first accommodation region PG1a and the second accommodation region PG1b may be positioned at a central portion of the third accommodation region PG1c.

The second accommodation grooves PG2 may be positioned adjacent to the first accommodation groove PG1, and, as described above, provided as a plurality of second accommodation grooves PG2. The second accommodation grooves PG2 may be positioned above the first accommodation region PG1a and below the second accommodation region PG1b. In the embodiment, the second accommodation grooves PG2 may include a 2-1 accommodation groove PG2a and a 2-2 accommodation groove PG2b.

The 2-1 accommodation groove PG2a may be positioned above the first accommodation region PG1a. In addition, the 2-2 accommodation groove PG2b may be positioned below the second accommodation region PG1b.

The 2-1 accommodation groove PG2a and the 2-2 accommodation groove PG2b may be positioned to overlap in the first direction (X axis direction). In addition, the 2-1 accommodation groove PG2a and the 2-2 accommodation groove PG2b may be positioned on the bisector of the third accommodation region PG1c in the second direction (Y axis direction). In other words, the 2-1 accommodation groove PG2a and the 2-2 accommodation groove PG2b may be positioned to correspond to the central portion of the third accommodation region PG1c. Due to this configuration, a force applied to between the rotating plate and the mover 1230 may not be concentrated on one side when a tilt (for example, two-axis tilt) is performed by the first protruding parts. In other words, the tilt of the mover 1230 is not biased to one side, and thus accuracy of the tilt can be improved. In addition, a force imbalance can be addressed to improve the reliability of the component.

In addition, the fourth holder outer side surface 1231S4 may include coupling grooves 1231S4h. Coupling protrusions 1233p may be seated in the coupling grooves 1231S4h. Accordingly, the holder 1231 and the plate cover 1233 may be coupled. In addition, the holder 1231 and the plate cover 1233 may surround the rotating plate.

The coupling grooves 1231S4h may be disposed apart from the accommodation groove PG. In addition, the coupling grooves 1231S4h may be positioned at an edge of the fourth holder outer side surface 1231S4. Accordingly, even when a two-axis tilt is performed by the first protruding parts and the second protruding parts positioned at the edge of the fourth holder outer side surface 1231S4, a coupling force between the holder 1231 and the plate cover 1233 may be easily maintained.

In the embodiment, the third accommodation region PG1c may be positioned in a central portion of the fourth holder outer side surface 1231S4. In addition, the first accommodation region PG1a may be positioned above the third accommodation region PG1c. In addition, the second accommodation region PG1b may be positioned below the third accommodation region PG1c.

In addition, the 2-1 accommodation groove PG2a may be positioned above the first accommodation region PG1a. In other words, the first accommodation region PG1a may be positioned between the 2-1 accommodation groove PG2a and the third accommodation region PG1c.

In addition, the 2-2 accommodation groove PG2b may be positioned below the second accommodation region PG1b. In other words, the second accommodation region PG1b may be positioned between the 2-2 accommodation groove PG2b and the third accommodation region PG1c.

In the embodiment, a length W1 of the third accommodation region PG1c in the second direction may be greater than a length W2 of the first accommodation region PG1a or the second accommodation region PG1b, or a length W3 of the second accommodation groove PG2 in the second direction. Due to this configuration, when the holder 1231 and the plate cover 1233 tilt, a rotational force may be efficiently transmitted to the rotating plate through the base of the rotating plate. Accordingly, resistance is minimized, and thus the efficiency of the driving part can be improved.

In addition, the length W2 of the first accommodation region PG1a or the second accommodation region PG1b in the second direction may be greater than the length W3 of the second accommodation groove PG2 in the second direction. Accordingly, the rotating plate in the accommodation groove PG may be easily prevented from being separated from the holder 1231 and the plate cover 1233.

FIG. 17F is a perspective view illustrating the plate cover according to another embodiment, and FIG. 17G is one side view illustrating the plate cover according to another embodiment. FIG. 17H is a top view illustrating the plate cover according to another embodiment, and FIG. 17I is another side view illustrating the plate cover according to another embodiment.

Referring to FIGS. 17F to 17I, as described above, the plate cover 1233 may be coupled to the holder 1231.

The plate cover 1233 may include a plate groove 1233g. In addition, the plate cover 1233 may surround the rotating plate through the plate groove 1233g.

In the embodiment, the plate groove 1233g may include a first plate groove 1233g1 and second plate grooves 1233g2. The first plate groove 1233g1 may accommodate the base, the first base protrusion, and the second base protrusion of the rotating plate. In addition, the second plate grooves 1233g2 may accommodate the first extending protrusions.

A length of each of the second plate grooves 1233g2 may be different from a length of the first plate groove 1233g1 in the third direction. Accordingly, the rotating plate in the first plate groove 1233g1 may be maintained in the mover 1230. In addition, both accuracy and reliability of the camera actuator according to the embodiment can be improved.

The first plate groove 1233g1 may include a first plate region 1233g1a, a second plate region 1233g1b, and a third plate region 1233g1c.

The first protruding parts may be seated in the first plate region 1233g1a and the second plate region 1233g1b. In addition, the base of the rotating plate may be seated in the third plate region 1233g1c.

The first plate region 1233g1a and the second plate region 1233g1b may be positioned above and below the third plate region 1233g1c. In addition, the first plate region 1233g1a and the second plate region 1233g1b may be positioned on a bisector of the third plate region 1233g1c in the second direction (Y axis direction). In other words, the first plate region 1233g1a and the second plate region 1233g1b may be positioned at a central portion of the third plate region 1233g1c.

The second plate grooves 1233g2 may be positioned adjacent to the first plate groove 1233g1, and as described above, may be provided as a plurality of second plate grooves 1233g2. The second plate grooves 1233g2 may be positioned above the first plate region 1233g1a and below the second plate region 1233g1b. In the embodiment, the second plate grooves 1233g2 may include a 2-1 plate groove 1233g2a and a 2-2 plate groove 1233g2b.

The 2-1 plate groove 1233g2a may be positioned above the first plate region 1233g1a. In addition, the 2-2 plate groove 1233g2b may be positioned below the second plate region 1233g1b.

The 2-1 plate groove 1233g2a and the 2-2 plate groove 1233g2b may be positioned to overlap in the first direction (X axis direction). In addition, the 2-1 plate groove 1233g2a and the 2-2 plate groove 1233g2b may be positioned on the bisector of the third plate region 1233g1c in the second direction (Y axis direction). In other words, the 2-1 plate groove 1233g2a and the 2-2 plate groove 1233g2b may be positioned to correspond to the central portion of the third plate region 1233g1c. Due to this configuration, when a tilt (for example, two-axis tilt) is performed by the first protruding parts, a force applied to the rotating plate and the mover 1230 may not be concentrated on one side. In other words, the tilt of the mover 1230 is not biased to one side, and thus accuracy of the tilt can be improved. In addition, a force imbalance can be addressed to improve the reliability of the component.

In addition, the plate cover 1233 may include the coupling protrusions 1233p positioned on an inner side surface. The coupling protrusions 1233p may be inserted into the coupling grooves 1231S4h. Accordingly, the holder 1231 and the plate cover 1233 may be coupled. In addition, the holder 1231 and the plate cover 1233 may surround the rotating plate.

The coupling protrusions 1233p may be disposed apart from the plate groove 1233g. In addition, the coupling grooves 1231S4h may be positioned at an edge of the plate cover 1233. Accordingly, even when a two-axis tilt is performed by the first protruding parts and the second protruding parts positioned at the edge of the plate cover 1233, a coupling force between the holder 1231 and the plate cover 1233 may be easily maintained.

In the embodiment, the third plate region 1233g1c may be positioned in a central portion of the plate cover 1233. In addition, the first plate region 1233g1a may be positioned above the third plate region 1233g1c. In addition, the second plate region 1233g1b may be positioned below the third plate region 1233g1c.

In addition, the 2-1 plate groove 1233g2a may be positioned above the first plate region 1233g1a. In other words, the first plate region 1233g1a may be positioned between the 2-1 plate groove 1233g2a and the third plate region 1233g1c.

In addition, the 2-2 plate groove 1233g2b may be positioned below the second plate region 1233g1b. In other words, the second plate region 1233g1b may be positioned between the 2-2 plate groove 1233g2b and the third plate region 1233g1c.

The first plate groove 1233g1 may correspond to the first accommodation groove PG1, and the second plate grooves 1233g2 may correspond to the second accommodation grooves PG2. Accordingly, in the embodiment, a length of the third plate region 1233g1c in the second direction may be greater than a length of the first plate region 1233g1a, the second plate region 1233g1b, or the second plate groove 1233g2 in the second direction. Due to this configuration, when the holder 1231 and plate cover 1233 tilt, a rotational force may be efficiently transmitted to the rotating plate through the base of the rotating plate. Accordingly, resistance is minimized, and thus the efficiency of the driving part can be improved.

In addition, the length of the first plate region 1233g1a or the second plate region 1233g1b in the second direction may be greater than the length of the second plate groove 1233g2 in the second direction. Accordingly, the rotating plate in the plate groove 1233g may be easily prevented from being separated from the holder 1231 and the plate cover 1233.

FIG. 18A is a perspective view illustrating the rotating plate according to another embodiment, and FIG. 18B is a front view illustrating the rotating plate according to another embodiment. FIG. 18C is a cross-sectional view illustrating the rotating plate along line AA' in FIG. 18A, and FIG. 18D is a top view illustrating the rotating plate according to another embodiment.

The rotating plate 1240 according to the embodiment may include a base BS, first protruding parts PR1 disposed on an upper surface and a lower surface facing each other in the first direction (X axis direction) of the base BS and second protruding parts PR2 disposed on side surfaces facing each other in the second direction (Y axis direction) of the base BS. According to a structure, surfaces on which the first protruding parts and the second protruding parts are formed may be opposite to each other, but, in the present specification, the present invention will be described based on the above-described content.

In the embodiment, the base BS may have a quadrangular shape on a plane. In the base BS, a length in the second direction (Y axis direction) may be greater than a length in the first direction (X axis direction). However, the base BS is not limited thereto and may be formed in one of various shapes.

As described above, the first protruding parts PR1 may be respectively positioned on an upper surface and a lower surface symmetrically disposed on the base BS in the first direction (X axis direction). For example, the first protruding parts PR1 may include a 1-1 protruding part on an upper surface of the base BS and a 1-2 protruding part on the lower surface of the base BS. However, hereinafter, the present invention will be described based on the first protruding parts.

One of the first protruding parts PR1 may include a first base protrusion PRB1 disposed above (or below) the base BS.

In addition, the first protruding part PR1 may include a first extending protrusion PRP1 disposed between the first base protrusion PRB1 and the base BS. The first extending protrusion PRP1 may be disposed on the first base protrusion PRB1.

Each of the first base protrusions PRB1 and the first extending protrusions PRP1 may have a circular shape on a YZ plane. Accordingly, the rotating plate 1240 may easily perform a tilt (second axis tilt) with respect to the first direction (X axis direction).

The first protruding part PR1 may be positioned on a bisector VL1 of the base BS in the third direction (Z axis direction). In addition, starting points C1 and C2 of the first protruding part PR1 may be positioned on the bisector VL1 of the base BS in the third direction (Z axis direction). Accordingly, when a tilt is performed, a force applied to the base BS is uniform, and thus the reliability of the element can be improved.

As described above, the second protruding parts PR2 may be respectively positioned on two side surfaces symmetrically disposed on the base BS in the second direction (Y axis direction). For example, the second protruding parts PR2 may include a 2-1 protruding part on one side surface of the base BS and a 2-2 protruding part on the other side surface of the base BS. However, hereinafter, the present invention will be described based on the second protruding parts.

The second protruding parts PR2 may include second base protrusions PRB2 disposed on (the side surfaces of the) base BS.

In addition, the second protruding parts PR2 may include second extending protrusions PRP2 disposed between the second base protrusions PRB2 and the base BS. The second extending protrusions PRP2 may be disposed on the second base protrusions PRb2.

Each of the second base protrusions PRB2 and the second extending protrusions PRP2 may have a circular shape on an XZ plane. Accordingly, the rotating plate 1240 may easily perform a tilt (first axis tilt) with respect to the second direction (Y axis direction).

The second protruding parts PR2 may be positioned on a bisector of the base BS in the first direction (X axis direction). In addition, starting points of the second protruding parts PR2 may be positioned on the bisector of the base BS in the third direction (Z axis direction). Accordingly, when a tilt is performed, a force applied to the base BS is uniform, and thus the reliability of the element can be improved.

In addition, as described above, the first protruding part PR1 may be provided as a plurality of first protruding parts PR1 that may overlap in the first direction (X axis direction). In addition, as described above, the second protruding part PR2 may be provided as a plurality of second protruding parts PR2 that may overlap in the second direction (Y axis direction). Accordingly, the camera actuator according to the embodiment can perform an accurate tilt.

In addition, a length W4 of the base BS in the second direction (Y axis direction) may be greater than a length r1 of the first base protrusion PRB1 and a length r2 of the first extending protrusion PRP1 in the second direction (Y axis direction). As described above, since each of the first base protrusion PRB1 and the first extending protrusion PRP1 has the circular shape on the plane, the lengths r1 and r2 in the second direction (Y axis direction) may be diameters, and the present invention will be described based thereon. Due to this configuration, a rotational force may be efficiently transmitted to the rotating plate through the base of the rotating plate. Accordingly, resistance is minimized, and thus the efficiency of the driving part can be improved.

In addition, the first protruding parts PR1 may be in contact with a lubricating member applied in the second accommodation grooves PG2 and the second plate grooves 1223g2. The second protruding parts PR2 may be in contact with the lubricating member applied in the first protrusion accommodation grooves G1 and the second protrusion accommodation grooves G2.

In addition, a diameter r1 of the first base protrusion PRB1 according to the embodiment may be greater than a diameter r2 of the first extending protrusion PRP1. Accordingly, the rotating plate 1240 may not be separated from between the holder and the plate cover in the first direction (X axis direction) by the first base protrusions PRB1.

In addition, a length h1 of the base BS in the first direction (X axis direction) may be greater than a length h2 of the second base protrusion PRB2 and a length h3 of the second extending protrusion PRP2 in the first direction (X axis direction). As described above, since each of the second base protrusions PRB2 and the second extending protrusions PRP2 has the circular shape on the plane, the lengths h2 and h3 in the first direction (X axis direction) may be diameters, and the present invention will be described based thereon. In addition, by the above configuration, a rotational force may be efficiently transmitted to the rotating plate through the base of the rotating plate. Accordingly, resistance is minimized, and thus the efficiency of the driving part can be improved.

In addition, a diameter h2 of the second base protrusion PRB2 according to the embodiment may be greater than a diameter h3 of the second extending protrusion PRP2. Accordingly, the rotating plate 1240 may not be separated from between the holder and the plate cover in the second direction (Y axis direction) by the second base protrusions PRB2.

FIG. 19 is a view illustrating the driving part according to another embodiment.

Referring to FIG. 19, as described above, the driving part 1250 includes the driving magnet 1251, the driving coil 1252, the Hall sensor part 1253, the coupling part 1254, and the substrate part 1255.

In addition, as described above, the driving magnet 1251 may include the first magnet 1251a, the second magnet 1251b, and the third magnet 1251c which provide a driving force by an electromagnetic force. Each of the first magnet 1251a, the second magnet 1251b, and the third magnet 1251c may be positioned in one of the outer side surfaces of the holder 1231.

In addition, the driving coil 1252 may include a plurality of coils. In the embodiment, the driving coils 1252 may include the first coil 1252a, the second coil 1252b, and the third coil 1252c.

The first coil 1252a may be positioned opposite to the first magnet 1251a. Accordingly, as described above, the first coil 1252a may be positioned in the first housing hole 1221a of the first housing side portion 1221. In addition, the second coil 1252*b* may be positioned opposite to the second magnet 1251*b*. Accordingly, as described above, the second coil 1252*b* may be positioned in the second housing hole 1222*a* of the second housing side portion 1222.

The second camera actuator according to the embodiment can minimize the occurrence of a decent or tilt phenomenon to provide best optical properties when OIS is implemented by controlling the mover 1230 to rotate in the first direction (X axis direction) or the second direction (Y axis direction) using an electromagnetic force between the driving magnet 1251 and the driving coil 1252.

In addition, according to the embodiment, since OIS is implemented using the rotating plate 1240 of the guide part disposed between the housing 1220 and the mover 1230, a size limitation of the actuator is addressed, and thus an ultra-slim and ultra-small camera actuator and a camera module including the same can be provided.

The coupling part 1254 may include the first coupling member 1254*a*, the second coupling member 1254*b*, and the third coupling member 1254*c*.

In addition, the first coupling member 1254*a*, the second coupling member 1254*b*, and the third coupling member 1254*c* may each be positioned between the first magnet 1251*a* to the third magnet 1251*c* and the holder 1231.

The first coupling member 1254*a*, the second coupling member 1254*b*, and the third coupling member 1254*c* may be yokes. Accordingly, the first coupling member 1254*a*, the second coupling member 1254*b*, and the third coupling member 1254*c* may be respectively coupled to the first magnet 1251*a*, the second magnet 1251*b*, and the third magnet 1251*c*.

In addition, the first coupling member 1254*a*, the second coupling member 1254*b*, and the third coupling member 1254*c* may be respectively disposed in the first seating groove, the second seating groove, and the third seating groove and may be easily respectively coupled to the first seating groove, the second seating groove, and the third seating groove by the adhesive member injected through the grooves formed in the first seating groove, the second seating groove, and the third seating groove.

The substrate part 1255 may include a first substrate side portion 1255*a*, a second substrate side portion 1255*b*, and a third substrate side portion 1255*c*.

The first substrate side portion 1255*a* and the second substrate side portion 1255*b* may be disposed to face each other. In addition, the third substrate side portion 1255*c* may be positioned between the first substrate side portion 1255*a* and the second substrate side portion 1255*b*.

In addition, the first substrate side portion 1255*a* may be positioned between the first housing side portion and the shield can, and the second substrate side portion 1255*b* may be positioned between the second housing side portion and the shield can. In addition, the third substrate side portion 1255*c* may be positioned between the third housing side portion and the shield can and may be a bottom surface of the substrate part 1255.

The first substrate side portion 1255*a* may be coupled and electrically connected to the first coil 1252*a*. In addition, the first substrate side portion 1255*a* may be coupled and electrically connected to the first Hall sensor 1253*a*.

The second substrate side portion 1255*b* may be coupled and electrically connected to the second coil 1252*b*. In addition, it should be understood that the second substrate side portion 1255*b* may also be coupled and electrically connected to the second Hall sensor 1253*b*.

In addition, the first substrate side portion 1255*a* and the second substrate side portion 1255*b* may extend in the third direction (Z axis direction). Accordingly, the first substrate side portion 1255*a* and the second substrate side portion 1255*b* may have regions extending in the third direction (Z axis direction) from the fifth housing side portion.

In addition, the third substrate side portion 1255*c* may be coupled and electrically connected to the third coil 1252*c*. In addition, the third substrate side portion 1255*c* may be coupled and electrically connected to the third Hall sensor 1253*c*.

FIG. 20 is a perspective view illustrating a state in which the shield can and the substrate is removed from the second camera actuator according to the embodiment. FIG. 21A is a cross-sectional view along line BB' in FIG. 20, FIG. 21B is a cross-sectional view along line CC' in FIG. 20, and FIG. 21C is a cross-sectional view along line DD' in FIG. 20.

Referring to FIGS. 20 and 21A to 21C, the first coil 1252*a* may be positioned on the first housing side portion 1221, and the first magnet 1251*a* and the first coupling member 1254*a* may be positioned on the first holder outer side surface 1231S1 of the holder 1231.

In addition, the first coil 1252*a* and the first magnet 1251*a* may be positioned opposite to each other. At least a part of the first magnet 1251*a* may overlap the first coil 1252*a* in the second direction (Y axis direction). In addition, at least a part of the first coupling member 1254*a* may overlap the first coil 1252*a* in the second direction (Y axis direction).

In addition, the second coil 1252*b* may be positioned on the second housing side portion 1222, and the second magnet 1251*b* and the second coupling member 1254*b* may be positioned on the second holder outer side surface 1231S2 of the holder 1231. Accordingly, the second coil 1252*b* and the second magnet 1251*b* may be positioned opposite to each other. At least a part of the second magnet 1251*b* may overlap the second coil 1252*b* in the second direction (Y axis direction). In addition, at least a part of the second coupling member 1254*b* may overlap the second coil 1252*b* in the second direction (Y axis direction).

In addition, the first coil 1252*a* and the second coil 1252*b* may overlap in the second direction (Y axis direction), and the first magnet 1251*a* and the second magnet 1251*b* may overlap in the second direction (Y axis direction). Due to this configuration, an electromagnetic force applied to the outer side surfaces (the first holder outer side surface and the second holder outer side surface) of the holder is positioned along an axis parallel to the second direction (Y axis direction), and thus an X axis tilt can be accurately and precisely performed.

In addition, as described above, the first Hall sensor 1253*a* and the second Hall sensor 1253*b* may be positioned outside to be electrically connected and coupled to the substrate part 1255. However, positions of the first Hall sensor 1253*a* and the second Hall sensor 1253*b* are not limited thereto.

In addition, the third coil 1252*c* may be positioned on the third housing side portion 1223, and the third magnet 1251*c* may be positioned on the third holder outer side surface 1231S3 of the holder 1231. At least a part of the third coil 1252*c* and the third magnet 1251*c* may overlap in the first direction (X axis direction). Accordingly, the magnitude of an electromagnetic force between the third coil 1252*c* and the third magnet 1251*c* can be easily controlled.

As described above, the rotating plate 1240 may be positioned between the fourth holder outer side surface 1231S4 of the holder 1231 and the plate cover 1233 (or the fourth housing side portion 1224).

The first accommodation groove PG1 positioned in a central portion in the second direction (Y axis direction) and the second accommodation grooves PG2 positioned above and below the first accommodation grooves PG1 may be disposed in the fourth holder outer side surface 1231S4. That is, the rotating plate 1240 may be seated in the accommodation groove PG of the fourth holder outer side surface 1231S4. That is, the rotating plate 1240 may be positioned in the first accommodation groove PG1 and the second accommodation grooves PG2.

In addition, the rotating plate 1240 may be positioned in the first plate groove 1233g1 and the second plate groove 1233g2. However, a part of the second protruding part PR2 may be positioned in the first protrusion accommodation groove and the second protrusion accommodation groove described above.

In addition, the base BS may be positioned in the third accommodation region PG1c and the third plate region 1233g1c. In addition, the first base protrusion PRB1 of the first protruding part PR1 may be positioned in the first accommodation region PG1a and the first plate region 1233g1a. In addition, the first base protrusion PRB1 of the first protruding part PR1 may be positioned in the second accommodation region PRG1b and the second plate region 1233g1b.

In the embodiment, the bottom surface LS of the first accommodation groove PG1 may be disposed apart from the base BS, the first base protrusion PRB1, and the second base protrusion PRB2 in the third direction (Z axis direction). In addition, the bottom surface of the first plate groove 1233g1 may be disposed apart from the base BS, the first base protrusion PRB1, and the second base protrusion PRB2 in the third direction (Z axis direction). Due to this configuration, since a space in which the rotating plate 1240 performs a two-axis tilt between the holder 1231 and the plate cover 1233 is secured, the two-axis tilt can be accurately performed.

In the embodiment, at least a part of the side surface SS of the first accommodation groove PG1 may overlap the base BS, the first base protrusion PRB1, and the second base protrusion PRB2 in the first direction (X axis direction). In addition, at least a part of a side surface of the first plate groove 1233g1 of may overlap the base BS, the first base protrusion PRB1, and the second base protrusion PRB2 in the first direction (X axis direction). Using such a structure, the rotating plate 1240 may not be separated from between the holder 1231 and the plate cover 1233 in the first direction (X axis direction) or the second direction (Y axis direction).

In addition, the second accommodation groove PG2 may overlap the first base protrusion PRB1 and the base BS in the third direction (Z axis direction). In addition, the second plate groove 1233g2 may overlap the first base protrusion PRB1 and the base BS in the third direction (Z axis direction).

In addition, a shape of the second accommodation groove PG2 may correspond to the first extending protrusion PRP1. Accordingly, the second accommodation groove PG2 may have a circular shape on a plane like the first extending protrusion PRP1.

In addition, a shape of each of the first protrusion accommodation groove G1 and the second protrusion accommodation groove G2 may also correspond to the second extending protrusion PRP2. Accordingly, each of the first protrusion accommodation groove G1 and the second protrusion accommodation groove G2 may have a circular shape like the second extending protrusion PRP2.

The length of the second accommodation groove PG2 in the third direction (Z axis direction) may be smaller than the length of the first accommodation groove PG1 in the third direction (Z axis direction).

In addition, at least a part of the second accommodation groove PG2 may be spaced a predetermined distance from the first extending protrusion PRP1. Accordingly, a space in which the holder 1231 and the plate cover 1233 may perform a tilt (first axis tilt) with respect to the second direction (Y axis direction) may be secured.

In addition, the first protrusion accommodation groove G1 and the second protrusion accommodation groove G2 may be spaced a predetermined distance from the second extending protrusion PRP2. Accordingly, a space in which the holder 1231 and the plate cover 1233 may perform a tilt (second axis tilt) with respect to the first direction (X axis direction) may be secured.

That is, separation spaces gg1, gg2, gg3, and gg4 may be present between the base BS and the holder 1231 or between the base BS and the plate cover 1233. Accordingly, when a two-axis tilt is performed, since the base BS of the rotating plate 1240 does not come in contact with the holder 1231 or the plate cover 1233, the two-axis tilt can be easily performed.

FIG. 22 is an exemplary view illustrating movement of the second camera actuator illustrated in FIG. 21A, and FIG. 23 is an exemplary view illustrating movement of the second camera actuator illustrated in FIG. 21C.

Referring to FIG. 12, a Y axis tilt may be performed. That is, rotation may be performed in the first direction (X axis direction) to implement OIS.

In the embodiment, the third magnet 1251c disposed in the lower portion of the holder 1231 and the third coil 1252c may generate an electromagnetic force to tilt or rotate the mover 1230 in the first direction (X axis direction). That is, by the above-described electromagnetic force, the holder 1231 and the plate cover 1233 coupled to the holder 1231 may move in the first direction (X axis direction).

In addition, the rotating plate 1240 may rotate or tilt based on the second protruding parts PR2 (for example, second extending protrusions) which extend in the second direction and serve as a reference axis (or a rotation axis). That is, the rotating plate 1240 may perform a Y axis tilt (or first axis tilt) based on the second protruding parts PR2 serving as the reference axis.

For example, while the mover 1230 is rotated (X1→X1a or X1→X1b) by a first angle θ1 in the X axis direction by first electromagnetic forces F1A and F1B between the third magnet 1251c disposed in the third seating groove and the third coil 1252c disposed on the third substrate side portion, OIS may be performed. The first angle θ1 may be in the range of ±1° to ±3°. However, the present invention is not limited thereto.

Referring to FIG. 23, an X axis tilt may be performed. That is, rotation may be performed in the second direction (Y axis direction) to implement OIS.

OIS may be implemented while the mover 1230 tilts or rotates (or X axis tilts) is performed in the Y axis direction.

In the embodiment, the first magnet 1251a and the second magnet 1251b, which are disposed in the holder 1231, along with the first coil 1252a and the second coil 1252b may generate an electromagnetic force to tilt or rotate the rotating plate 1240 and the mover 1230 in the second direction (Y axis direction). That is, by the above-described electromagnetic force, the holder 1231 and the plate cover 1233 coupled to the holder 1231 may rotate or move in the second direction (Y axis direction).

The rotating plate 1240 may rotate or tilt (X axis tilt) based on the first protruding parts PR1 (for example, the first extending protrusions) serving as a reference axis (or a rotation axis) in the second direction.

For example, while mover 1230 is rotated (Y1→Y1a or Y1→Y1b) by a second angle θ2 in the Y axis direction by the second electromagnetic forces F2A and F2B between the first and second magnets 1251*a* and 1251*b*, which are disposed in the first seating groove, and the first and second coils 1252*a* and 1252*b*, which are disposed on the first and second substrate side portions, OIS may be implemented. The second angle θ2 may be in the range of ±1° to ±3°. However, the present invention is not limited thereto.

As described above, the second camera actuator according to the embodiment may minimize a decent or tilt phenomenon to provide best optical properties when OIS is implemented by controlling the rotating plate 1240 and the mover 1230 to rotate in the first direction (X axis direction) or the second direction (Y axis direction) using an electromagnetic force between the driving magnet in the holder and the driving coil disposed in the housing. In addition, as described above, the term "Y axis tilt" corresponds to rotation or a tilt in the first direction (X axis direction), and the term "X axis tilt" corresponds to rotation or a tilt in the second direction (Y axis direction).

FIG. 24 is a perspective view illustrating an AF or zoom actuator according to still another embodiment of the present invention, FIG. 25 is a perspective view illustrating a state in which some components are omitted from the actuator according to the embodiment illustrated in FIG. 24, and FIG. 26 is an exploded perspective view illustrating a state in which some components are omitted from the actuator according to the embodiment illustrated in FIG. 24. FIG. 27A is a perspective view illustrating a first lens assembly in the actuator according to the embodiment illustrated in FIG. 26, and FIG. 27B is a perspective view illustrating a state in which some components are removed from the first lens assembly illustrated in FIG. 27A.

FIG. 24 is the perspective view illustrating the AF or zoom actuator according to still another embodiment of the present invention, FIG. 25 is the perspective view illustrating the state in which some components are omitted from the actuator according to the embodiment illustrated in FIG. 24, and FIG. 26 is the exploded perspective view illustrating the state in which some components are omitted from the actuator according to the embodiment illustrated in FIG. 24.

Referring to FIG. 24, an actuator 2100 according to the embodiment may include a base 2020, a circuit board 2040 disposed outside the base 2020, a driving part 2142, and a third lens assembly 2130.

FIG. 25 is the perspective view in which the base 2020 and the circuit board 2040 are omitted from the actuator 2100 in FIG. 24, and referring to FIG. 25, the actuator 2100 according to the embodiment may include a first guide part 2210, a second guide part 2220, a first lens assembly 2110, a second lens assembly 2120, a driving part 2141, and the driving part 2142.

The driving part 2141 and the driving part 2142 may include coils or magnets.

For example, when the driving part 2141 and the driving part 2142 include coils, the driving part 2141 may include a first coil part 2141*b* and a first yoke 2141*a*, and the driving part 2142 may include a second coil part 2142*b* and a second yoke 2142*a*.

Alternatively, the driving part 2141 and the driving part 2142 may also include magnets.

Referring to FIG. 26, the actuator 2100 according to the embodiment may include the base 2020, the first guide part 2210, the second guide part 2220, the first lens assembly 2110, the second lens assembly 2120, and the third lens assembly 2130.

For example, the actuator 2100 according to the embodiment may include the base 2020, the first guide part 2210 disposed at one side of the base 2020, the second guide part 2220 disposed at the other side of the base 2020, the first lens assembly 2110 corresponding to the first guide part 2210, the second lens assembly 2120 corresponding to the second guide part 2220, first balls 2117 (see FIG. 27A) disposed between the first guide part 2210 and the first lens assembly 2110, and second balls (not shown) disposed between the second guide part 2220 and the second lens assembly 2120.

In addition, the embodiment may include the third lens assembly 2130 disposed in front of the first lens assembly 2110 in an optical axis direction.

Referring to FIGS. 25 and 26, the embodiment may include the first guide part 2210 disposed adjacent to a first sidewall of the base 2020 and the second guide part 2220 disposed adjacent to a second sidewall of the base 2020.

The first guide part 2210 may be disposed between the first lens assembly 2110 and the first sidewall of the base 2020.

The second guide part 2220 may be disposed between the second lens assembly 2120 and the second sidewall of the base 2020. The first sidewall and the second sidewall of the base 2020 may be disposed to face each other.

According to the embodiment, since the lens assemblies are driven in a state in which the first guide part 2210 and the second guide part 2220, which are precisely and numerically controlled, are coupled thereto in the base 2020, a frictional torque is reduced to reduce frictional resistance, and thus, when zooming is performed, there are technical effects that a driving force is increased, power consumption is decreased, and control characteristics are improved.

Accordingly, according to the embodiment, when zooming is performed, even while the frictional torque is minimized, there is a complex technical effect that image quality or resolution is significantly improved by preventing the occurrence of a phenomenon such as lens decent, lens tilt, or central axis misalignment between a lens group and an image sensor.

Particularly, according to the present embodiment, since a guide rail is not disposed on the base, and the first guide part 2210 and the second guide part 2220, which are separately formed and assembled with the base 2020, are separately employed, there is a particular technical effect of preventing the occurrence of a gradient according to an injection direction.

In the embodiment, the first guide part 2210 and the second guide part 2220 are injected in an X axis, and thus an injected length may be smaller than that of the base 2020, and in this case, when a rail is disposed on each of the first guide part 2210 and the second guide part 2220, there are technical effects of minimizing the occurrence of a gradient and lowering the possibility of a straight line of the rail being distorted during injection molding.

More specifically, FIG. 27A is the perspective view illustrating the first lens assembly 2110 in the actuator according to the embodiment illustrated in FIG. 26, FIG. 27B is the perspective view illustrating the state in which some components are removed from the first lens assembly 2110 illustrated in FIG. 27A.

Referring briefly to FIG. 26, the embodiment may include the first lens assembly 2110 moving along the first guide part 2210 and the second lens assembly 2120 moving along the second guide part 2220.

Referring back to FIG. 27A, the first lens assembly 2110 may include a first lens barrel 2112*a* in which a first lens 2113 is disposed and a first driving part housing 2112*b* in which a driving part 2116 is disposed. The first lens barrel 2112*a* and the first driving part housing 2112*b* may be a first housing, and the first housing may have a barrel or lens barrel shape. The driving part 2116 may be a driving magnet, but is not limited thereto, and in some cases, a coil may be disposed.

In addition, the second lens assembly 2120 may include a second lens barrel (not shown) in which a second lens (not shown) is disposed and a second driving part housing (not shown) in which a driving part (not shown) is disposed. The second lens barrel (not shown) and the second driving part housing (not shown) may be a second housing, and the second housing may have a barrel shape. The driving part may be a driving magnet but is not limited thereto, and in some cases, a coil may be disposed.

The driving part 2116 may correspond to two first rails 2212.

In the embodiment, driving may be performed using a single ball or a plurality of balls. For example, the embodiment may include the first balls 2117 disposed between the first guide part 2210 and the first lens assembly 2110 and the second balls (not shown) disposed between the second guide part 2220 and the second lens assembly 2120.

For example, in the embodiment, the first balls 2117 may include a single ball or a plurality of 1-1 balls 2117*a* disposed at an upper side of the first driving part housing 2112*b* and a single ball or a plurality of 1-2 balls 2117*b* disposed at a lower side of the first driving part housing 2112*b*.

In the embodiment, among the first balls 2117, the 1-1 ball 2117*a* may move along a 1-1 rail 2212*a*, which is one of the first rails 2212, and among the first balls 2117, the 1-2 ball 2117*b* may move along a 1-2 rail 2212*b* which is the other of the first rails 2212.

According to the embodiment, since the first guide part includes the 1-1 rail and the 1-2 rail, the 1-1 rail and the 1-2 rail guide the first lens assembly 2110, and thus there is a technical effect of improving the accuracy of aligning the second lens assembly 2120 with the optical axis when the first lens assembly 2110 moves.

Referring to FIG. 27B, in the embodiment, the first lens assembly 2110 may include a first assembly groove 2112*b1* in which the first ball 2117 is disposed. The second lens assembly 2120 may include a second assembly groove (not shown) in which the second ball is disposed.

The first assembly groove 2112*b1* of the first lens assembly 2110 may be provided as a plurality of first assembly grooves 2112*b1*. In this case, among the plurality of first assembly grooves 2112*b1*, a distance between two first assembly grooves 2112*b1* in the optical axis direction may be greater than a thickness of the first lens barrel 2112*a*.

In the embodiment, each of the first assembly grooves 2112*b1* of the first lens assembly 2110 may have a "V" shape. In addition, each of the second assembly grooves (not shown) of the second lens assembly 2120 may have a "V" shape. The first assembly groove 2112*b1* of the first lens assembly 2110 may have a "U" shape or a shape in two- or three-point contact with each of the first balls 2117 instead of the "V" shape. The second assembly groove (not shown) of the second lens assembly 2120 may have a "U" shape or a shape in two- or three-point contact with each of the second balls instead of the "V" shape.

Referring to FIGS. 26 and 27A, in the embodiment, the first guide part 2210, the first balls 2117, and the first assembly grooves 2112*b1* may be disposed on a virtual straight line extending from the first sidewall toward the second sidewall. The first guide part 2210, the first balls 2117, and the first assembly grooves 2112*b1* may be disposed between the first sidewall and the second sidewall.

Next, FIG. 28 is a perspective view illustrating the third lens assembly 2130 in the actuator according to the embodiment illustrated in FIG. 26.

Referring to FIG. 28, in the embodiment, the third lens assembly 2130 may include a third housing 2021, a third barrel, and a third lens 2133.

In the embodiment, the third lens assembly 2130 includes a barrel part recess 2021*r* at an upper end of the third barrel, and thus there are complex technical effects that a thickness of the third barrel of the third lens assembly 2130 may be constantly maintained, and an amount of injection material is reduced to improve the accuracy of numerical control.

In addition, according to the embodiment, the third lens assembly 2130 may include a housing rib 2021*a* and a housing recess 2021*b* in the third housing 2021.

In the embodiment, the third lens assembly 2130 includes the housing recess 2021*b* in the third housing 2021, and thus there are complex technical effects of reducing an amount of injection material to improve the accuracy of numerical control and at the same time, securing rigidity by including the housing rib 2021*a* in the third housing 2021.

FIG. 29 is a perspective view illustrating a mobile terminal to which a camera module according to an embodiment is applied.

As illustrated in FIG. 29, a mobile terminal 1500 according to the embodiment may include camera modules 1000, a flash module 1530, and an AF device 1510.

Each of the camera modules 1000 may have an image capturing function and an AF function. For example, the camera module 1000 may have an AF function using an image.

The camera module 1000 processes a still image or an image frame of a moving image obtained through an image sensor in an image capturing mode or video call mode.

The processed image frame may be displayed on a predetermined display and stored in a memory. A camera (not shown) may also be disposed in a front surface of a body of the mobile terminal.

For example, the camera modules 1000 may include a first camera module 1000 and a second camera module 1000, and an AF or zoom function and OIS may be implemented by the first camera module 1000A.

The flash module 1530 may include a light-emitting element which emits light therein. The flash module 1530 may be operated by operation of the camera of the mobile terminal or control of a user.

The AF device 1510 may include one of packages of surface light-emitting laser elements as a light-emitting part.

The AF device 1510 may have an AF function using a laser. The AF device 1510 may be mainly used in a condition in which the AF function using the image of the camera module 1000 is degraded, for example, in a close distance of 10 m or less or in a dark environment.

The AF device 1510 may include a light-emitting part, which includes a vertical-cavity surface-emitting laser (VC-SEL) semiconductor element, and a light-receiving part, which converts light energy into electrical energy, such as a photodiode.

FIG. 30 is a perspective view illustrating a vehicle to which the camera module according to the embodiment is applied.

For example, FIG. 30 is an external view of the vehicle including a vehicle driving assistance device to which the camera module 1000 according to the embodiment is applied.

Referring to FIG. 30, a vehicle 700 of the embodiment may include wheels 13FL and 13FR, which are rotated by a power source, and a predetermined sensor. Although the sensor may be a camera sensor 2000, the present invention is not limited thereto.

The camera sensor 2000 may be a camera sensor to which the camera module 1000 according to the embodiment is applied. The vehicle 700 of the embodiment may obtain image information through the camera sensor 2000 which captures a front image or surrounding image, determine a situation, in which lane lines are not identified, using the image information, and generate virtual lane lines when the lane lines are not identified.

For example, the camera sensor 2000 may obtain the front image by capturing an image in front of the vehicle 700, and a processor (not shown) may analyze objects included in the front image to obtain the image information.

For example, when images of lanes, adjacent vehicles, driving obstacles, and median strips, curbs, roadside trees, and the like which correspond to indirect road signs are included in the image captured by the camera sensor 2000, the processor may detect such objects so that the objects are included in the image information. In this case, the processor may obtain distance information from the objects detected through the camera sensor 2000 to supplement the image information.

The image information may be information about the objects captured in the images. The camera sensor 2000 may include an image sensor and an image processing module.

The camera sensor 2000 may process a still image or moving image obtained by the image sensor (for example, a complementary metal-oxide semiconductor (CMOS) or charge-coupled device (CCD)).

The image processing module may extract necessary information by processing the still image or moving image obtained through the image sensor and transmit the extracted information to the processor.

In this case, the camera sensor 2000 may further include a stereo camera in order to improve the measurement accuracy of an object and further secure information such as a distance between the vehicle 700 and the object and the like but is not limited thereto.

While the present invention has been mainly described above with reference to the embodiments, it will be understood by those skilled in the art that the present invention is not limited to the embodiments, the embodiments are only exemplary, and various modifications and applications not exemplified above may be made without departing from the essential features of the present embodiments. For example, components specifically described in the embodiments may be modified and implemented. In addition, it should be interpreted that differences related to modifications and applications fall within the scope of the present invention defined by the appended claims.

The invention claimed is:

1. A camera actuator comprising:
   a housing;
   a mover on which a reflective member is disposed;
   a guide part disposed between the housing and the mover; and

a driving part configured to drive the mover,
   wherein the guide part includes a support part, a first elastic part coupled to the support part and the mover, and a second elastic part coupled to the support part and the housing,
   wherein the first elastic part supports the mover to enable tilting with respect to a first axis,
   wherein the second elastic part supports the mover to enable tilting with respect to a second axis perpendicular to the first axis,
   wherein the first elastic part is disposed between the support part and the mover in a third direction, and connects the support part and the mover to each other,
   wherein the second elastic part is interposed between the support part and the mover in the third direction, and serves to connect the support part to the mover,
   wherein the first elastic part and the second elastic part are spaced apart from each other in the third direction and are physically separated from each other, and
   wherein the third direction is a direction from the guide part toward the mover and is perpendicular to a direction of the first axis and a direction of the second axis.

2. The camera actuator of claim 1, wherein the first elastic part and the second elastic part are disposed in directions perpendicular to each other.

3. The camera actuator of claim 1, wherein the support part includes:
   a first support part extending in the direction of the second axis; and
   a second support part extending in the direction of the first axis.

4. The camera actuator of claim 3, wherein the first support part is disposed apart from a line, which bisects the mover in the first axis direction, in the first axis direction.

5. The camera actuator of claim 3,
   wherein the first elastic part includes a first pattern disposed in the second axis direction, and;
   wherein the second elastic part includes a second pattern disposed in the first axis direction.

6. The camera actuator of claim 5,
   wherein the housing includes a coupling hole facing the first support part,
   wherein the first elastic part is coupled to the first support part and the coupling hole, and
   wherein the first pattern is disposed between the first support part and the coupling hole.

7. The camera actuator of claim 6, wherein the first pattern is symmetrically disposed with respect to the first axis direction.

8. The camera actuator of claim 6,
   wherein the first elastic part further includes a first pattern region, a 1-1 coupling region, and a 1-2 coupling region disposed in the third direction,
   wherein the first pattern is disposed in the first pattern region,
   wherein the 1-1 coupling region is disposed between the first pattern region and the mover, and
   wherein the 1-2 coupling region is disposed between the first pattern region and the housing.

9. The camera actuator of claim 5,
   wherein the second elastic part is coupled to the second support part and a lower surface of the mover; and
   wherein the second pattern is disposed between the second support part and the lower surface of the mover.

10. The camera actuator of claim 9, wherein the second pattern is symmetrically disposed with respect to the first direction.

11. The camera actuator of claim 8, wherein the second elastic part further includes a second pattern region, a 2-1 coupling region, and a 2-2 coupling region in the third direction, wherein the second pattern is disposed in the second pattern region, wherein the 2-1 coupling region is coupled to the second support part between the second pattern and the housing, and wherein the 2-2 coupling region is disposed between the second pattern region and the mover.

12. The camera actuator of claim 5, wherein each of the first pattern and the second pattern is provided as at least one of a groove and a hole, and wherein the support part is disposed apart from the mover and the housing in the third direction.

13. The camera actuator of claim 1, wherein the driving part includes driving magnets and driving coils, wherein the driving magnets include a first magnet, a second magnet, and a third magnet, wherein the driving coils include a first coil, a second coil, and a third coil, wherein the first magnet and the second magnet are symmetrically disposed with respect to the first axis on the mover, wherein the first coil and the second coil are symmetrically disposed with respect to the first axis between the housing and the mover, wherein the third magnet is disposed on a bottom surface of the mover, and wherein the third coil is disposed on a bottom surface of the housing.

14. A camera actuator comprising:

a housing;

a mover on which a reflective member is disposed; and a guide part disposed between the housing and the mover and supporting the mover to enable tilting with respect to a first axis and a second axis, wherein the guide part includes a support part, a first elastic part coupled to a first surface of the support part and a lower side of the mover, and a second elastic part coupled to a second surface of the support part and the housing, wherein the first surface and the second surface of the support part are perpendicular to each other, wherein one surface of the first elastic part coupled to the first surface of the support part is perpendicular to one surface of the second elastic part coupled to the second surface of the support part, wherein the first elastic part is disposed between the support part and the mover in a third direction, and connects the support part and the mover to each other, wherein the second elastic part is interposed between the support part and the mover in the third direction, and serves to connect the support part to the mover, wherein the first elastic part and the second elastic part are spaced apart from each other in the third direction and are physically separated from each other, and wherein the third direction is a direction from the guide part toward the mover and is perpendicular to a direction of the first axis and a direction of the second axis.

* * * * *